United States Patent
Gao et al.

(10) Patent No.: US 11,923,985 B2
(45) Date of Patent: Mar. 5, 2024

(54) METHOD FOR PERFORMING HYBRID AUTOMATIC REPEAT REQUEST FEEDBACK, AND TERMINAL

(71) Applicant: China Academy of Telecommunications Technology, Beijing (CN)

(72) Inventors: Xuejuan Gao, Beijing (CN); Qianqian Si, Beijing (CN); Ekpenyong Tony, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 135 days.

(21) Appl. No.: 16/968,593

(22) PCT Filed: Dec. 29, 2018

(86) PCT No.: PCT/CN2018/125476
§ 371 (c)(1),
(2) Date: Aug. 8, 2020

(87) PCT Pub. No.: WO2019/153964
PCT Pub. Date: Aug. 15, 2019

(65) Prior Publication Data
US 2021/0050948 A1     Feb. 18, 2021

(30) Foreign Application Priority Data
Feb. 8, 2018  (CN) .......................... 201810129186.9

(51) Int. Cl.
*H04L 1/1812*   (2023.01)
*H04W 72/21*   (2023.01)
*H04W 72/23*   (2023.01)

(52) U.S. Cl.
CPC .......... *H04L 1/1812* (2013.01); *H04W 72/21* (2023.01); *H04W 72/23* (2023.01)

(58) Field of Classification Search
CPC ... H04L 1/1812; H04L 1/1854; H04L 5/0078; H04L 5/0055; H04L 1/1607;
(Continued)

(56) References Cited

U.S. PATENT DOCUMENTS

2015/0117272 A1*  4/2015  Gao ...................... H04L 5/0055
                                                          370/280
2017/0019236 A1*  1/2017  Yang ..................... H04L 1/1861
(Continued)

FOREIGN PATENT DOCUMENTS

CN    101789851 A    7/2010
CN    103283169 A    9/2013
(Continued)

OTHER PUBLICATIONS

Huawei et al., "Discussion on SPS HARQ-ACK bit handling in case of dynamic codebook configuration for eCA", 3GPP TSG RAN WG1 Meeting #84bis, Busan, Korea, Apr. 11-15, 2016, total 5 pages, R1-162105.
(Continued)

*Primary Examiner* — Jung H Park
(74) *Attorney, Agent, or Firm* — Kilpatrick Townsend & Stockton LLP

(57) ABSTRACT

The embodiments of the present application relate to a method for performing hybrid automatic repeat request feedback, and a terminal, for solving the problem existing in the prior art that there is no clear solution regarding how to perform feedback on HARQ-ACK of an SPS PDSCH. In the embodiments of the present application, the terminal adds or removes HARQ-ACK of an SPS PDSCH in an HARQ-ACK codebook transmitted over a PUCCH or a PUSCH, and
(Continued)

transmits a processed HARQ-ACK codebook. Since the terminal can add or remove the HARQ-ACK of the SPS PDSCH in the HARQ-ACK codebook transmitted over the PUCCH or the PUSCH, a solution to perform feedback on the HARQ-ACK of the SPS PDSCH is given, improving system performance.

20 Claims, 6 Drawing Sheets

(58) Field of Classification Search
CPC ........... H04W 72/0413; H04W 72/042; H04W 72/1278; H04W 72/1273; H04W 72/1289
See application file for complete search history.

(56) References Cited

U.S. PATENT DOCUMENTS

2017/0134140 A1* 5/2017 Park ...................... H04L 1/1887
2018/0019843 A1 1/2018 Papasakellariou
2018/0034610 A1* 2/2018 He ......................... H04L 5/0055
2021/0152292 A1* 5/2021 Fu ..................... H04W 72/0413

FOREIGN PATENT DOCUMENTS

| CN | 106160957 A | 11/2016 |
| CN | 106165330 A | 11/2016 |
| CN | 106549734 A | 3/2017 |
| CN | 107347002 A | 11/2017 |
| CN | 107409016 A | 11/2017 |
| KR | 1020170053470 A | 5/2017 |
| WO | 2013138021 A1 | 9/2013 |
| WO | 2013138047 A1 | 9/2013 |
| WO | 2017161541 A1 | 9/2017 |
| WO | 2019139405 A1 | 7/2019 |

OTHER PUBLICATIONS

Huawei et al.,"Summary of remaining issues on HARQ management", 3GPP TSG RAN WG 1 Meeting Ad Hoc, Vancouver, Canada, Jan. 22-261h, 2018, total 13 pages, R1-1800036.
Qualcomm Incorporated,"Summary of DL/UL scheduling and HARQ management", 3GPP TSG-RAN WG1 Meeting AH 1801, Jan. 22-26, 2018, Vancouver, Canada, total 7 pages, R1-1801070.
3GPP TS 38.213 V15.0.0, 3rd Generation Partnership Project; Technical Specification Group Radio Access Network; NR;Physical layer procedures for control (Release 15), total 56 pages, Dec. 2017.

* cited by examiner

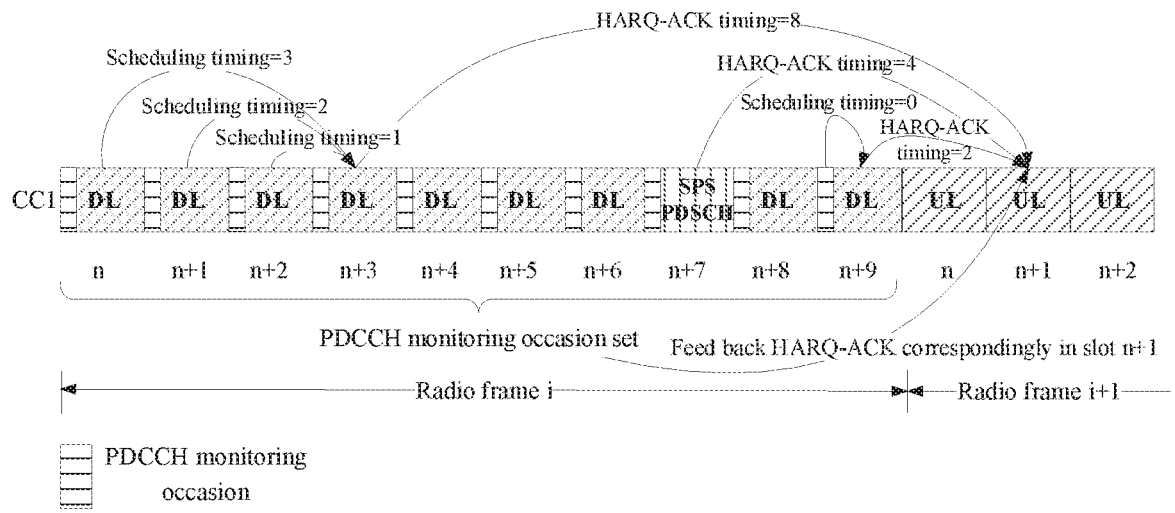

Fig. 7

```
┌─────────────────────────────────────────────────┐
│ Adding or removing, by a terminal, HARQ-ACK of  │──800
│ an SPS PDSCH to or from an HARQ-ACK codebook    │
│ transmitted on a PUCCH or a PUSCH               │
└─────────────────────────────────────────────────┘
                         │
                         ▼
┌─────────────────────────────────────────────────┐
│ Transmitting, by the terminal, a processed      │──801
│ HARQ-ACK codebook by the terminal               │
└─────────────────────────────────────────────────┘
```

Fig. 8

METHOD FOR PERFORMING HYBRID AUTOMATIC REPEAT REQUEST FEEDBACK, AND TERMINAL

This application is a National Stage of International Application No. PCT/CN2018/125476, filed Dec. 29, 2018, which claims the priority of Chinese Patent Application No. 201810129186.9, filed to the Chinese Patent Office on Feb. 8, 2018, both of which are hereby incorporated by reference in their entireties.

FIELD

The present application relates to the field of wireless communication technologies, and in particular to a method for performing hybrid automatic repeat request feedback, and a terminal.

BACKGROUND

In an LTE (Long Term Evolution) system, only semi-static HARQ (Hybrid Automatic Repeat reQuest)-ACK (ACKnowledge) timing is supported, and the timing relationship (namely HARQ-ACK timing) between HARQ-ACK feedback of downlink transmission and the downlink transmission is predefined. For example, for FDD (Frequency division duplex) carriers, HARQ-ACK of the downlink transmission in a subframe n−4 is fed back in a subframe n, for TDD (Time division duplex) carriers, and for different uplink-downlink configurations of TDD, one uplink subframe n In one embodiment feeds back HARQ-ACK of the downlink transmission in a downlink subframe set n−k, and k∈K, K is a predefined downlink index value for different TDD uplink-downlink configurations and different uplink subframes in each TDD uplink-downlink configuration.

In a 5G NR (New Radio) system, semi-static timing and dynamic HARQ-ACK timing are supported. In other words, the timing relationship (namely the HARQ-ACK timing) between the HARQ-ACK feedback of the downlink transmission and the downlink transmission may be a value pre-configured by signaling or predefined, or may be a value notified in DCI (Downlink Control Information) used by a PDCCH (Physical Downlink Control Channel), which can In one embodiment be changed dynamically through indication of the DCI among multiple pre-configured candidate values, so it is called dynamic HARQ-ACK timing. Cross-slot scheduling is supported in the 5G NR, namely one PDCCH transmitted in a slot n may schedule PDSCH (Physical Downlink Shared Channel) transmission in the slot n or may schedule PDSCH transmission in a slot n+k, where K is greater than 0. Therefore, the DCI used by the PDCCH for scheduling PDSCH may contain two indication fields, among which, one is used for indicating the position of a time domain of the PDSCH scheduled by the PDCCH and the other one is used for indicating HARQ-ACK timing of the PDSCH scheduled by the PDCCH.

In the 5G NR system, SPS (Semi-persistent Scheduling) PDSCH transmission and a PDSCH (namely dynamic PDCSH) with a corresponding PDCCH are also supported. When an SPS PDSCH service is configured, high-level signaling will In one embodiment configure a RNTI (Radio Network Temporary Identifier) corresponding to the SPS to scramble the PDCCH for an SPS PDSCH, and the high-level signaling may further In one embodiment configure a transmission interval of the SPS PDSCH.

The HARQ-ACK timing of the PDSCH may be indicated by an HARQ-ACK timing indication field in the PDCCH corresponding to the PDSCH, and one of 8 candidate HARQ-ACK timing pre-configured by the high-level signaling may be indicated by a 3-bit indication field, and the HARQ-ACK timing may be dynamically changed for each PDSCH transmission, so it is called the dynamic HARQ-ACK timing. Under the dynamic HARQ-ACK timing, two methods including semi-static and dynamic HARQ-ACK codebook generation are feasible, and the so-called HARQ-ACK codebook is an HARQ-ACK feedback sequence generated for the downlink transmission performing HARQ-ACK feedback in the same position of the time domain.

However, at present, there is no clear solution regarding how to perform HARQ-ACK feedback of an SPS PDSCH.

SUMMARY

The present application provides a method for performing hybrid automatic repeat request feedback, and a terminal, for solving the problem existing in the prior art that there is no clear solution regarding how to perform HARQ-ACK feedback of an SPS PDSCH.

In a first aspect, the embodiments of the present application provide a method for performing hybrid automatic repeat request feedback. The method includes:

adding or removing, by a terminal, a HARQ-ACK of an SPS PDSCH by a terminal in an HARQ-ACK codebook transmitted on a PUCCH or a PUSCH; and transmitting, by a terminal, a processed HARQ-ACK codebook by the terminal.

In a second aspect, the embodiments of the present application provide a method for performing hybrid automatic repeat request feedback. The method includes:

determining, by a network side device, that HARQ-ACK of an SPS PDSCH is added or removed by a terminal in an HARQ-ACK codebook transmitted on a PUCCH or a PUSCH by a network side device; and receiving, by the network side device, according to a determined result, an HARQ-ACK codebook sent by the terminal.

In a third aspect, the embodiments of the present application provide a terminal for performing hybrid automatic repeat request feedback. The terminal includes: a processor and a memory;

and the processor is configured to read a program in the memory to perform the following process:

adding or removing HARQ-ACK of an SPS PDSCH in an HARQ-ACK codebook transmitted on a PUCCH or a PUSCH, and transmitting a processed HARQ-ACK codebook.

In a fourth aspect, the embodiments of the present application provide a network side device for performing hybrid automatic repeat request feedback. The network side device includes: a processor and a memory;

and the processor is configured to read a program in the memory to perform the following process:

determining that HARQ-ACK of an SPS PDSCH is added or removed by a terminal in an HARQ-ACK codebook transmitted on a PUCCH or a PUSCH; and receiving, according to a determined result, an HARQ-ACK codebook sent by the terminal.

In the fifth aspect, the embodiments of the present application provide a computer storage medium having a computer program stored thereon, and the computer program implements, when executed by a processor, any solution of the first aspect above.

In the sixth aspect, the embodiments of the present application provide the computer storage medium having the computer program stored thereon, and the computer program implements, when executed by the processor, any solution of the second aspect above.

The terminal of the embodiments of the present application adds or removes the HARQ-ACK of the SPS PDSCH in the HARQ-ACK codebook transmitted on the PUCCH or the PUSCH. The network side device determines that the HARQ-ACK of the SPS PDSCH is added or removed by the terminal in the HARQ-ACK codebook transmitted on the PUCCH or the PUSCH, and according to a determined result, an HARQ-ACK codebook sent by the terminal is received. Since the terminal can add or remove the HARQ-ACK of the SPS PDSCH in the HARQ-ACK codebook transmitted on the PUCCH or the PUSCH, a solution for performing HARQ-ACK feedback of the SPS PDSCH is given, improving system performance.

BRIEF DESCRIPTION OF THE DRAWINGS

In order to more clearly illustrate technical solutions in the embodiments of the present application, a brief introduction to the accompanying drawings required for the description of the embodiments will be provided below. Obviously, the accompanying drawings in the following description are only some of the embodiments of the present application.

FIG. 7 is a schematic diagram of feedback performed based on a set in an embodiment of the present application.

FIG. 8 is a schematic flowchart of a method for performing hybrid automatic repeat request feedback by a terminal in an embodiment of the present application.

DETAILED DESCRIPTION OF THE EMBODIMENTS

Hereinafter, some terms in embodiments of the present application will be explained to facilitate understanding.

(2) In the embodiments of the present application, the term "plurality" refers to two or more, and other quantifiers are similar to the same.

(3) "and/or" describes an association relationship between associated objects, indicates that there may be three relationships, for example, A and/or B may indicate three conditions that A exists alone, A and B exist simultaneously, and B exists alone. The character "/" generally indicates that the successive associated objects are of a "or" relationship.

In order to make the purpose, technical solutions and advantages of the present application more explicit, the present application will be further described in details below with reference to the accompanying drawings. Obviously, the embodiments described are merely some of, rather than all of, the embodiments of the present application.

Figure 1A:
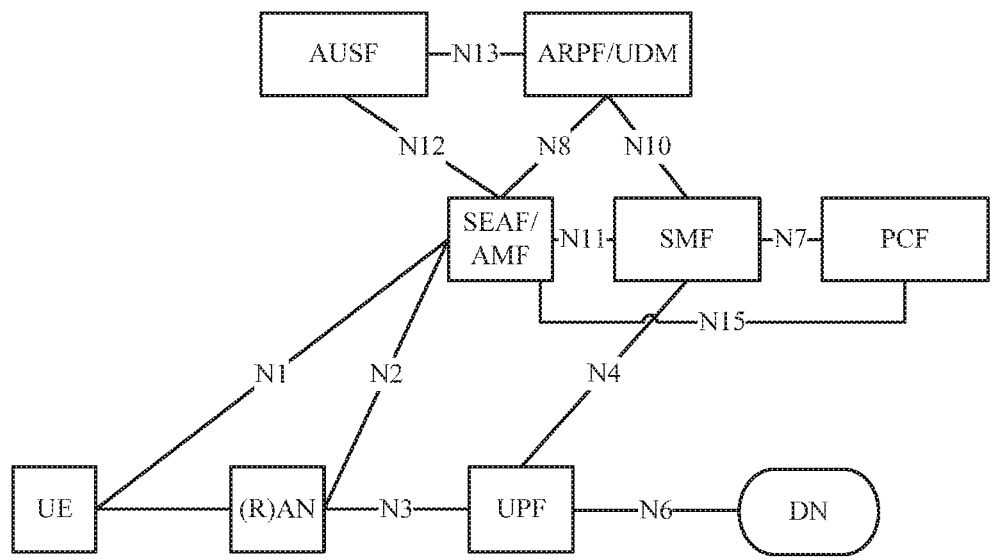
FIG. 1A is a schematic diagram of a 5G architecture provided by the present application.

As shown in FIG. 1A, it is a schematic diagram of a 5G architecture. The architecture includes user equipment (UE, namely a terminal), an (radio) access network ((R) AN) device, a user plane function (UPF) network element, a data network (DN), an access and mobility management function (AMF) network element, a security anchor function (SEAF) network element, a session management function (SMF) network element, a policy control function (PCF) network element, an authentication server function (AUSF) network element, an unified data management (UDM) network element, and an authentication credential storage and processing function (ARPF) network element. Among them, the SEAF network element and the AMF network element may be deployed integrally. For example, an SEAF may be a function of the AMF network element. Or, the SEAF network element may be separately deployed from the AMF network element. For convenient description, it is represented as a SEAF/AMF network element in FIG. 1A. The ARPF network element and the UDM network element may be deployed integrally. For example, an ARPF may be a function of the UDM network element. Or, the ARPF network element may be separately deployed from the UDM network element. For convenient description, it is represented as an ARPF/UDM network element in FIG. 1A.

Among them, the UE and the SEAF/AMF network element communicate via an N1 interface; the (R) AN device and the SEAF/AMF network element communicate via an N2 interface; the RAN device and UPF network element communicate via an N3 interface; the UPF network element and the SMF network element communicate via an N4 interface; the UPF network element and the DN communicate via an N6 interface; the SMF network element and PCF network element communicate via an N7 interface; the SEAF/AMF network element and the ARPF/UDM network element communicate via an N8 interface; different UPF network elements communicate via an N9 interface; the SMF network element and the ARPF/UDM network element communicate via an N10 interface; the SEAF/AMF network element and the SMF network element communicate via an N11 interface; the SEAF/AMF network element and the AUSF network element communicate via an N12 interface; the AUSF network element and the ARPF/UDM network element communicate via an N13 interface; different SEAF/AMF network elements communicate via an N14 interface; and the SEAF/AMF network element and the PCF network element communicate via an N15 interface.

The UE may be a mobile phone, a tablet and other devices.

The (R) AN device includes, for example, a base station.

The UPF network element is mainly responsible for functions such as session and bearer management, and Internet protocol (IP) address allocation.

The PCF network element is mainly responsible for providing strategies for a network.

The AMF network element is mainly responsible for mobility management in a mobile network, such as user location updates, user network registration, and user switching.

The SEAF network element is mainly responsible for handling entities of functions such as authentication vectors during an authentication process.

The SMF network element is mainly responsible for establishing a session, modifying a session, or releasing a session.

The AUSF network element is mainly responsible for authenticating a server functional entity.

The UDM network element is mainly responsible for managing contract data, and is responsible for notifying a corresponding network element when the contract data is modified.

The ARPF network element is mainly responsible for storing a long-term security credential of the UE. As a possible design, the ARPF network element may be the part, responsible for a security function, in the UDM network element.

The DN is an external data network.

Figure 1B:
FIG. 1B is a schematic diagram of a possible network architecture provided by the present application.
Figure 1C:
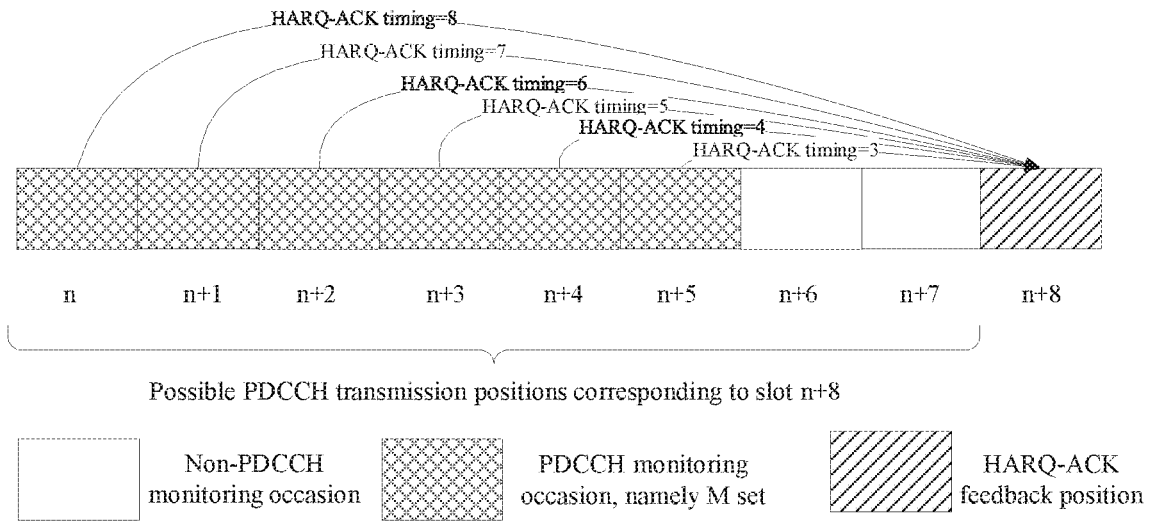
FIG. 1C is a schematic diagram of generation of an HARQ-ACK codebook in an embodiment of the present application.

As shown in FIG. 1B, it is a schematic diagram of a possible network architecture applicable to the present application. The network architecture includes a network side device and a terminal. The network side device is the network side device to which the terminal currently accesses.

In the present application, the terminal is a device with a wireless communication function. It may be deployed on land, and it may be deployed indoors or outdoors, hand-held or vehicle-mounted. It may also be deployed on the water surface (eg. on a ship); and it may also be deployed in the air (eg. on an aircraft, a balloon and a satellite). The terminal may be a mobile phone, a pad, a computer with a wireless transceiver function, a virtual reality (VR) terminal, an augmented reality (AR) terminal, a wireless terminal in industrial control, a wireless terminal in self driving, a wireless terminal in remote medical services, a wireless terminal in a smart grid, a wireless terminal for transportation safety, a wireless terminal in a smart city, a wireless terminal in smart home, etc.; and may also be various forms of UE, mobile stations (MS), and terminal devices. The UE in FIG. 1A is a specific example of the terminal of the present application.

The network side device may be a base station, and is the device that provides a wireless communication function for the terminal, which includes, but is not limited to a g node B (gNB), a radio network controller (RNC), a node B (NB), a base station controller (BSC), a base transceiver station (BTS), a home base station (eg. home evolved node B, or home node B, HNB), a Base Band Unit (BBU), a transmitting and receiving point (TRP), a transmitting point (TP), a mobile switching center or the like in 5G. The base station in the present application may also be a device which may emerge in the future and provides a wireless communication function for a terminal in other communication systems.

In the present application, as an example, the network side device may be the RAN device as shown in FIG. 1A, and the terminal may be the UE as shown in FIG. 1A.

In FIG. 1B, the terminal 10 is configured to add or remove HARQ-ACK of an SPS PDSCH to or from an HARQ-ACK codebook transmitted on a PUCCH or a PUSCH, and transmit a processed HARQ-ACK codebook.

The network side device 20 is configured to determine that the HARQ-ACK of the SPS PDSCH is added or removed by the terminal to or from the HARQ-ACK codebook transmitted on the PUCCH or the PUSCH; and receive, according to a determined result, an HARQ-ACK codebook sent by the terminal.

The terminal of the embodiments of the present application adds or removes the HARQ-ACK of the SPS PDSCH to or from the HARQ-ACK codebook transmitted on the PUCCH or the PUSCH; the network side device determines that the HARQ-ACK of the SPS PDSCH is added or removed by the terminal to or from HARQ-ACK codebook transmitted on the PUCCH or the PUSCH; and according to a determined result, an HARQ-ACK codebook sent by the terminal is received. Since the terminal can add or remove the HARQ-ACK of the SPS PDSCH to or from the HARQ-ACK codebook transmitted on the PUCCH or the PUSCH, a solution for performing HARQ-ACK feedback of the SPS PDSCH is given to improve system performance.

The HARQ-ACK codebook of the embodiments of the present application is a semi-static codebook or a dynamic codebook.

HARQ-ACK timing of the PDSCH may be indicated by an HARQ-ACK timing indication field in the PDCCH corresponding to the PDSCH, and one of 8 candidate HARQ-ACK timing pre-configured by a high-level signaling may be indicated by a 3-bit indication field, and the HARQ-ACK timing may be dynamically changed for each PDSCH transmission, so it is called a dynamic HARQ-ACK timing. Under the dynamic HARQ-ACK timing, two methods including semi-static and dynamic HARQ-ACK codebook generation are feasible, and the so-called HARQ-ACK codebook is an HARQ-ACK feedback sequence generated for the downlink transmission performing HARQ-ACK feedback in the same position of the time domain.

The semi-static codebook may determine a PDCCH receiving set M according to the HARQ-ACK timing, a scheduling timing between the PDCCH and the PDSCH, configuration information of a PDCCH monitoring occasion or the like and determine the size of the HARQ-ACK codebook according to the M. For example, a set of 8 HARQ-ACK timing candidates pre-configured is {1, 2, 3,4,5,6,7,8}, indicating the number of slots which are the slots for transmitting corresponding HARQ-ACK after a PDSCH end position starts. Then according to the set, a maximum of 8 downlink transmission slots may be determined (because some of the determined 8 slot positions may not be downlink slots or some of the determined 8 slot positions may not be scheduled as they do not have a corresponding PDCCH monitoring occasion even if they are downlink slots) to perform HARQ-ACK feedback corresponding to the same uplink position. According to scheduling time of downlink transmission, e.g., this slot scheduling, 8 possible PDCCH transmission positions are In one embodiment determined. If there are one or more positions that are not configured as PDCCH monitoring occasions among these 8 possible PDCCH transmission positions, the positions that are not configured as PDCCH monitoring occasions are removed in the codebook. Only the positions, among the 8 positions, that are actually PDCCH monitoring occasions are considered because the PDCCH may be sent only in the positions where the PDCCH monitoring occasion is actually configured actually, scheduling the PDSCH transmission at the corresponding positions. For example, there are actually 6 positions where the PDCCH monitoring occasion actually exists, the two remaining slots may be uplink or reserved unused resource, then M=6 as shown in FIG. IC is determined, and the HARQ-ACK codebook is determined as M*C, and C is the number of bits of the HARQ-ACK feedback corresponding to each PDSCH on the carrier, and is related to the number of TBs configured and the number of CBGs configured. In other words, regardless of whether the PDCCH and PDSCH are actually received at these 6 positions, the HARQ-ACK codebook is generated according to these 6 positions.

Figure 1D:
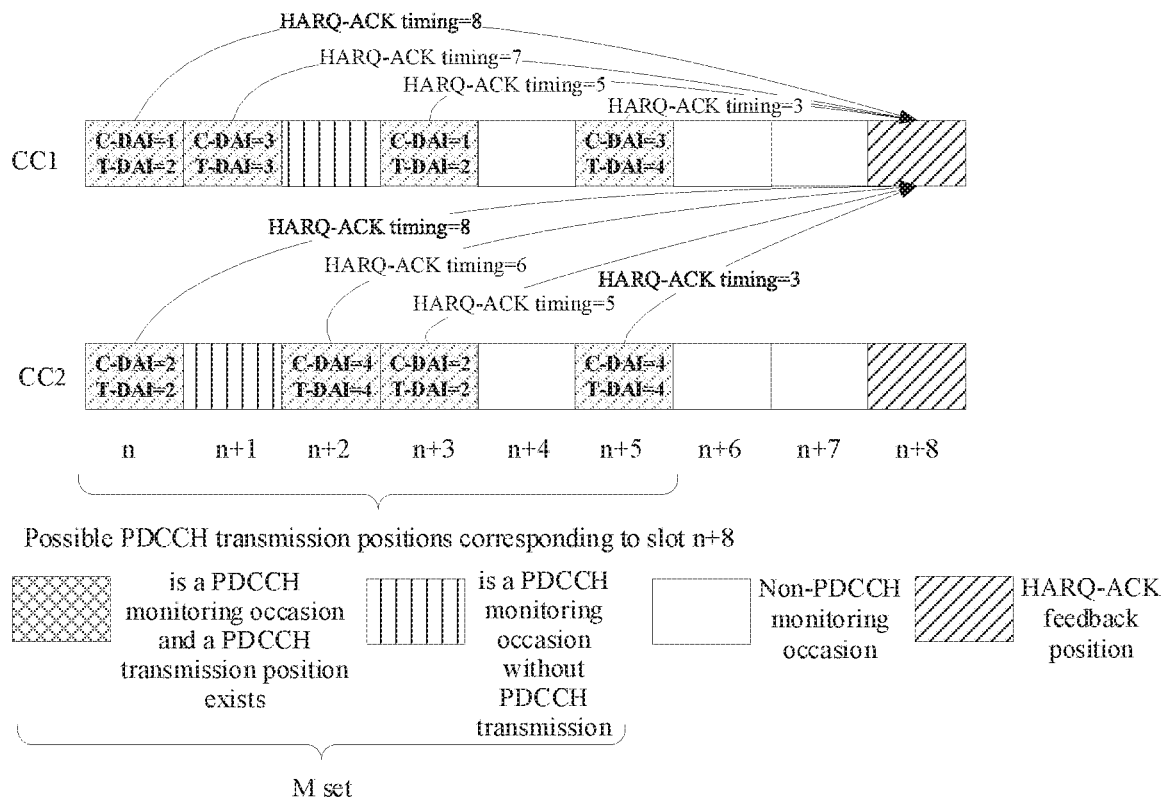
FIG. 1D is another schematic diagram of generation of another HARQ-ACK codebook in an embodiment of the present application.

The dynamic codebook may determine a PDCCH receiving set M according to HARQ-ACK timing indication fields of DCI of a first PUCCH and of DCI of a last PUCCH among received PUCCHs performing HARQ-ACK feedback In one embodiment at the same uplink position, a scheduling timing between the PDCCH and the PDSCH, configuration information of PDCCH monitoring occasion and the like in a mode similar to that of the semi-static codebook. After the M is determined, each PDCCH in M PDCCH monitoring occasions, when a non-regressive DCI format is used, includes 2-bit C-DAI (Counter-Downlink Assignment Index) and 2-bit T-DAI (Total-DAI), and the C-DAI is configured to determine a ranking position of the HARQ-ACK in the codebook, and T-DAI is configured to determine the size of the HARQ-ACK codebook. For example, as shown in FIG. 1D, it is assumed that this slot scheduling, according to HARQ-ACK timing in a PDCCH (corresponding to a first PDCCH corresponding to slot n+8) received in slot n and HARQ-ACK timing in a PDCCH (corresponding to a last PDCCH corresponding to slot n+8) received in slot n+5, determines a set M. In the set M, according to C-DAI in the actually received PDCCH, ranking is carried out on a frequency domain and a time domain successively, and according to T-DAI in a PDCCH received in the last monitoring occasion of the set M, a size of the HARQ-ACK codebook is determined as 8*C, and it is assumed that each PDSCH transmission on each of two CCs corresponds to C-bit HARQ-ACK feedback information. Because HARQ-ACK ranking and HARQ-ACK bit determination based on the actually received PDCCH do not require HARQ-ACK information generation for place holding at the position where there is no actual scheduling, information redundancy of the HARQ-ACK feedback may be greatly reduced.

In one embodiment, the SPS PDSCH in the embodiments of the present application may be one of the following PDCCHs:

a PDSCH not corresponding to the PDCCH;

an SPS PDSCH transmitted in a subsequent SPS transmission occasion determined according to a PDCCH indicating activation of downlink SPS; or an SPS PDSCH transmitted in a subsequent SPS transmission occasion determined according to a PDCCH indicating re-establishing of downlink SPS.

The "subsequent" mentioned above does not include the first PDSCH transmission determined according to scheduling information of the PDCCH.

In the embodiments of the present application, there are a plurality of types of methods for adding or removing HARQ-ACK of an SPS PDSCH to or from an HARQ-ACK codebook transmitted on a PUCCH or a PUSCH, some of which are enumerated below.

Method 1

A terminal adds or removes HARQ-ACK of an SPS PDSCH to or from an HARQ-ACK codebook according to HARQ-ACK timing of the SPS PDSCH.

In one embodiment, a network side device determines, according to the HARQ-ACK timing of the SPS PDSCH, that the HARQ-ACK of the SPS PDSCH is added or removed by the terminal to or from the HARQ-ACK codebook.

1. The terminal adds the HARQ-ACK of the SPS PDSCH to the HARQ-ACK codebook, when the terminal determines that the HARQ-ACK of the SPS PDSCH and the HARQ-ACK codebook are transmitted at the same time according to the HARQ-ACK timing of the SPS PDSCH.

In one embodiment, the network side device determines that the HARQ-ACK of the SPS PDSCH is added by the terminal to the HARQ-ACK codebook, when the network side device determines that the HARQ-ACK of the SPS PDSCH and the HARQ-ACK codebook are transmitted at the same time according to the HARQ-ACK timing of the SPS PDSCH.

In other words, in the condition that it is determined that the HARQ-ACK of the SPS PDSCH and the HARQ-ACK codebook are transmitted at the same time, the HARQ-ACK of the SPS PDSCH may be added to the HARQ-ACK codebook.

One possible embodiment is as follows: when the HARQ-ACK codebook is transmitted at time n and time n−k is time at which the terminal receives the SPS PDSCH, it is determined that the HARQ-ACK of the SPS PDSCH and the HARQ-ACK codebook are transmitted at the same time.

Another possible embodiment is as follows: when transmission time of the SPS PDSCH is n, the HARQ-ACK codebook transmitted at transmission time n+k is an HARQ-ACK codebook transmitted at the same time with the HARQ-ACK of the SPS PDSCH, namely the HARQ-ACK of the SPS PDSCH is added by the terminal to the HARQ-ACK codebook transmitted at the transmission time n+k.

The k mentioned above is the HARQ-ACK timing of the SPS PDSCH.

2. The terminal removes the HARQ-ACK of the SPS PDSCH from the HARQ-ACK codebook, when the terminal determines the HARQ-ACK of the SPS PDSCH and the HARQ-ACK codebook are transmitted at different time according to the HARQ-ACK timing of the SPS PDSCH.

In one embodiment, the network side device determines that the HARQ-ACK of the SPS PDSCH is removed by the terminal from the HARQ-ACK codebook when the network side device determines that the HARQ-ACK of the SPS PDSCH and the HARQ-ACK codebook are transmitted at different time according to the HARQ-ACK timing of the SPS PDSCH.

In other words, in the condition that it is determined that the HARQ-ACK of the SPS PDSCH and the HARQ-ACK codebook are transmitted at different time, the HARQ-ACK of the SPS PDSCH may not be added to the HARQ-ACK codebook.

One possible embodiment is as follows: when the HARQ-ACK codebook is transmitted at time n and time n−k is not the time at which the terminal receives the SPS PDSCH, it is determined that the HARQ-ACK of the SPS PDSCH and the HARQ-ACK codebook are transmitted at different time.

Another possible embodiment is as follows: when transmission time of the SPS PDSCH is n, the HARQ-ACK codebook not transmitted at transmission time n+k is an HARQ-ACK codebook transmitted at time different from transmission time of the HARQ-ACK of the SPS PDSCH, namely the HARQ-ACK of the SPS PDSCH is removed by the terminal from the HARQ-ACK codebook not transmitted at time n+k.

The k mentioned above is the HARQ-ACK timing of the SPS PDSCH.

During implementation, in the condition that the network side device sends a PDCCH, and the PDCCH indicates a new HARQ-ACK timing of the SPS PDSCH, a processing mode may be one of the following modes.

Processing mode 1: in the condition that the terminal receives a PDCCH, and a new HARQ-ACK feedback position of the SPS PDSCH determined according to the PDCCH is different from an original HARQ-ACK feedback position of the SPS PDSCH determined according to a PDCCH indicating activation of downlink SPS: according to a relationship between the original HARQ-ACK feedback position of the SPS PDSCH and the HARQ-ACK codebook, the HARQ-ACK of the SPS PDSCH is added or removed to or from the HARQ-ACK codebook; and according to a relationship between the new HARQ-ACK feedback position of the SPS PDSCH and the HARQ-ACK codebook, the HARQ-ACK of the SPS PDSCH is added or removed to or from the HARQ-ACK codebook.

In one embodiment, in the condition that the network side device sends a PDCCH, a new HARQ-ACK feedback position of the SPS PDSCH determined according to the PDCCH is different from an original HARQ-ACK feedback position of the SPS PDSCH determined according to a PDCCH indicating activation of downlink SPS: according to a relationship between the original HARQ-ACK feedback position of the SPS PDSCH and the HARQ-ACK codebook, the network side device determines that the HARQ-ACK of the SPS PDSCH is added or removed by the terminal to or from the HARQ-ACK codebook; and according to a relationship between the new HARQ-ACK feedback position of the SPS PDSCH and the HARQ-ACK codebook, the network side device determines that the HARQ-ACK of the SPS PDSCH is added or removed by the terminal to or from the HARQ-ACK codebook.

Processing mode 2: in the condition that the terminal receives a PDCCH and a new HARQ-ACK feedback position of the SPS PDSCH determined according to the PDCCH is different from an original HARQ-ACK feedback position of the SPS PDSCH determined according to a PDCCH indicating activation of downlink SPS: before it is determined that the new HARQ-ACK feedback position of the SPS PDSCH takes effect, according to a relationship between the original HARQ-ACK feedback position of the SPS PDSCH and the HARQ-ACK codebook, the HARQ-ACK of the SPS PDSCH is added or removed to or from the HARQ-ACK codebook, or before it is determined that the new HARQ-ACK feedback position of the SPS PDSCH takes effect, according to a relationship between the original HARQ-ACK feedback position of the SPS PDSCH and the HARQ-ACK codebook, the HARQ-ACK of the SPS PDSCH is added or removed to or from the HARQ-ACK codebook; and according to a relationship between the new HARQ-ACK feedback position of the SPS PDSCH and the HARQ-ACK codebook, the HARQ-ACK of the SPS PDSCH is added or removed to or from the HARQ-ACK codebook; and after it is determined that the new HARQ-ACK feedback position of the SPS PDSCH takes effect, according to a relationship between the new HARQ-ACK feedback position of the SPS PDSCH and the HARQ-ACK codebook, the HARQ-ACK of the SPS PDSCH is added or removed to or from the HARQ-ACK codebook.

In one embodiment, in the condition that the network side device sends a PDCCH, and a new HARQ-ACK feedback position of the SPS PDSCH determined according to the PDCCH is different from an original HARQ-ACK feedback position of the SPS PDSCH determined according to a PDCCH indicating activation of downlink SPS: before it is determined that the new HARQ-ACK feedback position of the SPS PDSCH takes effect, the network side device determines, according to a relationship between the original HARQ-ACK feedback position of the SPS PDSCH and the HARQ-ACK codebook, that the HARQ-ACK of the SPS PDSCH is added or removed by the terminal to or from the HARQ-ACK codebook, or before it is determined that the new HARQ-ACK feedback position of the SPS PDSCH takes effect, the network side device determines, according to a relationship between the original HARQ-ACK feedback position of the SPS PDSCH and the HARQ-ACK codebook, that the HARQ-ACK of the SPS PDSCH is added or removed by the terminal to or from the HARQ-ACK codebook; and the network side device determines, according to a relationship between the new HARQ-ACK feedback position of the SPS PDSCH and the HARQ-ACK codebook, that the HARQ-ACK of the SPS PDSCH is added or removed by the terminal to or from the HARQ-ACK codebook; and after it is determined that the new HARQ-ACK feedback position of the SPS PDSCH takes effect, the network side device determines, according to a relationship between the new HARQ-ACK feedback position of the SPS PDSCH and the HARQ-ACK codebook, that the HARQ-ACK of the SPS PDSCH is added or removed by the terminal to or from the HARQ-ACK codebook.

Processing mode 3: after the network side device sends the PDCCH, and the PDCCH indicates a new HARQ-ACK timing of the SPS PDSCH, according to an original HARQ-ACK timing of the SPS PDSCH, the HARQ-ACK of the SPS PDSCH is added or removed to or from the HARQ-ACK codebook; and according to the new HARQ-ACK timing of the SPS PDSCH, the HARQ-ACK of the SPS PDSCH is added or removed to or from the HARQ-ACK codebook.

In one embodiment, in the condition that the network side device sends the PDCCH, and the PDCCH indicates a new HARQ-ACK timing of the SPS PDSCH, the network side device determines, according to an original HARQ-ACK timing of the SPS PDSCH, that the HARQ-ACK of the SPS PDSCH is added or removed by the terminal to or from the HARQ-ACK codebook transmitted on the PUCCH or the PUSCH; and the network side device determines, according to the new HARQ-ACK timing of the SPS PDSCH, that the HARQ-ACK of the SPS PDSCH is added or removed by the terminal to or from the HARQ-ACK codebook transmitted on the PUCCH or the PUSCH.

In other words, the terminal needs to perform the above method 1 according to the new HARQ-ACK timing, and also needs to perform the above method 1 according to the original HARQ-ACK timing.

In one embodiment, the network side device also needs to perform the above method 1 according to the new HARQ-ACK timing, and needs to perform the above method 1 according to the original HARQ-ACK timing.

For example, HARQ-ACK timing 2 is also configured on the basis of HARQ-ACK timing 1 for the terminal, the terminal performs the above method 1 according to the HARQ-ACK timing 1, and performs the above method 1 according to the HARQ-ACK timing 2.

Processing mode 4: after a network side device sends a PDCCH, and the PDCCH indicates a new HARQ-ACK timing of the SPS PDSCH: before it is determined that the new HARQ-ACK timing takes effect, according to an original HARQ-ACK timing of the SPS PDSCH, the HARQ-ACK of the SPS PDSCH is added or removed to or from the HARQ-ACK codebook; or before it is determined that the new HARQ-ACK timing takes effect, according to the original HARQ-ACK timing of the SPS PDSCH, the HARQ-ACK of the SPS PDSCH is added or removed to or from the HARQ-ACK codebook, and according to the new HARQ-ACK timing of the SPS PDSCH, the HARQ-ACK of the SPS PDSCH is added or removed to or from the HARQ-ACK codebook; and after it is determined that the new HARQ-ACK timing takes effect, according to the new HARQ-ACK timing of the SPS PDSCH, the HARQ-ACK of the SPS PDSCH is added or removed to or from the HARQ-ACK codebook.

In one embodiment, in the condition that the network side device sends the PDCCH, and the PDCCH indicates a new HARQ-ACK timing of the SPS PDSCH: before it is determined that the new HARQ-ACK timing takes effect, the network side device determines, according to an original HARQ-ACK timing of the SPS PDSCH, that the HARQ-ACK of the SPS PDSCH is added or removed by the terminal to or from the HARQ-ACK codebook; or before it is determined that the new HARQ-ACK timing takes effect, the network side device determines, according to an original HARQ-ACK timing of the SPS PDSCH, that the HARQ-ACK of the SPS PDSCH is added or removed by the terminal to or from the HARQ-ACK codebook, and the network side device determines, according to the new HARQ-ACK timing of the SPS PDSCH, that the HARQ-ACK of the SPS PDSCH is added or removed by the terminal to or from the HARQ-ACK codebook; and after it is determined that the new HARQ-ACK timing takes effect, the network side device determines, according to the new HARQ-ACK timing of the SPS PDSCH, that the HARQ-ACK of the SPS PDSCH is added or removed by the terminal to or from the HARQ-ACK codebook.

Method 2

A terminal determines, according to whether a set of downlink transmission corresponding to time at which an HARQ-ACK codebook is transmitted includes a transmission occasion of an SPS PDSCH, whether the HARQ-ACK of the SPS PDSCH is added to an HARQ-ACK codebook.

In one embodiment, a network side device determines, according to whether a set of downlink transmission corresponding to time at which the HARQ-ACK codebook is transmitted includes a transmission occasion of the SPS PDSCH, whether the HARQ-ACK of the SPS PDSCH is added by the terminal to the HARQ-ACK codebook transmitted on the PUCCH or the PUSCH.

During implementation, in the condition that the set of downlink transmission corresponding to the time at which the HARQ-ACK codebook is transmitted includes the transmission occasion of the SPS PDSCH, the HARQ-ACK of the SPS PDSCH is added by the terminal to the HARQ-ACK codebook transmitted on the PUCCH or the PUSCH, and the network side device also determines that the HARQ-ACK of the SPS PDSCH is added by the terminal to the HARQ-ACK codebook transmitted on the PUCCH or the PUSCH.

The set of downlink transmission corresponding to the time at which the HARQ-ACK codebook is transmitted is determined according to one of the following modes.

Mode 1: the network side device determines set of downlink transmission according to a predefined or pre-configured set of HARQ-ACK timing.

For example, the set of the HARQ-ACK timing predefined or pre-configured is {1, 2, 3, 4, 5, 6, 7, 8}, according to a maximum value 8 and a minimum value 1 in the set, a set of downlink transmission corresponding to slot n+8 is slot n (namely n+8−8) to slot n+7 (namely n+8−1). Although the set of downlink transmission may contain the slot without downlink resource, whether an SPS occasion is included is determined, and the SPS occasion may appear in the slot with the downlink resource, so a determination result is not affected. For another example, a range of the slot is determined according to the above mode, and the slot that does not contain the downlink transmission resource is removed. For another example, the set of the HARQ-ACK timing predefined or pre-configured is {1, 2, 3, 6}. Since values in the set are not continuous, even if a range is determined based on the set, a specific position is further needed to be determined according to each HARQ-ACK timing in the range, the position that does not correspond to the HARQ-ACK timing is not counted in the set of the downlink transmission, or a specific position may be directly determined based on each HARQ-ACK timing. Then the set of downlink transmission corresponding to slot n+8 is slot n+7, slot n+6, slot n+5, and slot n+2. Further, it is also possible to remove the slot without a downlink resource among the slots determined according to each HARQ-ACK timing.

Mode 2: the network side device determines the set of downlink transmission according to HARQ-ACK timing indicated by an HARQ-ACK timing indication field in DCI used by a plurality of received PDCCHs performing HARQ-ACK feedback at the time when the HARQ-ACK codebook is transmitted.

For example, according to a maximum HARQ-ACK timing (assumed to be 8) and a minimum HARQ-ACK timing (assumed to be 4) indicated by a plurality of received PDCCHs preforming HARQ-ACK feedback corresponding to slot n+8, it is determined that a set of downlink transmission corresponding to the slot n+8 is slot n (namely n+8-8) to slot n+4 (namely n+8−4). Although the set may contain the slot without downlink resource, whether an SPS occasion is included is determined, and the SPS occasion may appear in the slot with the downlink resource, so a determination result is not affected. For another example, a range of the slot is determined according to the above mode, and the slot that does not contain the downlink transmission resource is removed. For another example, the set of the HARQ-ACK timing predefined or pre-configured is {1, 2, 3, 4, 5, 6, 8}, according to a maximum HARQ-ACK timing (assumed to be 8) and a minimum HARQ-ACK timing (assumed to be 4) indicated by a plurality of received PDCCHs preforming HARQ-ACK feedback corresponding to slot n+8, a subset of values of the HARQ-ACK timing is determined as {4, 5, 6, 8}. Even if a range is determined based on the maximum value and the minimum value, a specific position is further needed to be determined according to each HARQ-ACK timing in the range, the position that does not correspond to the HARQ-ACK timing is not counted in the set of the downlink transmission, or a specific position may be directly determined based on each HARQ-ACK timing in the subset. Then the set of downlink transmission corresponding to slot n+8 is slot n+4, slot n+3, slot n+2, and slot n. Further, it is also possible to remove the slot without downlink resource among the slots determined according to each HARQ-ACK timing.

Mode 3: the network side device determines the set of downlink transmission according to a predefined or pre-configured set of the HARQ-ACK timing, and a predefined or pre-configured set of downlink scheduling timing.

For example, according to maximum value (for example 8) and a minimum value (for example 1) of the set of the HARQ-ACK timing predefined or pre-configured, and a maximum value (for example 3) and a minimum value (for example 0) of the set of timing of the downlink scheduling, it is determined that the set of downlink transmission corresponding to slot n+8 is slot n−3 (namely n+8−8−3) to slot n+7 (namely n+8−1−0). Although the set may contain the slot without downlink resource, whether an SPS occasion is included is determined, and the SPS occasion may appear in the slot with the downlink resource, so a determination result is not affected. For another example, a range of the slot is determined according to the above mode, and the slot that does not contain the downlink transmission resource is removed. For another example, when values in the set of the HARQ-ACK timing are discontinuous and/or values in the set of scheduling timing are discontinuous, a range of a slot determined according to the above mode contains the slot not corresponding to the set of the timing, a specific slot is further needed to be determined according to each value of the set of timing, or a specific slot is directly determined based on each value of the set of timing, so that the set of the downlink transmission is obtained. Further, it is also possible to remove the slot that does not contain the downlink resource of the set.

Mode 4: the network side device determines the set of downlink transmission according to HARQ-ACK timing indicated by an HARQ-ACK timing indication field in DCI used by a plurality of received PDCCHs performing HARQ-ACK feedback at the time when the HARQ-ACK codebook is transmitted, and downlink scheduling timing indicated by or corresponding to the plurality of PDCCHs.

The so-called correspondence here means that there may be no scheduling timing indication field in the PDCCH. In this case, a scheduling timing is a fixed value pre-configured and a value corresponding to the PDCCH.

For example, according to a maximum HARQ-ACK timing (assumed to be 8) and a minimum HARQ-ACK timing (assumed to be 4) indicated by a plurality of received PDCCHs preforming HARQ-ACK feedback corresponding to slot n+8, and a maximum scheduling timing (assuming that scheduling signaling of slot n is detected in slot n−3, a scheduling timing indicated by a PDCCH in slot n−3 is 3) and a minimum scheduling timing (assuming that scheduling signaling of slot n=4 is detected in slot n+4, a scheduling timing indicated by a PDCCH in slot n+4 is 0) indicated by the received PDCCH, it is determined that the set of downlink transmission corresponding to slot n+8 is slot n−3 (namely n+8−8−3) to slot n+4 (namely n+8−4−0). For another example, a range of the slot is determined according to the above mode, and the slot that does not contain downlink transmission resource is removed. For another example, when values in the set of the HARQ-ACK timing are discontinuous and/or values in the set of scheduling timing are discontinuous, a range of a slot determined according to the above mode contains the slot not corresponding to the set of timing, a specific slot is further needed to be determined according to each value in the set of timing, or a specific slot is directly determined based on each value in the set of timing, so that the set of the downlink transmission is obtained. Further, it is also possible to remove the slot that does not contain the downlink resource of the set.

During implementation, in the condition that the network side device sends the PDCCH, and the PDCCH indicates a new HARQ-ACK timing of the SPS PDSCH, a processing mode may be one of the following modes.

Processing mode 1: in the condition that the terminal receives the PDCCH, and a subsequent transmission occasion of the SPS PDSCH determined according to the PDCCH is different from a subsequent transmission occasion of the SPS PDSCH determined according to a PDCCH indicating resource activation of the downlink SPS: according to a relationship between an original transmission occasion of the SPS PDSCH and the set of downlink transmission corresponding to the time at which the HARQ-ACK codebook is transmitted, the HARQ-ACK of the SPS PDSCH is added or removed to or from the HARQ-ACK codebook; and according to a relationship between a new transmission occasion of the SPS PDSCH and the set of downlink transmission corresponding to the time at which the HARQ-ACK codebook is transmitted, the HARQ-ACK of the SPS PDSCH is added or removed to or from the HARQ-ACK codebook.

In one embodiment, in the condition that the network side device sends the PDCCH, and a subsequent transmission occasion of the SPS PDSCH determined according to the PDCCH is different from a subsequent transmission occasion of the SPS PDSCH determined according to a PDCCH indicating resource activation of the downlink SPS: the network side device determines, according to a relationship between an original transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook; and the network side device determines, according to a relationship between a new transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook.

Processing mode 2: in the condition that the terminal receives the PDCCH, and a new transmission occasion of the SPS PDSCH determined according to the PDCCH is different from an original transmission occasion of the SPS PDSCH determined according to a PDCCH indicating resource activation of the downlink SPS: before it is determined that the new transmission occasion of the SPS PDSCH takes effect, according to a relationship between the original transmission occasion of the SPS PDSCH and the set of downlink transmission corresponding to the time at which the HARQ-ACK codebook is transmitted, the HARQ-ACK of the SPS PDSCH is added or removed to or from the HARQ-ACK codebook; or, before it is determined that the new transmission occasion of the SPS PDSCH takes effect, according to a relationship between the original transmission occasion of the SPS PDSCH and the set of downlink transmission corresponding to the time at which the HARQ-ACK codebook is transmitted, the HARQ-ACK of the SPS PDSCH is added or removed to or from the HARQ-ACK codebook, and according to a relationship between the new transmission occasion of the SPS PDSCH and the set of downlink transmission corresponding to the time at which the HARQ-ACK codebook is transmitted, the HARQ-ACK of the SPS PDSCH is added or removed to or from the HARQ-ACK codebook; and after it is determined that the new transmission occasion of the SPS PDSCH takes effect, according to a relationship between the new transmission occasion of the SPS PDSCH and the set of downlink transmission corresponding to the time at which the HARQ-ACK codebook is transmitted, the HARQ-ACK of the SPS PDSCH is added or removed to or from the HARQ-ACK codebook.

In one embodiment, in the condition that the network side device sends the PDCCH, and a new transmission occasion of the SPS PDSCH determined according to the PDCCH is different from an original transmission occasion of the SPS PDSCH determined according to a PDCCH indicating resource activation of the downlink SPS: before it is determined that the new transmission occasion of the SPS PDSCH takes effect, the network side device determines, according to a relationship between the original transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook; or, before it is determined that the new transmission occasion of the SPS PDSCH takes effect, the network side device determines, according to a relationship between the original transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook, and the network side device determines, according to a relationship between the new transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook; and after it is determined that the new transmission occasion of the SPS PDSCH takes effect, the network side device determines, according to a relationship between the new transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook.

In one embodiment, the downlink transmission mentioned above in the embodiments of the present application is a transmission though a PDSCH or a transmission indicating downlink SPS release though a PDCCH.

In other words, the downlink transmission here is transmission through the PDSCH or transmission indicating resource release of the downlink SPS though the PDCCH.

In one possible embodiment: after it is determined that the SPS PDSCH of the terminal is activated, the HARQ-ACK of the SPS PDSCH is added or removed to or from the HARQ-ACK codebook transmitted on the PUCCH or the PUSCH.

In one embodiment, the network side device determines, after it is determined that the SPS PDSCH of the terminal is activated, that the HARQ-ACK of the SPS PDSCH is added or removed by the terminal to or from the HARQ-ACK codebook transmitted on the PUCCH or the PUSCH. In one embodiment, when the terminal receives the PDCCH indicating resource activation of downlink SPS, a subsequent SPS transmission occasion determined according to the PDCCH is activated, and the subsequent SPS transmission occasion does not include a first PDSCH transmission corresponding to the PDCCH, namely the PDCCH is sent in slot n, a scheduling timing is k, then PDSCH transmission in slot n+k may be scheduled, and slot n+k is not included in the subsequent SPS transmission occasion determined according to the PDCCH. The subsequent SPS transmission occasion starts from a slot separated from slot n+k by N slots, namely the slot of every N slots, or, when the terminal receives the PDCCH indicating resource activation of downlink SPS, it is determined that the SPS PDSCH of the terminal is activated.

Method 3: in the condition that SPS transmission is configured for the terminal, the HARQ-ACK of the SPS PDSCH is added to the HARQ-ACK codebook.

In one embodiment, the network side device determines, in the condition that the SPS transmission is configured for the terminal, that the HARQ-ACK of the SPS PDSCH is added by the terminal to the HARQ-ACK codebook transmitted on the PUCCH or the PUSCH.

In the condition that the SPS transmission is configured for the terminal (for example, an SPS transmission interval and/or RNTI such as CS-RNTI (Configured Scheduling-RNTI) corresponding to SPS is configured for high-level signaling), the HARQ-ACK of the SPS PDSCH is added to the HARQ-ACK codebook. At this time, no matter whether the SPS PDSCH of the terminal is activated, namely no matter whether the terminal receives the PDCCH indicating resource activation of downlink SPS, the HARQ-ACK of the SPS PDSCH is added to the HARQ-ACK codebook.

In one embodiment, the terminal may add the HARQ-ACK of the SPS PDSCH to the HARQ-ACK codebook at a predetermined position, for which, several addition modes are listed below.

Addition Mode 1

The terminal adds or removes X-bit HARQ-ACK of the SPS PDSCH at the predetermined position of the HARQ-ACK codebook.

In one embodiment, the network side device determines that X-bit HARQ-ACK of the SPS PDSCH is added or removed by the terminal at the predetermined position of the HARQ-ACK codebook.

X is the bit number of an HARQ-ACK corresponding to one SPS PDSCH, and is a positive integer.

During implementation, the predetermined position may be located before or after the HARQ-ACK codebook.

Addition Mode 2

The terminal adds or removes Y*X-bit HARQ-ACK of the SPS PDSCH at a predetermined position of the HARQ-ACK codebook or adds or removes $$\sum_{i=1}^{Y} X_i$$

-bit HARQ-ACK of the SPS PDSCH at a predetermined position of the HARQ-ACK codebook.

In one embodiment, the network side device determines that Y*X-bit HARQ-ACK of the SPS PDSCH or $$\sum_{i=1}^{Y} X_i$$

-bit HARQ-ACK of the SPS PDSCH is added or removed by the terminal at a predetermined position of the HARQ-ACK codebook.

X is the bit number of HARQ-ACK corresponding to one SPS PDSCH, and is a value greater than or equal to 1.

$X_i$ is the bit number of HARQ-ACK corresponding to one SPS PDSCH of Y SPS PDSCHs.

Y is the number of the SPS PDSCH for transmitting HARQ-ACK of an SPS PDSCH and the HARQ-ACK codebook at the same time determined according to HARQ-ACK timing of the corresponding SPS PDSCH in a carrier, a cell or a BWP (BandWidth Part) with activated SPS of the terminal, or the number of a carrier, or a cell or a BWP for transmitting HARQ-ACK of an SPS PDSCH and the HARQ-ACK codebook at the same time determined according to HARQ-ACK timing of the corresponding SPS PDSCH.

Or, Y is the number of transmission occasions of the SPS PDSCH contained in a set of downlink transmission corresponding to the time at which the HARQ-ACK codebook is transmitted in a carrier or a cell or a BWP with activated SPS of the terminal, or the number of a carrier or a cell or a BWP with a transmission occasion of the SPS PDSCH contained in a set of downlink transmission corresponding to the time at which the HARQ-ACK codebook is transmitted.

Or, Y is the number of a carrier, a cell or a BWP with configured SPS transmission of the terminal, and is a positive integer.

During implementation, the predetermined position may be located before or after the HARQ-ACK codebook.

Figure 2:
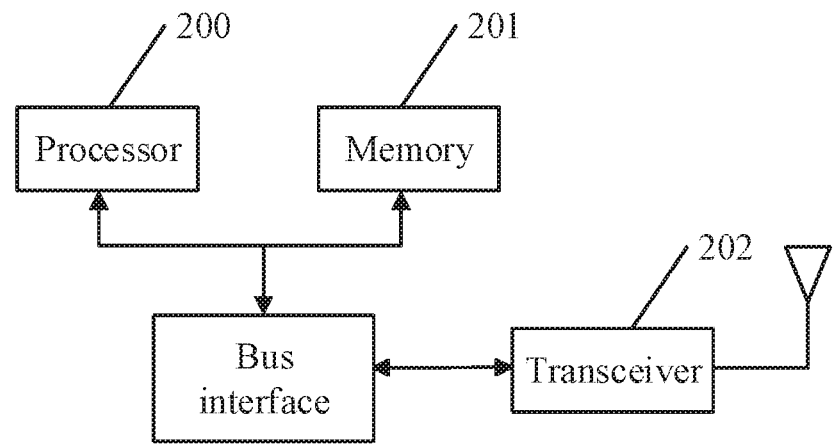
FIG. 2 is a schematic structural diagram of a terminal in an embodiment of the present application.

As shown in FIG. 2, a terminal in an embodiment of the present application includes: a processor 200, a memory 201, and a transceiver 202.

The processor 200 is responsible for managing a bus architecture and general processing, and the memory 201 may store data used, when performing operation, by the processor 200. The transceiver 202 is configured to receive and transmit data under the control of the processor 200.

The bus architecture may include interconnected buses of any number and bridges of any number, which are In one embodiment linked together through various circuits of one or more processors represented by the processor 200 and various circuits of memories represented by the memory 201. The bus architecture may also link various other circuits such as peripheral devices, voltage regulators, and power management circuits, which are well known in the art, and therefore are not further described herein. The bus interface provides an interface. The processor 200 is responsible for managing the bus architecture and general processing, and the memory 201 may store data used, when performing an operation, by the processor 200.

A process disclosed in the embodiments of the present application may be applied to the processor 200 or implemented by the processor 200. During an implementation process, all steps of a signal processing flow may be completed by an integrated logic circuit of hardware or an instruction in the form of software in the processor 200. The processor 200 may be a general-purpose processor, a digital signal processor, an application specific integrated circuit, a field programmable gate array or other programmable logic device, a discrete gate or a transistor logic device, or a discrete hardware component, and may implement or execute methods, steps and logic block diagrams disclosed in the embodiments of the present application. The general-purpose processor may be a microprocessor, any conventional processor, etc. The steps of the method disclosed in conjunction with the embodiments of the present application may be directly embodied to be executed and completed by a hardware processor, or may be executed and completed through a combination of hardware and software devices in the processor. The software device may be located in a mature storage medium in the art, such as a random access memory, a flash memory, a read-only memory, a programmable read-only memory, an electrically erasable programmable memory, and a register. The storage medium is located in the memory 201, and the processor 200 reads information in the memory 201, and completes the steps of the signal processing flow in combination with its hardware.

The processor 200 is configured to read a program in the memory 201 and carry out the following process: adding or removing HARQ-ACK of an SPS PDSCH to or from an HARQ-ACK codebook transmitted on a PUCCH or a PUSCH, and transmitting a processed HARQ-ACK codebook.

In one embodiment, the HARQ-ACK codebook is a semi-static codebook or a dynamic codebook.

In one embodiment, the SPS PDSCH is a PDSCH without a corresponding PDCCH.

In one embodiment, the processor 200 is In one embodiment configured to: add or remove the HARQ-ACK of the SPS PDSCH to or from the HARQ-ACK codebook according to HARQ-ACK timing of the SPS PDSCH.

In one embodiment, the processor 200 is In one embodiment configured to: add, in the condition that it is determined that the HARQ-ACK of the SPS PDSCH and the HARQ-ACK codebook are transmitted at the same time according to the HARQ-ACK timing of the SPS PDSCH, the HARQ-ACK of the SPS PDSCH to the HARQ-ACK codebook.

In one embodiment, the processor 200 is In one embodiment configured to: add, in the condition that the HARQ-ACK codebook is transmitted at time n and time n−k is time at which the terminal receives the SPS PDSCH, the HARQ-ACK of the SPS PDSCH to the HARQ-ACK codebook, and k is the HARQ-ACK timing of the SPS PDSCH; or add, in the condition that transmission time of the SPS PDSCH is n, the HARQ-ACK of the SPS PDSCH to the HARQ-ACK codebook transmitted at transmission time n+k, and k is the HARQ-ACK timing of the SPS PDSCH.

In one embodiment, the processor 200 is In one embodiment configured to: remove, in the condition that it is determined that the HARQ-ACK of the SPS PDSCH and the HARQ-ACK codebook are transmitted at different time according to the HARQ-ACK timing of the SPS PDSCH, the HARQ-ACK of the SPS PDSCH from the HARQ-ACK codebook.

In one embodiment, the processor 200 is In one embodiment configured to: remove, in the condition that the HARQ-ACK codebook is transmitted at time n and time n−k is not time at which the terminal receives the SPS PDSCH, the HARQ-ACK of the SPS PDSCH from the HARQ-ACK codebook, and k is the HARQ-ACK timing of the SPS PDSCH; or remove, in the condition that transmission time of the SPS PDSCH is n, the HARQ-ACK of the SPS PDSCH from an HARQ-ACK codebook not transmitted at time n+k, and k is the HARQ-ACK timing of the SPS PDSCH.

In one embodiment, the processor 200 is In one embodiment configured to:
in the condition that a PDCCH is received, and a new HARQ-ACK feedback position of the SPS PDSCH determined according to the PDCCH is different from an original HARQ-ACK feedback position of the SPS PDSCH determined according to a PDCCH indicating activation of downlink SPS: add or remove, according to a relationship between the original HARQ-ACK feedback position of the SPS PDSCH and the HARQ-ACK codebook, the HARQ-ACK of the SPS PDSCH to or from the HARQ-ACK codebook, and add or remove, according to a relationship between the new HARQ-ACK feedback position of the SPS PDSCH and the HARQ-ACK codebook, the HARQ-ACK of the SPS PDSCH to or from the HARQ-ACK codebook; or
in the condition that a the PDCCH is received, and a new HARQ-ACK feedback position of the SPS PDSCH determined according to the PDCCH is different from an original HARQ-ACK feedback position of the SPS PDSCH determined according to a PDCCH indicating activation of downlink SPS: before it is determined that the new HARQ-ACK feedback position of the SPS PDSCH takes effect, add or remove, according to a relationship between the original HARQ-ACK feedback position of the SPS PDSCH and the HARQ-ACK codebook, the HARQ-ACK of the SPS PDSCH to or from the HARQ-ACK codebook, or before it is determined that the new HARQ-ACK feedback position of the SPS PDSCH takes effect, add or remove, according to a relationship between an original HARQ-ACK feedback position of the SPS PDSCH and the HARQ-ACK codebook, the HARQ-ACK of the SPS PDSCH to or from the HARQ-ACK codebook, and add or remove, according to a relationship between a new HARQ-ACK feedback position of the SPS PDSCH and the HARQ-ACK codebook, the HARQ-ACK of the SPS PDSCH to or from the HARQ-ACK codebook; and after it is determined that the new HARQ-ACK feedback position of the SPS PDSCH takes effect, add or remove, according to a relationship between the new HARQ-ACK feedback position of the SPS PDSCH and the HARQ-ACK codebook, the HARQ-ACK of the SPS PDSCH to or from the HARQ-ACK codebook; or after a new HARQ-ACK timing of the SPS PDSCH is received on a PDCCH: add or remove, according to an original HARQ-ACK timing of the SPS PDSCH, the HARQ-ACK of the SPS PDSCH to or from the HARQ-ACK codebook; and add or remove, according to the new HARQ-ACK timing of the SPS PDSCH, the HARQ-ACK of the SPS PDSCH to or from the HARQ-ACK codebook; or after a new HARQ-ACK timing of the SPS PDSCH is received on a PDCCH: before it is determined that the new HARQ-ACK timing takes effect, add or remove, according to an original HARQ-ACK timing of the SPS PDSCH, the HARQ-ACK of the SPS PDSCH to or from the HARQ-ACK codebook; or before it is determined that the new HARQ-ACK timing takes effect, add or remove, according to the original HARQ-ACK timing of the SPS PDSCH, the HARQ-ACK of the SPS PDSCH to or from the HARQ-ACK codebook, and add or remove, according to the new HARQ-ACK timing of the SPS PDSCH, the HARQ-ACK of the SPS PDSCH to or from the HARQ-ACK codebook; and after it is determined that the new HARQ-ACK timing takes effect, add or remove, according to the new HARQ-ACK timing of the SPS PDSCH, the HARQ-ACK of the SPS PDSCH to or from the HARQ-ACK codebook;

In one embodiment, the processor 200 is In one embodiment configured to: determine, according to whether a set of downlink transmission corresponding to time at which the HARQ-ACK codebook is transmitted includes a transmission occasion of the SPS PDSCH, whether the HARQ-ACK of the SPS PDSCH is added to the HARQ-ACK codebook.

In one embodiment, the processor 200 is In one embodiment configured to: add or remove, in the condition that the set of downlink transmission corresponding to the time at which the HARQ-ACK codebook is transmitted includes the transmission occasion of the SPS PDSCH, the HARQ-ACK of the SPS PDSCH to or from the HARQ-ACK codebook.

In one embodiment, the set of downlink transmission corresponding to the time at which the HARQ-ACK codebook is transmitted is determined by the processor according to one of the following modes.

Mode 1: the set is determined according to a predefined or pre-configured set of the HARQ-ACK timing.

Mode 2: the set is determined according to HARQ-ACK timing indicated by an HARQ-ACK timing indication field in DCI used by a plurality of received PDCCHs performing HARQ-ACK feedback at the time when the HARQ-ACK codebook is transmitted.

Mode 3: the set is determined according to a predefined or pre-configured set of the HARQ-ACK timing, and a predefined or pre-configured set of downlink scheduling timing.

Mode 4: the set is determined according to HARQ-ACK timing indicated by an HARQ-ACK timing indication field in DCI used by a plurality of received PDCCHs performing HARQ-ACK feedback at the time when the HARQ-ACK codebook is transmitted, and a maximum value and a minimum value of downlink scheduling timing indicated by or corresponding to the plurality of PDCCHs.

In one embodiment, the downlink transmission is a PDSCH or a PDCCH indicating downlink SPS release.

In one embodiment, the processor 200 is In one embodiment configured to:

in the condition that a the PDCCH is received, and a subsequent transmission occasion of the SPS PDSCH determined according to the PDCCH is different from a subsequent transmission occasion of the SPS PDSCH determined according to a PDCCH indicating resource activation of the downlink SPS: add or remove, according to a relationship between an original transmission occasion of the SPS PDSCH and the set of downlink transmission corresponding to the time at which the HARQ-ACK codebook is transmitted, the HARQ-ACK of the SPS PDSCH to or from the HARQ-ACK codebook, and add or remove, according to a relationship between a new transmission occasion of the SPS PDSCH and the set of downlink transmission corresponding to the time at which the HARQ-ACK codebook is transmitted, the HARQ-ACK of the SPS PDSCH to or from the HARQ-ACK codebook; or in the condition that a the PDCCH is received, and a new transmission occasion of the SPS PDSCH determined according to the PDCCH is different from an original transmission occasion of the SPS PDSCH determined according to a PDCCH indicating resource activation of downlink SPS: before it is determined that the new transmission occasion of the SPS PDSCH takes effect, add or remove, according to a relationship between the original transmission occasion of the SPS PDSCH and the set of downlink transmission corresponding to the time at which the HARQ-ACK codebook is transmitted, the HARQ-ACK of the SPS PDSCH to or from the HARQ-ACK codebook, or before it is determined that the new transmission occasion of the SPS PDSCH takes effect, add or remove, according to a relationship between the original transmission occasion of the SPS PDSCH and the set of downlink transmission corresponding to the time at which the HARQ-ACK codebook is transmitted, the HARQ-ACK of the SPS PDSCH to or from the HARQ-ACK codebook, and add or remove, according to a relationship between the new transmission occasion of the SPS PDSCH and the set of downlink transmission corresponding to the time at which the HARQ-ACK codebook is transmitted, the HARQ-ACK of the SPS PDSCH to or from the HARQ-ACK codebook; and after it is determined that the new transmission occasion of the SPS PDSCH takes effect, add or remove, according to a relationship between the new transmission occasion of the SPS PDSCH and the set of downlink transmission corresponding to the time at which the HARQ-ACK codebook is transmitted, the HARQ-ACK of the SPS PDSCH to or from the HARQ-ACK codebook.

In one embodiment, the processor 200 is further configured to: add or remove, after it is determined that the SPS PDSCH is activated, the HARQ-ACK of the SPS PDSCH to or from the HARQ-ACK codebook transmitted on the PUCCH or the PUSCH.

In one embodiment, the processor 200 is In one embodiment configured to: add, in the condition that SPS transmission is configured, the HARQ-ACK of the SPS PDSCH to the HARQ-ACK codebook.

In one embodiment, the processor 200 is In one embodiment configured to:
add or remove X-bit HARQ-ACK of the SPS PDSCH at a predetermined position of the HARQ-ACK codebook, and X is the bit number of HARQ-ACK corresponding to one SPS PDSCH, and is a positive integer; or
add or remove Y*X-bit HARQ-ACK of the SPS PDSCH or add or remove $$\sum_{i=1}^{Y} X_i$$

-bit HARQ-ACK of the SPS PDSCH at a predetermined position of the HARQ-ACK codebook, and X is the bit number of HARQ-ACK corresponding to one SPS PDSCH, and is a value greater than or equal to 1, $X_i$ is the bit number of HARQ-ACK corresponding to one SPS PDSCH of Y SPS PDSCHs, Y is the number of SPS PDSCHs for transmitting HARQ-ACK of the SPS PDSCH and the HARQ-ACK codebook at the same time determined according to HARQ-ACK timing of the corresponding SPS PDSCH in a carrier, a cell or a bandwidth part (BWP) with activated SPS of the terminal, or Y is the number of a carrier, or a cell or a BWP for transmitting HARQ-ACK of an SPS PDSCH and the HARQ-ACK codebook at the same time determined according to HARQ-ACK timing of the corresponding SPS PDSCH, or Y is the number of a transmission occasion of the SPS PDSCH contained in a set of downlink transmission corresponding to the time at which the HARQ-ACK codebook is transmitted in a carrier or a cell or a BWP with activated SPS of the terminal, or Y is the number of a carrier or a cell or a BWP with a transmission occasion of the SPS PDSCH contained in a set of downlink transmission corresponding to the time at which the HARQ-ACK codebook is transmitted, or Y is the number of a carrier, a cell or a BWP with configured SPS transmission of the terminal, and is a positive integer.

Figure 3:
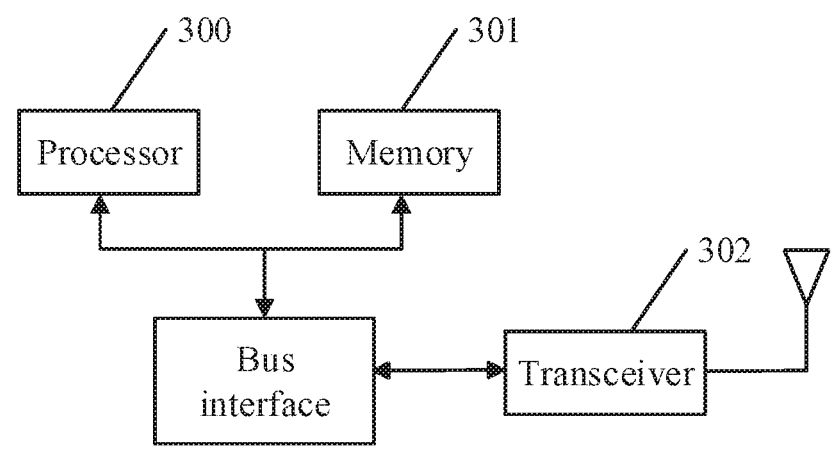
FIG. 3 is a schematic structural diagram of a network side device in an embodiment of the present application.

As shown in FIG. 3, a network side device in an embodiment of the present application includes: a processor 300, a memory 301, and a transceiver 302.

The processor 300 is responsible for managing a bus architecture and general processing, and the memory 301 may store data used, when performing operations, by the processor 300. The transceiver 302 is configured to receive and transmit the data under the control of the processor 300.

The bus architecture may include interconnected buses and bridges of any number, which are In one embodiment linked together through various circuits of one or more processors represented by the processor 300 and various circuits of memories represented by the memory 301. The bus architecture may also link various other circuits such as peripheral devices, voltage regulators, and power management circuits, which are well known in the art, and therefore are not further described herein. A bus interface provides an interface. The processor 300 is responsible for managing the bus architecture and general processing, and the memory 301 may store data used, when performing operations, by the processor 300.

A process disclosed in the embodiments of the present application may be applied to the processor 300 or implemented by the processor 300. During an implementation process, all steps of a signal processing flow may be completed by an integrated logic circuit of hardware or an instruction in the form of software in the processor 300. The processor 300 may be a general-purpose processor, a digital signal processor, an application specific integrated circuit, a field programmable gate array or other programmable logic devices, a discrete gate or a transistor logic device, or a discrete hardware component, and may implement or execute methods, steps and logic block diagrams disclosed in the embodiments of the present application. The general-purpose processor may be a microprocessor, any conventional processor, etc. The steps of the method disclosed in conjunction with the embodiments of the present application may be directly embodied to be executed and completed by a hardware processor, or may be executed and completed through a combination of hardware and software devices in the processor. The software device may be located in a mature storage medium in the art, such as a random access memory, a flash memory, a read-only memory, a programmable read-only memory, an electrically erasable programmable memory, and a register. The storage medium is located in the memory 301, and the processor 300 reads information in the memory 301, and completes the steps of the signal processing flow in combination with its hardware.

The processor 300 is configured to read a program in the memory 301 and carry out the following process:
determining that HARQ-ACK of an SPS PDSCH is added or removed by a terminal to or from an HARQ-ACK codebook transmitted on a PUCCH or a PUSCH; and
receiving, according to a determined result, the HARQ-ACK codebook sent by the terminal.

In one embodiment, the HARQ-ACK codebook is a semi-static codebook or a dynamic codebook.

In one embodiment, the SPS PDSCH is a PDSCH without a corresponding PDCCH.

In one embodiment, the processor 300 is In one embodiment configured to: determine, according to HARQ-ACK timing of the SPS PDSCH, that the HARQ-ACK of the SPS PDSCH is added or removed by the terminal to or from the HARQ-ACK codebook.

In one embodiment, the processor 300 is In one embodiment configured to:
determine, in the condition that it is determined that the HARQ-ACK of the SPS PDSCH and the HARQ-ACK codebook are transmitted at the same time according to the HARQ-ACK timing of the SPS PDSCH, that the HARQ-ACK of the SPS PDSCH is added by the terminal to the HARQ-ACK codebook.

In one embodiment, the processor 300 is In one embodiment configured to:
determine, in the condition that the HARQ-ACK codebook is transmitted at time n and time n−k is the time at which the terminal receives the SPS PDSCH, that the HARQ-ACK of the SPS PDSCH is added by the terminal to the HARQ-ACK codebook, and k is the HARQ-ACK timing of the SPS PDSCH; or
determine, in the condition that transmission time of the SPS PDSCH is n, that the HARQ-ACK of the SPS PDSCH is added by the terminal to the HARQ-ACK codebook transmitted at transmission time n+k, and k is the HARQ-ACK timing of the SPS PDSCH.

In one embodiment, the processor 300 is In one embodiment configured to:
  determine, in the condition that it is determined that the HARQ-ACK of the SPS PDSCH and the HARQ-ACK codebook are transmitted at different time according to the HARQ-ACK timing of the SPS PDSCH, that the HARQ-ACK of the SPS PDSCH is removed by the terminal from the HARQ-ACK codebook.

In one embodiment, the processor 300 is In one embodiment configured to:
  determine, in the condition that the HARQ-ACK codebook is transmitted at time n and time n−k is not the time at which the terminal receives the SPS PDSCH, that the HARQ-ACK of the SPS PDSCH is removed by the terminal from the HARQ-ACK codebook, and k is the HARQ-ACK timing of the SPS PDSCH; or
  determine, in the condition that transmission time of the SPS PDSCH is n, that the HARQ-ACK of the SPS PDSCH is removed by the terminal from an HARQ-ACK codebook not transmitted at time n+k, and k is the HARQ-ACK timing of the SPS PDSCH.

In one embodiment, the processor 300 is In one embodiment configured to:
  in the condition that a PDCCH is sent, and a new HARQ-ACK feedback position of the SPS PDSCH determined according to the PDCCH is different from an original HARQ-ACK feedback position of the SPS PDSCH determined according to a PDCCH indicating activation of downlink SPS: determine, according to a relationship between the original HARQ-ACK feedback position of the SPS PDSCH and the HARQ-ACK codebook, that the HARQ-ACK of the SPS PDSCH is added or removed by the terminal to or from the HARQ-ACK codebook, and determine, according to a relationship between the new HARQ-ACK feedback position of the SPS PDSCH and the HARQ-ACK codebook, that the HARQ-ACK of the SPS PDSCH is added or removed to or from the HARQ-ACK codebook; or
  in the condition that a PDCCH is sent, and a new HARQ-ACK feedback position of the SPS PDSCH determined according to the PDCCH is different from an original HARQ-ACK feedback position of the SPS PDSCH determined according to a PDCCH indicating activation of downlink SPS: before it is determined that the new HARQ-ACK feedback position of the SPS PDSCH takes effect, determine, according to a relationship between the original HARQ-ACK feedback position of the SPS PDSCH and the HARQ-ACK codebook, that the HARQ-ACK of the SPS PDSCH is added or removed by the terminal to or from the HARQ-ACK codebook, or before it is determined that the new HARQ-ACK feedback position of the SPS PDSCH takes effect, determine, according to a relationship between the original HARQ-ACK feedback position of the SPS PDSCH and the HARQ-ACK codebook, that the HARQ-ACK of the SPS PDSCH is added or removed by the terminal to or from the HARQ-ACK codebook, and determine, according to a relationship between the new HARQ-ACK feedback position of the SPS PDSCH and the HARQ-ACK codebook, that the HARQ-ACK of the SPS PDSCH is added or removed by the terminal to or from the HARQ-ACK codebook; and after it is determined that the new HARQ-ACK feedback position of the SPS PDSCH takes effect, determine, according to a relationship between the new HARQ-ACK feedback position of the SPS PDSCH and the HARQ-ACK codebook, that the HARQ-ACK of the SPS PDSCH is added or removed to or from the HARQ-ACK codebook; or
  in the condition that a PDCCH is sent, and the PDCCH indicates a new HARQ-ACK timing of the SPS PDSCH, determine, according to an original HARQ-ACK timing of the SPS PDSCH, that the HARQ-ACK of the SPS PDSCH is added or removed by the terminal to or from the HARQ-ACK codebook transmitted on the PUCCH or the PUSCH; and determine, according to the new HARQ-ACK timing of the SPS PDSCH, that the HARQ-ACK of the SPS PDSCH is added or removed by the terminal to or from the HARQ-ACK codebook transmitted on the PUCCH or the PUSCH; or
  in the condition that a PDCCH is sent, and the PDCCH indicates a new HARQ-ACK timing of the SPS PDSCH: before it is determined that the new HARQ-ACK timing takes effect, determine, according to an original HARQ-ACK timing of the SPS PDSCH, that the HARQ-ACK of the SPS PDSCH is added or removed by the terminal to or from the HARQ-ACK codebook, or before it is determined that the new HARQ-ACK timing takes effect, determine, according to the original HARQ-ACK timing of the SPS PDSCH, that the HARQ-ACK of the SPS PDSCH is added or removed by the terminal to or from the HARQ-ACK codebook, and determine, according to the new HARQ-ACK timing of the SPS PDSCH, that the HARQ-ACK of the SPS PDSCH is added or removed by the terminal to or from the HARQ-ACK codebook; and after it is determined that the new HARQ-ACK timing takes effect, determine, according to the new HARQ-ACK timing of the SPS PDSCH, that the HARQ-ACK of the SPS PDSCH is added or removed by the terminal to or from the HARQ-ACK codebook.

In one embodiment, the processor 300 is In one embodiment configured to: determine, according to whether a set of downlink transmission corresponding to time at which the HARQ-ACK codebook is transmitted includes a transmission occasion of the SPS PDSCH, whether the HARQ-ACK of the SPS PDSCH is added by the terminal to the HARQ-ACK codebook transmitted on the PUCCH or the PUSCH.

In one embodiment, the processor 300 is In one embodiment configured to: determine, in the condition that the set of downlink transmission corresponding to the time at which the HARQ-ACK codebook is transmitted includes the transmission occasion of the SPS PDSCH, that the HARQ-ACK of the SPS PDSCH is added by the terminal to the HARQ-ACK codebook transmitted on the PUCCH or the PUSCH.

In one embodiment, the set of downlink transmission corresponding to the time at which the HARQ-ACK codebook is transmitted is determined by the processor according to one of the following modes.

Mode 1: the set is determined according to a predefined or pre-configured set of the HARQ-ACK timing.

Mode 2: the set is determined according to HARQ-ACK timing indicated by an HARQ-ACK timing indication field in DCI used by a plurality of received PDCCHs performing HARQ-ACK feedback at the time when the HARQ-ACK codebook is transmitted.

Mode 3: the set is determined according to a predefined or pre-configured set of the HARQ-ACK timing, and a predefined or pre-configured set of downlink scheduling timing.

Mode 4: the set is determined according to HARQ-ACK timing indicated by an HARQ-ACK timing indication field in DCI used by a plurality of received PDCCHs performing HARQ-ACK feedback at the time when the HARQ-ACK codebook is transmitted, and a maximum value and a minimum value of downlink scheduling timing indicated by or corresponding to the plurality of PDCCHs.

In one embodiment, the downlink transmission is a PDSCH or a PDCCH indicating downlink SPS release.

In one embodiment, the processor 300 is In one embodiment configured to:
  in the condition that the PDCCH is sent, and a subsequent transmission occasion of the SPS PDSCH determined according to the PDCCH is different from a subsequent transmission occasion of the SPS PDSCH determined according to a PDCCH indicating resource activation of the downlink SPS: determine, according to a relationship between an original transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook, and determine, by the device, according to a relationship between a new transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook; or
  in the condition that the PDCCH is sent, and a new transmission occasion of the SPS PDSCH determined according to the PDCCH is different from an original transmission occasion of the SPS PDSCH determined according to a PDCCH indicating resource activation of downlink SPS: before it is determined that the new transmission occasion of the SPS PDSCH takes effect, determine, according to a relationship between the original transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook, or before it is determined that the new transmission occasion of the SPS PDSCH takes effect, determine, according to a relationship between the original transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook, and determine, according to a relationship between the new transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook; and after it is determined that the new transmission occasion of the SPS PDSCH takes effect, determine, according to a relationship between the new transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook.

In one embodiment, the processor 300 is In one embodiment configured to: determine, after it is determined that the SPS PDSCH of the terminal is activated, that the HARQ-ACK of the SPS PDSCH is added or removed by the terminal to or from the HARQ-ACK codebook transmitted on the PUCCH or the PUSCH.

In one embodiment, the processor 300 is In one embodiment configured to: determine, in the condition that SPS transmission is configured for the terminal, that the HARQ-ACK of the SPS PDSCH is added by the terminal to the HARQ-ACK codebook transmitted on the PUCCH or the PUSCH.

In one embodiment, the processor 300 is In one embodiment configured to:
  determine that X-bit HARQ-ACK of the SPS PDSCH is added or removed by the terminal at a predetermined position of the HARQ-ACK codebook, and X is the bit number of HARQ-ACK corresponding to one SPS PDSCH, and is a positive integer; or
  determine that Y*X-bit HARQ-ACK of the SPS PDSCH or $$\sum_{i=1}^{Y} X_i$$

-bit HARQ-ACK of the SPS PDSCH are added or removed by the terminal at a predetermined position of the HARQ-ACK codebook, and X is the bit number of HARQ-ACK corresponding to one SPS PDSCH, and is a value greater than or equal to 1, $X_i$ is the bit number of HARQ-ACK corresponding to one SPS PDSCH of Y SPS PDSCHs, Y is the number of SPS PDSCHs for transmitting HARQ-ACK of the SPS PDSCH and the HARQ-ACK codebook at the same time determined according to HARQ-ACK timing of the corresponding SPS PDSCH in a carrier, a cell or a BWP with activated SPS of the terminal, or the number of a carrier, or a cell or a BWP for transmitting HARQ-ACK of an SPS PDSCH and the HARQ-ACK codebook at the same time determined according to HARQ-ACK timing of the corresponding SPS PDSCH, or Y is the number of a transmission occasion of the SPS PDSCH contained in a set of downlink transmission corresponding to the time at which the HARQ-ACK codebook is transmitted in a carrier or a cell or a BWP with activated SPS of the terminal, or the number of a carrier or a cell or a BWP with a transmission occasion of the SPS PDSCH contained in a set of downlink transmission corresponding to the time at which the HARQ-ACK codebook is transmitted, or Y is the number of a carrier, a cell or a BWP with configured SPS transmission of the terminal, and is a positive integer.

Figure 4:
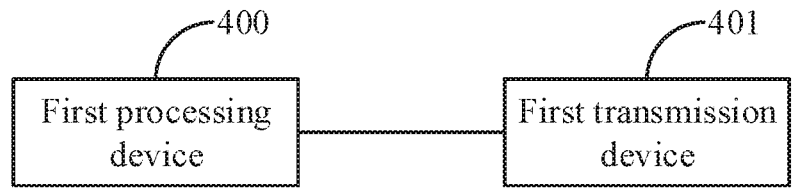
FIG. 4 is a schematic structural diagram of a terminal in an embodiment of the present application.

As shown in FIG. 4, a terminal in an embodiment of the present application includes:
  a first processing device 400, configured to add or remove HARQ-ACK of an SPS PDSCH to or from an HARQ-ACK codebook transmitted on a PUCCH or a PUSCH.
  a first transmission device 401, configured to transmit a processed HARQ-ACK codebook.

In one embodiment, the HARQ-ACK codebook is a semi-static codebook or a dynamic codebook.

In one embodiment, the SPS PDSCH is a PDSCH without a corresponding PDCCH.

In one embodiment, the first processing device 400 is In one embodiment configured to:
  add or remove the HARQ-ACK of the SPS PDSCH to or from the HARQ-ACK codebook according to HARQ-ACK timing of the SPS PDSCH.

In one embodiment, the first processing device 400 is In one embodiment configured to:

add, in the condition that it is determined that the HARQ-ACK of the SPS PDSCH and the HARQ-ACK codebook are transmitted at the same time according to the HARQ-ACK timing of the SPS PDSCH, the HARQ-ACK of the SPS PDSCH to the HARQ-ACK codebook.

In one embodiment, the first processing device 400 is In one embodiment configured to:
add, in the condition that the HARQ-ACK codebook is transmitted at time n and time n−k is the time at which the terminal receives the SPS PDSCH, the HARQ-ACK of the SPS PDSCH to the HARQ-ACK codebook, and k is the HARQ-ACK timing of the SPS PDSCH; or
add, in the condition that transmission time of the SPS PDSCH is n, the HARQ-ACK of the SPS PDSCH to the HARQ-ACK codebook transmitted at transmission time n+k, and k is the HARQ-ACK timing of the SPS PDSCH.

In one embodiment, the first processing device 400 is In one embodiment configured to:
remove, in the condition that it is determined that the HARQ-ACK of the SPS PDSCH and the HARQ-ACK codebook are transmitted at different time according to the HARQ-ACK timing of the SPS PDSCH, the HARQ-ACK of the SPS PDSCH from the HARQ-ACK codebook.

In one embodiment, the first processing device 400 is In one embodiment configured to:
remove, in the condition that the HARQ-ACK codebook is transmitted at time n and time n−k is not the time at which the terminal receives the SPS PDSCH, the HARQ-ACK of the SPS PDSCH from the HARQ-ACK codebook, and k is the HARQ-ACK timing of the SPS PDSCH;
or
remove, in the condition that transmission time of the SPS PDSCH is n, the HARQ-ACK of the SPS PDSCH from an HARQ-ACK codebook not transmitted at time n+k, and k is the HARQ-ACK timing of the SPS PDSCH.

In one embodiment, the first processing device 400 is In one embodiment configured to:
in the condition that a PDCCH is received, and a new HARQ-ACK feedback position of the SPS PDSCH determined according to the PDCCH is different from an original HARQ-ACK feedback position of the SPS PDSCH determined according to a PDCCH indicating activation of downlink SPS: add or remove, according to a relationship between the original HARQ-ACK feedback position of the SPS PDSCH and the HARQ-ACK codebook, the HARQ-ACK of the SPS PDSCH to or from the HARQ-ACK codebook, and add or remove, according to a relationship between the new HARQ-ACK feedback position of the SPS PDSCH and the HARQ-ACK codebook, the HARQ-ACK of the SPS PDSCH to or from the HARQ-ACK codebook; or
in the condition that a PDCCH is received, and a new HARQ-ACK feedback position of the SPS PDSCH determined according to the PDCCH is different from an original HARQ-ACK feedback position of the SPS PDSCH determined according to a PDCCH indicating activation of downlink SPS: before it is determined that the new HARQ-ACK feedback position of the SPS PDSCH takes effect, add or remove, according to a relationship between the original HARQ-ACK feedback position of the SPS PDSCH and the HARQ-ACK codebook, the HARQ-ACK of the SPS PDSCH to or from the HARQ-ACK codebook; or before it is determined that the new HARQ-ACK feedback position of the SPS PDSCH takes effect, add or remove, according to a relationship between the original HARQ-ACK feedback position of the SPS PDSCH and the HARQ-ACK codebook, the HARQ-ACK of the SPS PDSCH to or from the HARQ-ACK codebook, and add or remove, according to a relationship between the new HARQ-ACK feedback position of the SPS PDSCH and the HARQ-ACK codebook, the HARQ-ACK of the SPS PDSCH to or from the HARQ-ACK codebook, and after it is determined that the new HARQ-ACK feedback position of the SPS PDSCH takes effect, add or remove, according to a relationship between the new HARQ-ACK feedback position of the SPS PDSCH and the HARQ-ACK codebook, the HARQ-ACK of the SPS PDSCH to or from the HARQ-ACK codebook; or
after a new HARQ-ACK timing of the SPS PDSCH is received on a PDCCH: add or remove, according to an original HARQ-ACK timing of the SPS PDSCH, the HARQ-ACK of the SPS PDSCH to or from the HARQ-ACK codebook; and add or remove, according to the new HARQ-ACK timing of the SPS PDSCH, the HARQ-ACK of the SPS PDSCH to or from the HARQ-ACK codebook; or
after a new HARQ-ACK timing of the SPS PDSCH is received on a PDCCH: before it is determined that the new HARQ-ACK timing takes effect, add or remove, according to an original HARQ-ACK timing of the SPS PDSCH, the HARQ-ACK of the SPS PDSCH to or from the HARQ-ACK codebook, or before it is determined that the new HARQ-ACK timing takes effect, add or remove, according to an original HARQ-ACK timing of the SPS PDSCH, the HARQ-ACK of the SPS PDSCH to or from the HARQ-ACK codebook, and add or remove, according to the new HARQ-ACK timing of the SPS PDSCH, the HARQ-ACK of the SPS PDSCH to or from the HARQ-ACK codebook; and after it is determined that the new HARQ-ACK timing takes effect, add or remove, according to the new HARQ-ACK timing of the SPS PDSCH, the HARQ-ACK of the SPS PDSCH to or from the HARQ-ACK codebook.

In one embodiment, the first processing device 400 is In one embodiment configured to:
determine, according to whether a set of downlink transmission corresponding to time at which the HARQ-ACK codebook is transmitted includes a transmission occasion of the SPS PDSCH, whether the HARQ-ACK of the SPS PDSCH is added to the HARQ-ACK codebook.

In one embodiment, the first processing device 400 is In one embodiment configured to:
add or remove, in the condition that the set of downlink transmission corresponding to the time at which the HARQ-ACK codebook is transmitted includes the transmission occasion of the SPS PDSCH, the HARQ-ACK of the SPS PDSCH to or from the HARQ-ACK codebook.

In one embodiment, the set of downlink transmission corresponding to the time at which the HARQ-ACK codebook is transmitted is determined by a processor according to one of the following modes.

Mode 1: the set is determined according to a predefined or pre-configured set of the HARQ-ACK timing.

Mode 2: the set is determined according to HARQ-ACK timing indicated by an HARQ-ACK timing indication field in DCI used by a plurality of received PDCCHs performing HARQ-ACK feedback at the time when the HARQ-ACK codebook is transmitted.

Mode 3: the set is determined according to a predefined or pre-configured set of the HARQ-ACK timing, and a predefined or pre-configured set of downlink scheduling timing.

Mode 4: the set is determined according to HARQ-ACK timing indicated by an HARQ-ACK timing indication field in DCI used by a plurality of received PDCCHs performing HARQ-ACK feedback at the time when the HARQ-ACK codebook is transmitted, and a maximum value and a minimum value of downlink scheduling timing indicated by or corresponding to the plurality of PDCCHs.

In one embodiment, the downlink transmission is a PDSCH or a PDCCH indicating downlink SPS release.

In one embodiment, the first processing device 400 is In one embodiment configured to:
  in the condition that a PDCCH is received, and a subsequent transmission occasion of the SPS PDSCH determined according to the PDCCH is different from a subsequent transmission occasion of the SPS PDSCH determined according to a PDCCH indicating resource activation of downlink SPS: add or remove, according to a relationship between an original transmission occasion of the SPS PDSCH and the set of downlink transmission corresponding to the time at which the HARQ-ACK codebook is transmitted, the HARQ-ACK of the SPS PDSCH to or from the HARQ-ACK codebook, and add or remove, according to a relationship between a new transmission occasion of the SPS PDSCH and the set of downlink transmission corresponding to the time at which the HARQ-ACK codebook is transmitted, the HARQ-ACK of the SPS PDSCH to or from the HARQ-ACK codebook; or
  in the condition that a PDCCH is received, and a new transmission occasion of the SPS PDSCH determined according to the PDCCH is different from an original transmission occasion of the SPS PDSCH determined according to a PDCCH indicating resource activation of downlink SPS: before it is determined that the new transmission occasion of the SPS PDSCH takes effect, add or remove, according to a relationship between the original transmission occasion of the SPS PDSCH and the set of downlink transmission corresponding to the time at which the HARQ-ACK codebook is transmitted, the HARQ-ACK of the SPS PDSCH to or from the HARQ-ACK codebook, or before it is determined that the new transmission occasion of the SPS PDSCH takes effect, add or remove, according to a relationship between the original transmission occasion of the SPS PDSCH and the set of downlink transmission corresponding to the time at which the HARQ-ACK codebook is transmitted, the HARQ-ACK of the SPS PDSCH to or from the HARQ-ACK codebook, and add or remove, according to a relationship between the new transmission occasion of the SPS PDSCH and the set of downlink transmission corresponding to the time at which the HARQ-ACK codebook is transmitted, the HARQ-ACK of the SPS PDSCH to or from the HARQ-ACK codebook; and after it is determined that the new transmission occasion of the SPS PDSCH takes effect, add or remove, according to a relationship between the new transmission occasion of the SPS PDSCH and the set of downlink transmission corresponding to the time at which the HARQ-ACK codebook is transmitted, the HARQ-ACK of the SPS PDSCH to or from the HARQ-ACK codebook.

In one embodiment, the first processing device 400 is further configured to:
  add or remove, after it is determined that the SPS PDSCH is activated, the HARQ-ACK of the SPS PDSCH to or from the HARQ-ACK codebook transmitted on the PUCCH or the PUSCH.

In one embodiment, the first processing device 400 is In one embodiment configured to:
  add, in the condition that SPS transmission is configured, the HARQ-ACK of the SPS PDSCH to the HARQ-ACK codebook.

In one embodiment, the first processing device 400 is In one embodiment configured to:
  add or remove X-bit HARQ-ACK of the SPS PDSCH at a predetermined position of the HARQ-ACK codebook, and X is the bit number of HARQ-ACK corresponding to one SPS PDSCH, and is a positive integer; or
  add or remove Y*X-bit HARQ-ACK of the SPS PDSCH or add or remove $$\sum_{i=1}^{Y} X_i$$

-bit HARQ-ACK of the SPS PDSCH at a predetermined position of the HARQ-ACK codebook, and X is the bit number of HARQ-ACK corresponding to one SPS PDSCH, and is a value greater than or equal to 1, $X_i$ is the bit number of HARQ-ACK corresponding to one SPS PDSCH of Y SPS PDSCHs, Y is the number of SPS PDSCHs for transmitting HARQ-ACK of the SPS PDSCH and the HARQ-ACK codebook at the same time determined according to HARQ-ACK timing of the corresponding SPS PDSCH in a carrier, a cell or a bandwidth part BWP with activated SPS of the terminal, or Y is the number of a carrier, or a cell or a BWP for transmitting HARQ-ACK of an SPS PDSCH and the HARQ-ACK codebook at the same time determined according to HARQ-ACK timing of the corresponding SPS PDSCH, or Y is the number of a transmission occasion of the SPS PDSCH contained in a set of downlink transmission corresponding to the time at which the HARQ-ACK codebook is transmitted in a carrier or a cell or a BWP with activated SPS of the terminal, or Y is the number of a carrier or a cell or a BWP with a transmission occasion of the SPS PDSCH contained in a set of downlink transmission corresponding to the time at which the HARQ-ACK codebook is transmitted, or Y is the number of a carrier, a cell or a BWP with configured SPS transmission of the terminal, and is a positive integer.

Figure 5:
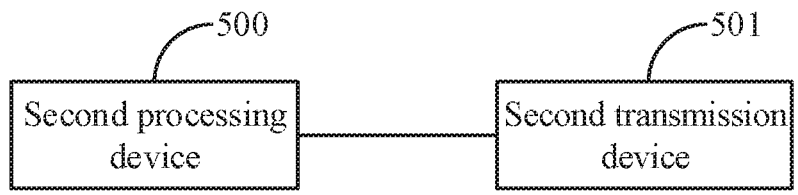
FIG. 5 is a schematic structural diagram of a network side device in an embodiment of the present application.

As shown in FIG. 5, a network side device in an embodiment of the present application includes:
  a second processing device 500, configured to determine that HARQ-ACK of an SPS PDSCH is added or removed by a terminal to or from an HARQ-ACK codebook transmitted on a PUCCH or a PUSCH; and
  a second transmission device 501, configured to receive, according to a determined result, an HARQ-ACK codebook sent by the terminal.

In one embodiment, the HARQ-ACK codebook is a semi-static codebook or a dynamic codebook.

In one embodiment, the SPS PDSCH is a PDSCH without a corresponding PDCCH.

In one embodiment, the second processing device 500 is In one embodiment configured to:

determine, according to HARQ-ACK timing of the SPS PDSCH, that the HARQ-ACK of the SPS PDSCH is added or removed by the terminal to or from the HARQ-ACK codebook.

In one embodiment, the second processing device 500 is In one embodiment configured to:
determine, when it is determined that the HARQ-ACK of the SPS PDSCH and the HARQ-ACK codebook are transmitted at the same time according to the HARQ-ACK timing of the SPS PDSCH, that the HARQ-ACK of the SPS PDSCH is added by the terminal to the HARQ-ACK codebook.

In one embodiment, the second processing device 500 is In one embodiment configured to:
determine, in the condition that the HARQ-ACK codebook is transmitted at time n and time n−k is the time at which the terminal receives the SPS PDSCH, that the HARQ-ACK of the SPS PDSCH is added by the terminal to the HARQ-ACK codebook, and k is the HARQ-ACK timing of the SPS PDSCH; or determine, in the condition that transmission time of the SPS PDSCH is n, that the HARQ-ACK of the SPS PDSCH is added by the terminal to the HARQ-ACK codebook transmitted at transmission time n+k, and k is the HARQ-ACK timing of the SPS PDSCH.

In one embodiment, the second processing device 500 is In one embodiment configured to:
determine, in the condition that it is determined that the HARQ-ACK of the SPS PDSCH and the HARQ-ACK codebook are transmitted at different time according to the HARQ-ACK timing of the SPS PDSCH, that the HARQ-ACK of the SPS PDSCH is removed by the terminal from the HARQ-ACK codebook.

In one embodiment, the second processing device 500 is In one embodiment configured to:
determine, in the condition that the HARQ-ACK codebook is transmitted at time n and time n−k is not the time at which the terminal receives the SPS PDSCH, that the HARQ-ACK of the SPS PDSCH is removed by the terminal from the HARQ-ACK codebook, and k is the HARQ-ACK timing of the SPS PDSCH; or determine, when transmission time of the SPS PDSCH is n, that the HARQ-ACK of the SPS PDSCH is removed by the terminal from an HARQ-ACK codebook not transmitted at time n+k, and k is the HARQ-ACK timing of the SPS PDSCH.

In one embodiment, the second processing device 500 is In one embodiment configured to:
in the condition that a PDCCH is sent, and a new HARQ-ACK feedback position of the SPS PDSCH determined according to the PDCCH is different from an original HARQ-ACK feedback position of the SPS PDSCH determined according to a PDCCH indicating activation of downlink SPS: determine, according to a relationship between the original HARQ-ACK feedback position of the SPS PDSCH and the HARQ-ACK codebook, that the HARQ-ACK of the SPS PDSCH is added or removed by the terminal to or from the HARQ-ACK codebook, and determine, according to a relationship between the new HARQ-ACK feedback position of the SPS PDSCH and the HARQ-ACK codebook, that the HARQ-ACK of the SPS PDSCH is added or removed to or from the HARQ-ACK codebook; or in the condition that a PDCCH is sent, and a new HARQ-ACK feedback position of the SPS PDSCH determined according to the PDCCH is different from an original HARQ-ACK feedback position of the SPS PDSCH determined according to a PDCCH indicating activation of downlink SPS: before it is determined that the new HARQ-ACK feedback position of the SPS PDSCH takes effect, determine, according to a relationship between the original HARQ-ACK feedback position of the SPS PDSCH and the HARQ-ACK codebook, that the HARQ-ACK of the SPS PDSCH is added or removed by the terminal to or from the HARQ-ACK codebook; or before it is determined that the new HARQ-ACK feedback position of the SPS PDSCH takes effect, determine, according to a relationship between the original HARQ-ACK feedback position of the SPS PDSCH and the HARQ-ACK codebook, that the HARQ-ACK of the SPS PDSCH is added or removed by the terminal to or from the HARQ-ACK codebook, and determine, according to a relationship between the new HARQ-ACK feedback position of the SPS PDSCH and the HARQ-ACK codebook, that the HARQ-ACK of the SPS PDSCH is added or removed by the terminal to or from the HARQ-ACK codebook; and after it is determined that the new HARQ-ACK feedback position of the SPS PDSCH takes effect, determine, according to a relationship between the new HARQ-ACK feedback position of the SPS PDSCH and the HARQ-ACK codebook, that the HARQ-ACK of the SPS PDSCH is added or removed to or from the HARQ-ACK codebook; or in the condition that a PDCCH is sent, and the PDCCH indicates a new HARQ-ACK timing of the SPS PDSCH, determine, according to an original HARQ-ACK timing of the SPS PDSCH, that the HARQ-ACK of the SPS PDSCH is added or removed by the terminal to or from the HARQ-ACK codebook transmitted on the PUCCH or the PUSCH; and determine, according to the new HARQ-ACK timing of the SPS PDSCH, that the HARQ-ACK of the SPS PDSCH is added or removed by the terminal to or from the HARQ-ACK codebook transmitted on the PUCCH or the PUSCH; or in the condition that a PDCCH is sent, and after the PDCCH indicates a new HARQ-ACK timing of the SPS PDSCH: before it is determined that the new HARQ-ACK timing takes effect, determine, according to an original HARQ-ACK timing of the SPS PDSCH, that the HARQ-ACK of the SPS PDSCH is added or removed by the terminal to or from the HARQ-ACK codebook; or before it is determined that the new HARQ-ACK timing takes effect, determine, according to the original HARQ-ACK timing of the SPS PDSCH, that the HARQ-ACK of the SPS PDSCH is added or removed by the terminal to or from the HARQ-ACK codebook, and determine, according to the new HARQ-ACK timing of the SPS PDSCH, that the HARQ-ACK of the SPS PDSCH is added or removed by the terminal to or from the HARQ-ACK codebook; and after it is determined that the new HARQ-ACK timing takes effect, determine according to the new HARQ-ACK timing of the SPS PDSCH, that the HARQ-ACK of the SPS PDSCH is added or removed by the terminal to or from the HARQ-ACK codebook.

In one embodiment, the second processing device 500 is In one embodiment configured to:
determine, according to whether a set of downlink transmission corresponding to time at which the HARQ-ACK codebook is transmitted includes a transmission occasion of the SPS PDSCH, whether the HARQ-ACK of the SPS PDSCH is added by the terminal to the HARQ-ACK codebook transmitted on the PUCCH or the PUSCH.

In one embodiment, the second processing device 500 is In one embodiment configured to:
  determine, in the condition that the set of downlink transmission corresponding to the time at which the HARQ-ACK codebook is transmitted includes the transmission occasion of the SPS PDSCH, that the HARQ-ACK of the SPS PDSCH is added by the terminal to the HARQ-ACK codebook.

In one embodiment, the set of downlink transmission corresponding to the time at which the HARQ-ACK codebook is transmitted is determined by a processor according to one of the following modes.
  Mode 1: the set is determined according to a predefined or pre-configured set of the HARQ-ACK timing.
  Mode 2: the set is determined according to HARQ-ACK timing indicated by an HARQ-ACK timing indication field in DCI used by a plurality of received PDCCHs performing HARQ-ACK feedback at the time when the HARQ-ACK codebook is transmitted.
  Mode 3: the set is determined according to a predefined or pre-configured set of the HARQ-ACK timing, and a predefined or pre-configured set of downlink scheduling timing.
  Mode 4: the set is determined according to HARQ-ACK timing indicated by an HARQ-ACK timing indication field in DCI used by a plurality of received PDCCHs performing HARQ-ACK feedback at the time when the HARQ-ACK codebook is transmitted, and a maximum value and a minimum value of downlink scheduling timing indicated by or corresponding to the plurality of PDCCHs.

In one embodiment, the downlink transmission is a PDSCH or a PDCCH indicating downlink SPS release.

In one embodiment, the second processing device 500 is In one embodiment configured to:
  in the condition that the PDCCH is sent, and a subsequent transmission occasion of the SPS PDSCH determined according to the PDCCH is different from a subsequent transmission occasion of the SPS PDSCH determined according to a PDCCH indicating resource activation of the downlink SPS: determine, by the device, according to a relationship between an original transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook, and
  determine, according to a relationship between a new transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook; or
  in the condition that the PDCCH is sent, and a new transmission occasion of the SPS PDSCH determined according to the PDCCH is different from an original transmission occasion of the SPS PDSCH determined according to a PDCCH indicating resource activation of downlink SPS: before it is determined that the new transmission occasion of the SPS PDSCH takes effect, determine, by the device, according to a relationship between the original transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook; or before it is determined that the new transmission occasion of the SPS PDSCH takes effect, determine, according to a relationship between the original transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook, and determine, according to a relationship between the new transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook; and after it is determined that the new transmission occasion of the SPS PDSCH takes effect, determine, according to a relationship between the new transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook.

In one embodiment, the second processing device 500 is In one embodiment configured to:
  add or remove, by the terminal, the HARQ-ACK of the SPS PDSCH to or from the HARQ-ACK codebook transmitted on the PUCCH or the PUSCH after it is determined that the SPS PDSCH of the terminal is activated.

In one embodiment, the second processing device 500 is In one embodiment configured to:
  determine, in the condition that SPS transmission is configured for the terminal, that the HARQ-ACK of the SPS PDSCH is added by the terminal to the HARQ-ACK codebook transmitted on the PUCCH or the PUSCH.

In one embodiment, the second processing device 500 is In one embodiment configured to:
  determine that X-bit HARQ-ACK of the SPS PDSCH is added or removed by the terminal at a predetermined position of the HARQ-ACK codebook, and X is the bit number of HARQ-ACK corresponding to one SPS PDSCH, and is a positive integer; or
  determine that, Y*X-bit HARQ-ACK of the SPS PDSCH or $$\sum_{i=1}^{Y} X_i$$

-bit HARQ-ACK of the SPS PDSCH are added or removed by the terminal at a predetermined position of the HARQ-ACK codebook, and X is the bit number of HARQ-ACK corresponding to one SPS PDSCH, and is a value greater than or equal to 1, $X_i$ is the bit number of HARQ-ACK corresponding to one SPS PDSCH of Y SPS PDSCHs, Y is the number of SPS PDSCHs for transmitting HARQ-ACK of the SPS PDSCH and the HARQ-ACK codebook at the same time determined according to HARQ-ACK timing of the corresponding SPS PDSCH in a carrier, a cell or a BWP with activated SPS of the terminal, or Y is the number of a carrier, or a cell or a BWP for transmitting HARQ-ACK of the SPS PDSCH and the HARQ-ACK codebook at the same time determined according to HARQ-ACK timing of the corresponding SPS PDSCH, or Y is the number of a transmission occasion of the SPS PDSCH contained in a set of downlink transmission corresponding to the time at which the HARQ-ACK codebook is transmitted in a carrier or a cell or a BWP with activated SPS of the terminal, or Y is the number of a carrier or a cell or a BWP with a transmission occasion of the SPS PDSCH contained in a set of downlink transmission corresponding to the time at which the HARQ-ACK codebook is transmitted, or Y is the number of a carrier, a cell or a BWP with configured SPS transmission of the terminal, and is a positive integer.

An embodiment of the present application provides a readable storage medium. The readable storage medium is a non-volatile storage medium. The readable storage medium is a non-volatile readable storage medium, including a program code. When run on a computing device, the program code is used to cause the computing device to execute the action of performing hybrid automatic repeat request feedback of the above terminal.

An embodiment of the present application provides a readable storage medium. The readable storage medium is a non-volatile storage medium. The readable storage medium is a non-volatile readable storage medium, including a program code. When run on a computing device, the program code is used to cause the computing device to execute the action of t performing hybrid automatic repeat request feedback of the above network side device.

An embodiment of the present application provides a computer program product containing an instruction. The instruction, when run on a computer, causes the computer to execute the action of performing hybrid automatic repeat request feedback of the above terminal.

An embodiment of the present application provides a computer program product containing an instruction. The instruction, when run on a computer, causes the computer to execute the action of performing hybrid automatic repeat request feedback of the above network side device.

A few examples are enumerated below to describe in detail solutions of the embodiments of the present application.

Embodiment 1: it is assumed that a predefined or pre-configured set of downlink HARQ-ACK timing of a terminal is K1={1, 2, 3, 4, 5, 6, 7, 8}, that is to say, a PDSCH transmitted in slot n or a PDCCH indicating downlink SPS release may perform HARQ-ACK feedback in slot n+k, where k□{1, 2, 3, 4, 5, 6, 7, 8}.

Figure 6:
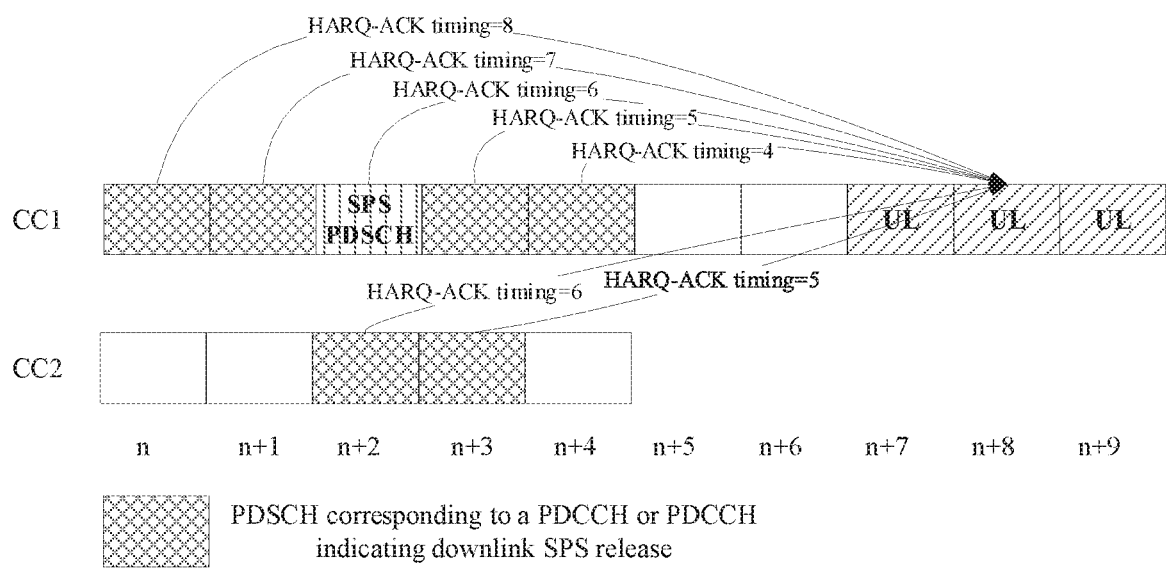
FIG. 6 is a schematic diagram of six PDSCHs performing feedback in an embodiment of the present application.

According to the definition of a dynamic codebook, 6 PDSCHs shown in FIG. 6 need to perform HARQ-ACK feedback in the same slot, and according to a DAI domain (C-DAI and/or T-DAI) in a DCI format used by a PDCCH corresponding to the PDSCHs, HARQ-ACK codebooks for these PDSCHs are determined. It is assumed that each PDSCH is of single TB transmission, 6-bit HARQ-ACK codebooks are generated. It is assumed that the terminal has SPS configuration, and the SPS transmission has been activated, for example, a transmission occasion of an SPS PDSCH is slot n+2 on CC1, and HARQ-ACK timing of the SPS PDSCH is k=6, that is to say, HARQ-ACK feedback is performed in slot n+2+6=n+8.

Then, when the above method 1 is used, the condition is as follows.

According to the HARQ-ACK timing of the SPS PDSCH, it is determined that the SPS PDSCH in slot n+2 only needs to perform HARQ-ACK feedback in slot n+8, or it is determined that slot n+8-k=n+2 is a transmission occasion of the SPS PDSCH, only HARQ-ACK corresponding to the SPS PDSCH is added to an HARQ-ACK codebook in slot n+8.

For other UL slots such as slot n+7 and slot n+9, in these slots, a method similar to that in slot n+8 may also determine a corresponding HARQ-ACK codebook that needs to be transmitted in the slot. At this time, on the basis of the HARQ-ACK timing of the SPS PDSCH, it is determined that the slot is not the slot for HARQ-ACK transmission of the SPS PDSCH, that is to say, slot n+7-k=n+1 is not a transmission occasion of the SPS PDSCH, that is to say, slot n+9-k=n+3 is not the transmission occasion of the SPS PDSCH, it is not necessary to add the HARQ-ACK of the SPS PDSCH in this slot, reducing redundant transmission of the HARQ-ACK of the SPS PDSCH in a system.

In a possible implementation, in the condition that UE receives a PDCCH indication to change HARQ-ACK timing of the SPS PDSCH in slot n+2, for example, k=5, due to the fact that the UE may lose the PDCCH, in order to avoid inconsistent understanding of a size of an HARQ-ACK codebook by a base station with UE, it is necessary to determine whether the HARQ-ACK of the SPS PDSCH is added for two timing of k=4 and k=5. That is to say, for k=4, it is necessary to add the HARQ-ACK of the SPS PDSCH to an HARQ-ACK codebook in slot n+8 according to the above steps. For k=5, it is necessary to add the HARQ-ACK of the SPS PDSCH to an HARQ-ACK codebook in slot n+7 according to steps similar to the above steps.

For UL slots which exclude slot n+8 and slot n+7 and do not have a corresponding timing relationship with the SPS PDSCH, for example, slot n+9, the HARQ-ACK of the SPS PDSCH may not be added to a corresponding HARQ-ACK codebook thereof. Of course, the above operation may be performed only for a newly indicated HARQ-ACK timing, at this time, it is equivalent to that the UE will not lose the PDCCH, or the base station blindly checks the size of the HARQ-ACK codebook to determine whether the UE has lost the PDCCH.

When the above method 2 is used, the condition is as follows.

According to a predefined or pre-configured set of HARQ-ACK timing, it is determined that a set of downlink transmission corresponding to slot n+8 is from slot n (namely n+8−8) to slot n+7 (namely n+8−1); or according to a maximum HARQ-ACK timing (namely the HARQ-ACK timing=8 in FIG. 6) and a minimum HARQ-ACK timing (namely the HARQ-ACK timing=4 in FIG. 6) indicated by a plurality of received PDCCHs performing HARQ-ACK feedback In one embodiment in slot n+8, it is determined that the set of the downlink transmission corresponding to slot n+8 is from slot n (namely n+8−8) to slot n+4 (namely n+8−4); or according to a maximum value (for example 8) and a minimum value (for example 1) in the predefined or pre-configured set of the HARQ-ACK timing, and a maximum value (for example 3) and a minimum value (for example 0) of a predefined or pre-configured set of downlink scheduling timing, it is determined that a set of downlink transmission corresponding to slot n+8 is from slot n−3 (namely n+8−8−3) to slot n+7 (namely n+8−1−0); or according to the maximum HARQ-ACK timing (namely the HARQ-ACK timing=8 in FIG. 6) and the minimum HARQ-ACK timing (namely the HARQ-ACK timing=4 in FIG. 6) indicated by the plurality of received PDCCHs performing the HARQ-ACK feedback In one embodiment in slot n+8, and a maximum scheduling timing (for example, assuming that scheduling signaling of slot n is detected in slot n−3, a scheduling timing indicated by a PDCCH in slot n−3 is 3) and a minimum scheduling timing (for example, assuming that scheduling signaling of slot n=4 is detected in slot n+4, then a scheduling timing indicated by a PDCCH in slot n+4 is 0) indicated by the received PDCCHs, it is determined that the set of downlink transmission corresponding to slot n+8 is from slot n−3 (namely n+8−8−3) to slot n+4 (namely n+8−4−0).

Then, it is determined that the set includes a transmission occasion of the SPS PDSCH, namely slot n+2, so it is necessary to add HARQ-ACK of the SPS PDSCH to an HARQ-ACK codebook.

When the above method 3 is used, the condition is as follows.

Since an interval of SPS transmission is configured for the terminal, no matter whether SPS is activated, that is to say, no matter whether the terminal receives a PDCCH indicating activation of a downlink SPS PDSCH, HARQ-ACK of the SPS PDSCH is added to each HARQ-ACK codebook; that is, when the terminal needs to separately transmit corresponding HARQ-ACK codebooks in slot n+7 and slot n+8, it is necessary to add the HARQ-ACK of the SPS PDSCH to each HARQ-ACK codebook.

This method has redundant HARQ-ACK of an SPS PDSCH, because according to a given HARQ-ACK timing of the SPS PDSCH, only HARQ-ACK of the SPS PDSCH transmitted in the slot corresponding to the HARQ-ACK timing of the SPS PDSCH is valid, and others are used for placeholding.

However, because the SPS PDSCH may be scheduled by using an RNTI scrambled PDCCH or a C-RNTI scrambled PDCCH corresponding to an SPS service in a transmission process, for example, SPS PDSCH repeat scheduling, or change of transmission resources of the SPS PDSCH, or because there is dynamic DL-SCH needing to occupy an SPS resource for transmission, a dynamic PDSCH is scheduled through C-RNTI to simultaneously carrying both dynamic DL-SCH and SPS data. At this time, the above PDCCH can change an original transmission position and HARQ-ACK timing of the SPS PDSCH. If packet loss of the PDCCH occurs on a terminal side, the terminal cannot determine an updated transmission position and/or an updated HARQ-ACK timing of the SPS PDSCH. When determination is performed according to the above method 1 and the above method 2, the terminal and the base station may have inconsistent understanding of whether the HARQ-ACK of the SPS PDSCH is added, resulting in incorrect transmission of the HARQ-ACK. Therefore, the above-mentioned placeholding transmission may avoid such errors.

In the above various methods, when the HARQ-ACK of the SPS PDSCH is added, for example, in this embodiment, only one SPS PDSCH exists on CC1 among a plurality of CCs, and the SPS PDSCH uses single TB transmission, then only 1-bit HARQ-ACK of the SPS PDSCH is added, and 1-bit HARQ-ACK may be added to the front or back of a determined 6-bit HARQ-ACK codebook.

Of course, in the condition that SPS PDSCHs exist on the plurality of CCs, each CC may be determined according to the above manner. Transmission slots, transmission intervals and HARQ-ACK timing of the SPS PDSCHs on different CCs may be the same or different.

If they are different, each SPS PDSCH needs to independently determine whether HARQ-ACK of an SPS PDSCH needs to be added to an HARQ-ACK codebook.

Embodiment 2: it is assumed that a predefined or pre-configured set of downlink HARQ-ACK timing of a terminal is K1={1, 2, 3, 4, 5, 6, 7, 8}, that is to say, a PDSCH transmitted in slot n or a PDCCH indicating downlink SPS release may perform HARQ-ACK feedback in slot n+k, where k∈{1, 2, 3, 4, 5, 6, 7, 8}. It is assumed that a set of scheduling timing is {0, 1, 2, 3}, that is to say, a PDCCH transmitted in slot n may schedule a PDSCH in slot n+m, and m∈{0, 1, 2, 3}.

According to the definition of a semi-static codebook, as shown in FIG. 7, according to an HARQ-ACK timing set and a scheduling timing set, there are total 10 sets of all possible PDCCH monitoring occasions performing HARQ-ACK feedback In one embodiment in slot n+1 in the next wireless array, for example, from slot n (namely, a maximum HARQ-ACK timing is reversely calculated from slot n+11 as a maximum scheduling timing, namely n+11−8−3=n) to slot n+9 (namely, a minimum HARQ-ACK timing is reversely calculated from slot n+11 as a minimum scheduling timing, namely n+11−1−0=n+10, among which, the position with the PDCCH monitoring occasion is selected, and slot n+10 is not counted because it is uplink and does not have a PDCCH monitoring occasion), of course, in the condition that values in the set are not continuous, further determination may be conducted according to each timing value. It is assumed that each downlink transmission is single TB, a 10-bit first HARQ-ACK codebook corresponding to slot n+1 is generated. It is assumed that the terminal has SPS configuration, and SPS transmission has been activated, for example, a transmission occasion of the SPS PDSCH is slot n+7 on CC1, and HARQ-ACK timing of the SPS PDSCH is k=4, that is to say, HARQ-ACK feedback is performed in slot (n+7+4) mod 10=n+1.

Then, the above method 1 is used as following.

According to the HARQ-ACK timing of the SPS PDSCH, it is determined that the SPS PDSCH in slot n+7 only needs to perform HARQ-ACK feedback in slot n+1, or it is determined that slot n+1-k=n−3, namely slot n+7 in a previous radio frame, is a transmission occasion of the SPS PDSCH, only a first HARQ-ACK codebook in slot n+1 does not need additional processing, and is directly fed back.

For UL slots which exclude slot n+1 and do not correspond to the SPS PDSCH in slot n+7, such as slot n and slot n+2, a method similar to that of slot n+1 may also determine a set with a length of 10 to obtain a 10-bit HARQ-ACK codebook. However, at this time, on the basis of the HARQ-ACK timing of the SPS PDSCH, it is determined that slot n and slot n+2 are not the slot for transmission of HARQ-ACK of the SPS PDSCH, that is to say, slot n−k=n−4, namely slot n+6 in a previous radio frame, is not a transmission occasion of the SPS PDSCH, slot n+2-k=n−2, namely slot n+8 in the previous radio frame is not the transmission occasion of the SPS PDSCH, so, it is not necessary to transmit the HARQ-ACK of the SPS PDSCH in this slot. Therefore, 1-bit HARQ-ACK corresponding to the SPS PDSCH may be removed on the basis of a determined first HARQ-ACK codebook, namely, only 9-bit HARQ-ACK may be fed back, reducing redundant transmission of the HARQ-ACK of the SPS PDSCH in a system.

It should be noted that the above embodiments only take slot-based scheduling and transmission as an example. When performing mini-slot-based scheduling and transmission, related methods are also applicable. In FIG. 7, it is assumed that there is only one PDCCH monitoring occasion in one slot, the PDCCH monitoring occasion may schedule one PDSCH transmission. It is certain that a plurality of PDCCH monitoring occasions may exist in one slot, one PDCCH monitoring occasion may schedule a quantity of PDSCH transmission, then it is In one embodiment determined that a size of the codebook may change.

It should be noted that, in the above embodiments, when an SPS service is activated, the condition is as follow.

If a PDCCH which uses CS-RNTI scrambling, has NDI=1 and indicates an HARQ-ACK process number same as an HARQ-ACK process number corresponding to the above SPS PDSCH (that is to say, the PDCCH schedules one SPS PDSCH for repeat), no matter whether PDSCH transmission scheduled by the PDCCH is transmitted in the transmission position of the above SPS PDSCH, the above rules shall be followed. For method 1, based on a corresponding HARQ-ACK timing in the PDCCH indicating activation of the SPS PDSCH and a determined transmission occasion of the SPS PDSCH, whether it is necessary to add/reduce SPS HARQ-ACK of a first HARQ-ACK codebook is judged. For method 2, whether it is necessary to add/reduce SPS HARQ-ACK of the first HARQ-ACK codebook is judged on the basis of whether the transmission occasion based on SPS is included in a set of downlink transmission. This is because, in the condition that PDCCH scheduling repeat schedules UE to perform repeat not at the time of the above transmission occasion of the above SPS PDSCH, then no matter whether the UE receives the PDCCH, the UE also needs to receive the SPS PDSCH in the determined transmission opportunity of the SPS. Therefore, it is necessary, for an original SPS PDSCH, to determine whether the SPS HARQ-ACK is added to the first HARQ-ACK codebook. In particular, when the SPS PDSCH repeat scheduled by the PDCCH indeed occur in the SPS transmission occasion, although the UE may receive a repeated SPS PDSCH (information of frequency domain resources/MCS, etc. of a repeated SPS PDSCH may be different from frequency domain resources/MCS, etc. indicated by the PDCCH activating the SPS PDSCH) in the transmission occasion according to PDCCH scheduling, and may no longer need, according to original SPS frequency domain resources/MCS, to receive an original SPS PDSCH (because the UE may, at one time, only receive and decode one PDSCH in the same carrier/BWP/cell). But when the UE loses the PDCCH scheduling repeat, the UE still needs to receive the original SPS PDSCH in the SPS transmission occasions according to configuration parameters of original frequency domain resources/MCS, etc. In order to avoid the condition that results of determination on whether the SPS HARQ-ACK of the first HARQ-ACK codebook is added or reduced no matter whether the above PDCCH is received are different, causing inconsistent understandings of a size of the codebook by a base station and a terminal, no matter whether the above PDCCH scheduling repeat is received, it is always necessary to determine whether the SPS HARQ-ACK of the first HARQ-ACK codebook is added/reduced for the original SPS PDSCH according to the above method 1 or 2 or 3.

If a PDCCH scrambled by using C-RNTI is received, and the PDCCH schedules PDSCH transmission to be transmitted in a transmission occasion of the SPS PDSCH, although original data of the SPS PDSCH may be packed to be transmitted in the PDSCH scheduled by the C-RNTI scrambled PDCCH, there is no SPS PDSCH transmission on an original SPS PDSCH resource. But in the condition that the UE loses the C-RNTI scrambled PDCCH, the UE still needs to receive the SPS PDSCH on the original SPS PDSCH resource. In order to avoid the condition that results of determination on whether the SPS HARQ-ACK of the first HARQ-ACK codebook is added/reduced no matter whether the above PDCCH is received are different, causing inconsistent understandings of a size of the codebook by the base station and the terminal, no matter whether the above C-RNTI scrambled PDCCH is received, it is always necessary to determine whether the SPS HARQ-ACK of the first HARQ-ACK codebook is added/reduced for the original SPS PDSCH according to the above method 1 or 2 or 3.

Based on the same inventive concept, an embodiment of the present application further provides a method for performing hybrid automatic repeat request feedback on a terminal side. Since a device corresponding to the method is a terminal in a channel estimation system of the embodiments of the present application, and a principle for solving problems of the method is similar to that of the device, implementation of this method may be referred to implementation of the system, for which, repetition is no longer repeated here.

As shown in FIG. 8, the method for performing the hybrid automatic repeat request feedback on the terminal side in the embodiment of the present application includes the following steps.

Step 800, HARQ-ACK of an SPS PDSCH is added or removed by a terminal to or from an HARQ-ACK codebook transmitted on a PUCCH or a PUSCH.

Step 801, a processed HARQ-ACK codebook is transmitted by the terminal.

In one embodiment, the HARQ-ACK codebook is a semi-static codebook or a dynamic codebook.

In one embodiment, the SPS PDSCH is a PDSCH without a corresponding PDCCH.

In one embodiment, adding or removing, by the terminal, the HARQ-ACK of the SPS PDSCH to or from the HARQ-ACK codebook transmitted on the PUCCH or the PUSCH includes:

The HARQ-ACK of the SPS PDSCH is added or removed by the terminal to or from the HARQ-ACK codebook according to HARQ-ACK timing of the SPS PDSCH.

In one embodiment, adding, by the terminal, the HARQ-ACK of the SPS PDSCH to the HARQ-ACK codebook according to the HARQ-ACK timing of the SPS PDSCH includes: in the condition that it is determined that the HARQ-ACK of the SPS PDSCH and the HARQ-ACK codebook are transmitted at the same time according to the HARQ-ACK timing of the SPS PDSCH, the HARQ-ACK of the SPS PDSCH is added by the terminal to the HARQ-ACK codebook.

In one embodiment, adding, by the terminal, in the condition that it is determined that the HARQ-ACK of the SPS PDSCH and the HARQ-ACK codebook are transmitted at the same time according to the HARQ-ACK timing of the SPS PDSCH, the HARQ-ACK of the SPS PDSCH to the HARQ-ACK codebook includes:

in the condition that the HARQ-ACK codebook is transmitted at time n and time n−k is the time at which the terminal receives the SPS PDSCH, the HARQ-ACK of the SPS PDSCH is added by the terminal to the HARQ-ACK codebook, and k is the HARQ-ACK timing of the SPS PDSCH; or in the condition that transmission time of the SPS PDSCH is n, the HARQ-ACK of the SPS PDSCH is added by the terminal to the HARQ-ACK codebook transmitted at transmission time n+k, and k is the HARQ-ACK timing of the SPS PDSCH.

In one embodiment, removing, by the terminal, according to the HARQ-ACK timing of the SPS PDSCH, the HARQ-ACK of the SPS PDSCH from the HARQ-ACK codebook transmitted on the PUCCH or the PUSCH includes:

in the condition that it is determined that the HARQ-ACK of the SPS PDSCH and the HARQ-ACK codebook are transmitted at different time according to the HARQ- ACK timing of the SPS PDSCH, the HARQ-ACK of the SPS PDSCH is removed by the terminal from the HARQ-ACK codebook.

In one embodiment, removing, by the terminal, in the condition that it is determined that the HARQ-ACK of the SPS PDSCH and the HAQ-ACK codebook are transmitted at different time according to the HARQ-ACK timing of the SPS PDSCH, the HARQ-ACK of the SPS PDSCH from the HARQ-ACK codebook transmitted on the PUCCH or the PUSCH includes:

in the condition that the HARQ-ACK codebook is transmitted at time n and time n−k is not the time at which the terminal receives the SPS PDSCH, the HARQ-ACK of the SPS PDSCH is removed by the terminal from the HARQ-ACK codebook, and k is the HARQ-ACK timing of the SPS PDSCH; or in the condition that transmission time of the SPS PDSCH is n, the HARQ-ACK of the SPS PDSCH is removed by the terminal from an HARQ-ACK codebook transmitted not at transmission time n+k, and k is the HARQ-ACK timing of the SPS PDSCH.

In one embodiment, adding or removing, by the terminal, the HARQ-ACK of the SPS PDSCH to or from the HARQ-ACK codebook transmitted on the PUCCH or the PUSCH includes:

in the condition that a the terminal receives the PDCCH, and a new HARQ-ACK feedback position of the SPS PDSCH determined according to the PDCCH is different from an original HARQ-ACK feedback position of the SPS PDSCH determined according to a PDCCH indicating activation of downlink SPS: according to a relationship between the original HARQ-ACK feedback position of the SPS PDSCH and the HARQ-ACK codebook, the HARQ-ACK of the SPS PDSCH is added or removed to or from the HARQ-ACK codebook, and according to a relationship between the new HARQ-ACK feedback position of the SPS PDSCH and the HARQ-ACK codebook, the HARQ-ACK of the SPS PDSCH is added or removed to or from the HARQ-ACK codebook; or in the condition that a the terminal receives the PDCCH, and a new HARQ-ACK feedback position of the SPS PDSCH determined according to the PDCCH is different from an original HARQ-ACK feedback position of the SPS PDSCH determined according to a PDCCH indicating activation of downlink SPS: before it is determined that the new HARQ-ACK feedback position of the SPS PDSCH takes effect, according to a relationship between the original HARQ-ACK feedback position of the SPS PDSCH and the HARQ-ACK codebook, the HARQ-ACK of the SPS PDSCH is added or removed to or from the HARQ-ACK codebook; or before it is determined that the new HARQ-ACK feedback position of the SPS PDSCH takes effect, according to a relationship between the original HARQ-ACK feedback position of the SPS PDSCH and the HARQ-ACK codebook, the HARQ-ACK of the SPS PDSCH is added or removed to or from the HARQ-ACK codebook, and according to a relationship between the new HARQ-ACK feedback position of the SPS PDSCH and the HARQ-ACK codebook, the HARQ-ACK of the SPS PDSCH is added or removed to or from the HARQ-ACK codebook; and after it is determined that the new HARQ-ACK feedback position of the SPS PDSCH takes effect, according to a relationship between the new HARQ-ACK feedback position of the SPS PDSCH and the HARQ-ACK codebook, the HARQ-ACK of the SPS PDSCH is added or removed to or from the HARQ-ACK codebook; or after a network side device sends a PDCCH, and the PDCCH indicates a new HARQ-ACK timing of the SPS PDSCH: according to an original HARQ-ACK timing of the SPS PDSCH, the HARQ-ACK of the SPS PDSCH is added or removed to or from the HARQ-ACK codebook; and according to the new HARQ-ACK timing of the SPS PDSCH, the HARQ-ACK of the SPS PDSCH is added or removed to or from the HARQ-ACK codebook; or after the network side device sends a PDCCH, and the PDCCH indicates a new HARQ-ACK timing of the SPS PDSCH: before it is determined that the new HARQ-ACK timing takes effect, according to an original HARQ-ACK timing of the SPS PDSCH, the HARQ-ACK of the SPS PDSCH is added or removed to or from the HARQ-ACK codebook; or before it is determined that the new HARQ-ACK timing takes effect, according to the original HARQ-ACK timing of the SPS PDSCH, the HARQ-ACK of the SPS PDSCH is added or removed to or from the HARQ-ACK codebook, and according to the new HARQ-ACK timing of the SPS PDSCH, the HARQ-ACK of the SPS PDSCH is added or removed to or from the HARQ-ACK codebook; and after it is determined that the new HARQ-ACK timing takes effect, according to the new HARQ-ACK timing of the SPS PDSCH, the HARQ-ACK of the SPS PDSCH is added or removed to or from the HARQ-ACK codebook.

In one embodiment, adding, by the terminal, the HARQ-ACK of the SPS PDSCH to the HARQ-ACK codebook transmitted on the PUCCH or the PUSCH includes:

according to whether a set of downlink transmission corresponding to time at which an HARQ-ACK codebook is transmitted includes a transmission occasion of an SPS PDSCH, whether the HARQ-ACK of the SPS PDSCH is added by the terminal to the HARQ-ACK codebook is determined.

In one embodiment, determining, according to whether the set of downlink transmission corresponding to the time at which the HARQ-ACK codebook is transmitted includes the transmission occasion of the SPS PDSCH, whether the HARQ-ACK of the SPS PDSCH is added by the terminal to the HARQ-ACK codebook includes:

in the condition that the set of downlink transmission corresponding to the time at which the HARQ-ACK codebook is transmitted includes the transmission occasion of the SPS PDSCH, the HARQ-ACK of the SPS PDSCH is added or removed by the terminal to or from the HARQ-ACK codebook.

In one embodiment, the set of downlink transmission corresponding to the time at which the HARQ-ACK codebook is transmitted is determined according to one of the following modes.

Mode 1: the set is determined by the terminal according to a predefined or pre-configured set of the HARQ-ACK timing.

Mode 2: the set is determined by the terminal according to HARQ-ACK timing indicated by an HARQ-ACK timing indication field in DCI used by a plurality of received PDCCHs performing HARQ-ACK feedback at the time when the HARQ-ACK codebook is transmitted.

Mode 3: the set is determined by the terminal according to a predefined or pre-configured set of the HARQ-ACK timing, and a predefined or pre-configured set of downlink scheduling timing.

Mode 4: the set is determined by the terminal according to HARQ-ACK timing indicated by an HARQ-ACK timing indication field in DCI used by a plurality of received PDCCHs performing HARQ-ACK feedback at the time when the HARQ-ACK codebook is transmitted, and a maximum value and a minimum value of downlink scheduling timing indicated by or corresponding to the plurality of PDCCHs.

In one embodiment, the downlink transmission mentioned is a PDSCH or a PDCCH indicating downlink SPS release.

In one embodiment, adding or removing, by the terminal, the HARQ-ACK of the SPS PDSCH to or from the HARQ-ACK codebook transmitted on the PUCCH or the PUSCH includes:

in the condition that the terminal receives a PDCCH, and a subsequent transmission occasion of the SPS PDSCH determined according to the PDCCH is different from a subsequent transmission occasion of the SPS PDSCH determined according to a PDCCH indicating resource activation of the downlink SPS: according to a relationship between an original transmission occasion of the SPS PDSCH and the set of downlink transmission corresponding to the time at which the HARQ-ACK codebook is transmitted, the HARQ-ACK of the SPS PDSCH is added or removed to or from the HARQ-ACK codebook, and according to a relationship between a new transmission occasion of the SPS PDSCH and the set of downlink transmission corresponding to the time at which the HARQ-ACK codebook is transmitted, the HARQ-ACK of the SPS PDSCH is added or removed to or from the HARQ-ACK codebook; or in the condition that the terminal receives the PDCCH, and a new HARQ-ACK transmission occasion of the SPS PDSCH determined according to the PDCCH is different from an original transmission occasion of the SPS PDSCH determined according to a PDCCH indicating resource activation of downlink SPS: before it is determined that the new transmission occasion of the SPS PDSCH takes effect, according to a relationship between the original transmission occasion of the SPS PDSCH and the set of downlink transmission corresponding to the time at which the HARQ-ACK codebook is transmitted, the HARQ-ACK of the SPS PDSCH is added or removed to or from the HARQ-ACK codebook; or before it is determined that the new transmission occasion of the SPS PDSCH takes effect, according to a relationship between the original transmission occasion of the SPS PDSCH and the set of downlink transmission corresponding to the time at which the HARQ-ACK codebook is transmitted, the HARQ-ACK of the SPS PDSCH is added or removed to or from the HARQ-ACK codebook, and according to a relationship between the new transmission occasion of the SPS PDSCH and the set of downlink transmission corresponding to the time at which the HARQ-ACK codebook is transmitted, the HARQ-ACK of the SPS PDSCH is added or removed to or from the HARQ-ACK codebook; and after it is determined that the new transmission occasion of the SPS PDSCH takes effect, according to a relationship between the new transmission occasion of the SPS PDSCH and the set of downlink transmission corresponding to the time at which the HARQ-ACK codebook is transmitted, the HARQ-ACK of the SPS PDSCH is added or removed to or from the HARQ-ACK codebook.

In one embodiment, before adding or removing, by the terminal, the HARQ-ACK of the SPS PDSCH to or from the HARQ-ACK codebook transmitted on the PUCCH or the PUSCH, the following is further included.

The terminal determines that the SPS PDSCH is activated.

In one embodiment, adding or removing, by the terminal, the HARQ-ACK of the SPS PDSCH to or from the HARQ-ACK codebook transmitted on the PUCCH or the PUSCH includes:

in the condition that SPS transmission is configured for the terminal, the HARQ-ACK of the SPS PDSCH is added to the HARQ-ACK codebook.

In one embodiment, adding or removing, by the terminal, the HARQ-ACK of the SPS PDSCH to or from the HARQ-ACK codebook includes:

X-bit HARQ-ACK of the SPS PDSCH is added or removed by the terminal at a predetermined position of the HARQ-ACK codebook, and X is the bit number of HARQ-ACK corresponding to one SPS PDSCH, and is a positive integer; or Y*X-bit HARQ-ACK of the SPS PDSCH or $$\sum_{i=1}^{Y} X_i$$

-bit HARQ-ACK of the SPS PDSCH is added or removed by the terminal at a predetermined position of the HARQ-ACK codebook, and X is the bit number of HARQ-ACK corresponding to one SPS PDSCH, and is a value greater than or equal to 1, $X_i$ is the bit number of HARQ-ACK corresponding to one SPS PDSCH of Y SPS PDSCHs, Y is the number of SPS PDSCHs for transmitting HARQ-ACK of the SPS PDSCH and the HARQ-ACK codebook at the same time determined according to HARQ-ACK timing of the corresponding SPS PDSCH in a carrier, a cell or a bandwidth part BWP with activated SPS of the terminal, or Y is the number of a carrier, or a cell or a BWP for transmitting HARQ-ACK of an SPS PDSCH and the HARQ-ACK codebook at the same time determined according to HARQ-ACK timing of the corresponding SPS PDSCH, or Y is the number of a transmission occasion of the SPS PDSCH contained in a set of downlink transmission corresponding to the time at which the HARQ-ACK codebook is transmitted in a carrier or a cell or a BWP with activated SPS of the terminal, or Y is the number of a carrier or a cell or a BWP with a transmission occasion of the SPS PDSCH contained in a set of downlink transmission corresponding to the time at which the HARQ-ACK codebook is transmitted, or Y is the number of a carrier, a cell or a BWP with configured SPS transmission of the terminal, and is a positive integer.

Based on the same inventive concept, an embodiment of the present application further provides a method for performing hybrid automatic repeat request feedback of a network side device. Since a device corresponding to the method is the network side device in a channel estimation system of the embodiments of the present application, and a principle for solving problems of the method is similar to that of the device, implementation of this method may be referred to implementation of the system, for which, repetition is no longer repeated here.

Figure 9:
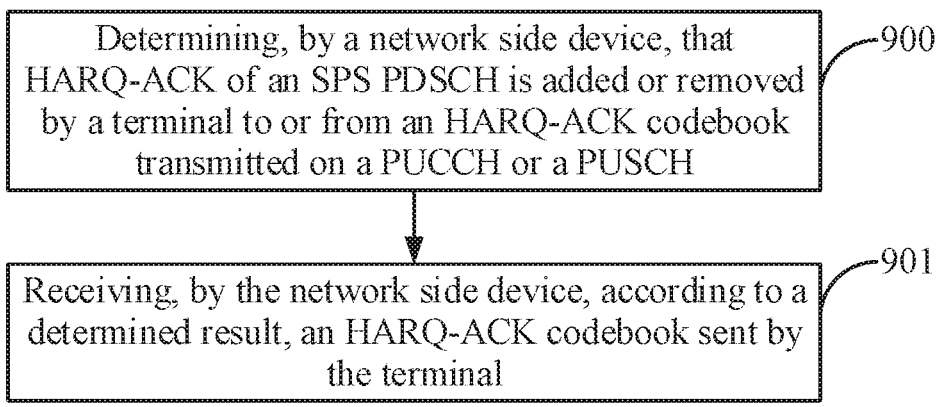
FIG. 9 is a schematic flowchart of a method for performing hybrid automatic repeat request feedback by a network side device in an embodiment of the present application.

As shown in FIG. 9, the method for performing the hybrid automatic repeat request feedback of the network side device in the embodiment of the present application includes the following steps.

Step 900, it is determined that HARQ-ACK of an SPS PDSCH is added or removed by a terminal to or from an HARQ-ACK codebook transmitted on a PUCCH or a PUSCH by the network side device.

Step 901, according to a determined result, an HARQ-ACK codebook sent by the terminal is received by the network side device.

In one embodiment, the HARQ-ACK codebook is a semi-static codebook or a dynamic codebook.

In one embodiment, the SPS PDSCH is a PDSCH without a corresponding PDCCH.

In one embodiment, determining that the HARQ-ACK of the SPS PDSCH is added or removed by the terminal to or from the HARQ-ACK codebook transmitted on the PUCCH or the PUSCH by the network side device includes:
- it is determined, by the network side device, according to HARQ-ACK timing of the SPS PDSCH, that the HARQ-ACK of the SPS PDSCH is added or removed by the terminal to or from the HARQ-ACK codebook.

In one embodiment, determining, by the network side device, according to the HARQ-ACK timing of the SPS PDSCH, that the HARQ-ACK of the SPS PDSCH is added by the terminal to the HARQ-ACK codebook includes:
- it is determined, by the network side device, in the condition that it is determined that the HARQ-ACK of the SPS PDSCH and the HARQ-ACK codebook are transmitted at the same time according to the HARQ-ACK timing of the SPS PDSCH, that the HARQ-ACK of the SPS PDSCH is added by the terminal to the HARQ-ACK codebook.

In one embodiment, determining, by the network side device, in the condition that it is determined that the HARQ-ACK of the SPS PDSCH and the HARQ-ACK codebook are transmitted at the same time according to the HARQ-ACK timing of the SPS PDSCH, that the HARQ-ACK of the SPS PDSCH is added by the terminal to the HARQ-ACK codebook includes:
- it is determined, by the network side device, in the condition that the HARQ-ACK codebook is transmitted at time n and time n–k is the time at which the terminal receives the SPS PDSCH, that the HARQ-ACK of the SPS PDSCH is added by the terminal to the HARQ-ACK codebook, and k is the HARQ-ACK timing of the SPS PDSCH; or
- it is determined, by the network side device, in the condition that transmission time of the SPS PDSCH is n, that the HARQ-ACK of the SPS PDSCH is added by the terminal to the HARQ-ACK codebook transmitted at transmission time n+k, and k is the HARQ-ACK timing of the SPS PDSCH.

In one embodiment, determining, by the network side device, according to the HARQ-ACK timing of the SPS PDSCH, that the HARQ-ACK of the SPS PDSCH is removed by the terminal from the HARQ-ACK codebook includes:
- it is determined, by the network side device, in the condition that it is determined that the HARQ-ACK of the SPS PDSCH and the HARQ-ACK codebook are transmitted at different time according to the HARQ-ACK timing of the SPS PDSCH, that the HARQ-ACK of the SPS PDSCH is removed by the terminal from the HARQ-ACK codebook.

In one embodiment, determining, by the network side device, in the condition that it is determined that the HARQ-ACK of the SPS PDSCH and the HARQ-ACK codebook are transmitted at different time according to the HARQ-ACK timing of the SPS PDSCH, that the HARQ-ACK of the SPS PDSCH is removed by the terminal from the HARQ-ACK codebook includes:
- it is determined, by the network side device, in the condition that the HARQ-ACK codebook is transmitted at time n and time n–k is the time at which the terminal receives the SPS PDSCH, that the HARQ-ACK of the SPS PDSCH is removed by the terminal from the HARQ-ACK codebook, and k is the HARQ-ACK timing of the SPS PDSCH; or
- it is determined, by the network side device, in the condition that transmission time of the SPS PDSCH is n, that the HARQ-ACK of the SPS PDSCH is removed by the terminal from an HARQ-ACK codebook not transmitted at time n+k, and k is the HARQ-ACK timing of the SPS PDSCH.

In one embodiment, determining that the HARQ-ACK of the SPS PDSCH is added or removed by a terminal to or from the HARQ-ACK codebook transmitted on the PUCCH or the PUSCH by the network side device includes:
- in the condition that the network side device sends a PDCCH, and a new HARQ-ACK feedback position of the SPS PDSCH determined according to the PDCCH is different from an original HARQ-ACK feedback position of the SPS PDSCH determined according to a PDCCH indicating activation of downlink SPS: it is determined, according to a relationship between the original HARQ-ACK feedback position of the SPS PDSCH and the HARQ-ACK codebook, that the HARQ-ACK of the SPS PDSCH is added or removed by the terminal to or from the HARQ-ACK codebook, and it is determined, according to a relationship between the new HARQ-ACK feedback position of the SPS PDSCH and the HARQ-ACK codebook, that the HARQ-ACK of the SPS PDSCH is added or removed by the terminal to or from the HARQ-ACK codebook; or
- in the condition that the network side device sends a PDCCH, and a new HARQ-ACK feedback position of the SPS PDSCH determined according to the PDCCH is different from an original HARQ-ACK feedback position of the SPS PDSCH determined according to a PDCCH indicating activation of downlink SPS: before it is determined that the new HARQ-ACK feedback position of the SPS PDSCH takes effect, it is determined, by the network side device, according to a relationship between the original HARQ-ACK feedback position of the SPS PDSCH and the HARQ-ACK codebook, that the HARQ-ACK of the SPS PDSCH is added or removed by the terminal to or from the HARQ-ACK codebook; or before it is determined that the new HARQ-ACK feedback position of the SPS PDSCH takes effect, it is determined, according to a relationship between the original HARQ-ACK feedback position of the SPS PDSCH and the HARQ-ACK codebook, that the HARQ-ACK of the SPS PDSCH is added or removed by the terminal to or from the HARQ-ACK codebook, and it is determined, according to a relationship between the new HARQ-ACK feedback position of the SPS PDSCH and the HARQ-ACK codebook, that the HARQ-ACK of the SPS PDSCH is added or removed by the terminal to or from the HARQ-ACK codebook; and after it is determined that the new HARQ-ACK feedback position of the SPS PDSCH takes effect, it is determined, according to a relationship between the new HARQ-ACK feedback position of the SPS PDSCH and the HARQ-ACK codebook, that the HARQ-ACK of the SPS PDSCH is added or removed by the terminal to or from the HARQ-ACK codebook; or in the condition that the network side device sends the PDCCH, and the PDCCH indicates a new HARQ-ACK timing of the SPS PDSCH, it is determined, by the network side device, according to an original HARQ-ACK timing of the SPS PDSCH, that the HARQ-ACK of the SPS PDSCH is added or removed by the terminal to or from the HARQ-ACK codebook transmitted on the PUCCH or the PUSCH; and it is determined, according to the new HARQ-ACK timing of the SPS PDSCH, that the HARQ-ACK of the SPS PDSCH is added or removed by the terminal to or from the HARQ-ACK codebook transmitted on the PUCCH or the PUSCH; or in the condition that the network side device sends the PDCCH, and after the PDCCH indicates a new HARQ-ACK timing of the SPS PDSCH: before it is determined that the new HARQ-ACK timing takes effect, it is determined, by the network side device, according to an original HARQ-ACK timing of the SPS PDSCH, that the HARQ-ACK of the SPS PDSCH is added or removed by the terminal to or from the HARQ-ACK codebook; or before it is determined that the new HARQ-ACK timing takes effect, it is determined, according to the original HARQ-ACK timing of the SPS PDSCH, that the HARQ-ACK of the SPS PDSCH is added or removed by the terminal to or from the HARQ-ACK codebook, and it is determined, according to the new HARQ-ACK timing of the SPS PDSCH, that the HARQ-ACK of the SPS PDSCH is added or removed by the terminal to or from the HARQ-ACK codebook; and after it is determined that the new HARQ-ACK timing takes effect, it is determined, according to the new HARQ-ACK timing of the SPS PDSCH, that the HARQ-ACK of the SPS PDSCH is added or removed by the terminal to or from the HARQ-ACK codebook.

In one embodiment, determining that the HARQ-ACK of the SPS PDSCH is added by the terminal to the HARQ-ACK codebook transmitted on the PUCCH or the PUSCH by the network side device includes:

it is determined, by the network side device, according to whether a set of downlink transmission corresponding to time at which the HARQ-ACK codebook is transmitted includes a transmission occasion of the SPS PDSCH, whether the HARQ-ACK of the SPS PDSCH is added by the terminal to the HARQ-ACK codebook transmitted on the PUCCH or the PUSCH.

In one embodiment, determining, by the network side device, according to whether the set of downlink transmission corresponding to the time at which the HARQ-ACK codebook is transmitted includes the transmission occasion of the SPS PDSCH, whether the HARQ-ACK of the SPS PDSCH is added or removed by the terminal to or from the HARQ-ACK codebook transmitted on the PUCCH or the PUSCH includes:

it is determined, by the network side device and in the condition that the set of downlink transmission corresponding to the time at which the HARQ-ACK codebook is transmitted includes the transmission occasion of the SPS PDSCH, that the HARQ-ACK of the SPS PDSCH is added by the terminal to the HARQ-ACK codebook.

In one embodiment, the set of downlink transmission corresponding to the time at which the HARQ-ACK codebook is transmitted is determined by the network side device according to one of the following modes.

Mode 1: the set is determined by the network side device according to a predefined or pre-configured set of the HARQ-ACK timing.

Mode 2: the set is determined by the network side device according to HARQ-ACK timing indicated by an HARQ-ACK timing indication field in DCI used by a plurality of received PDCCHs performing HARQ-ACK feedback at the time when the HARQ-ACK codebook is transmitted.

Mode 3: the set is determined by the network side device according to a predefined or pre-configured set of the HARQ-ACK timing, and a predefined or pre-configured set of downlink scheduling timing.

Mode 4: the set is determined by the network side device according to HARQ-ACK timing indicated by an HARQ-ACK timing indication field in DCI used by a plurality of received PDCCHs performing HARQ-ACK feedback at the time when the HARQ-ACK codebook is transmitted, and a maximum value and a minimum value of downlink scheduling timing indicated by or corresponding to the plurality of PDCCHs.

In one embodiment, the downlink transmission is a PDSCH or a PDCCH indicating downlink SPS release.

In one embodiment, determining that the HARQ-ACK of the SPS PDSCH is added or removed by the terminal to or from the HARQ-ACK codebook transmitted on the PUCCH or the PUSCH by the network side device includes:

in the condition that the network side device sends the PDCCH, and a subsequent transmission occasion of the SPS PDSCH determined according to the PDCCH is different from a subsequent transmission occasion of the SPS PDSCH determined according to a PDCCH indicating resource activation of the downlink SPS: it is determined, according to a relationship between an original transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook, and it is determined, by the network side device, according to a relationship between a new transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook; or in the condition that the network side device sends the PDCCH, and a new HARQ-ACK transmission occasion of the SPS PDSCH determined according to the PDCCH is different from an original transmission occasion of the SPS PDSCH determined according to a PDCCH indicating resource activation of downlink SPS: before it is determined that the new transmission occasion of the SPS PDSCH takes effect, it is determined, by the network side device, according to a relationship between the original transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook; or before it is determined that the new transmission occasion of the SPS PDSCH takes effect, it is determined, according to a relationship between the original transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook, and it is determined, according to a relationship between the new transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook; and after it is determined that the new transmission occasion of the SPS PDSCH takes effect, it is determined, according to a relationship between the new transmission occasion of the SPS PDSCH and the set of downlink transmission corresponding to the time at which the HARQ-ACK codebook is transmitted, that the HARQ-ACK of the SPS PDSCH is added or removed by the terminal to or from the HARQ-ACK codebook.

In one embodiment, before determining that the HARQ-ACK of the SPS PDSCH is added or removed by the terminal to or from the HARQ-ACK codebook transmitted on the PUCCH or the PUSCH by the network side device, the following is further included.

The network side device determines that the SPS PDSCH is activated.

In one embodiment, determining that the HARQ-ACK of the SPS PDSCH is added or removed by the terminal to or from the HARQ-ACK codebook transmitted on the PUCCH or the PUSCH by the network side device includes:

it is determined, by the network side device and in the condition that SPS transmission is configured for the terminal, that the HARQ-ACK of the SPS PDSCH is added by the terminal to the HARQ-ACK codebook transmitted on the PUCCH or the PUSCH.

In one embodiment, determining that the HARQ-ACK of the SPS PDSCH is added or removed by the terminal to or from the HARQ-ACK codebook transmitted on the PUCCH or the PUSCH by the network side device includes:

it is determined, by the network side device, that X-bit HARQ-ACK of the SPS PDSCH is added or removed by the terminal at a predetermined position of the HARQ-ACK codebook, and X is the bit number of HARQ-ACK corresponding to one SPS PDSCH, and is a positive integer; or it is determined, by the network side device, that Y*X-bit HARQ-ACK of the SPS PDSCH or $$\sum_{i=1}^{Y} X_i$$

-bit HARQ-ACK of the SPS PDSCH is added or removed by the terminal at a predetermined position of the HARQ-ACK codebook, and X is the bit number of HARQ-ACK corresponding to one SPS PDSCH, and is a value greater than or equal to 1, $X_i$ is the bit number of HARQ-ACK corresponding to one SPS PDSCH of Y SPS PDSCHs, Y is the number of SPS PDSCHs for transmitting the HARQ-ACK of the SPS PDSCH and the HARQ-ACK codebook at the same time determined according to HARQ-ACK timing of the corresponding SPS PDSCH in a carrier, a cell or a BWP with activated SPS of the terminal, or Y is the number of a carrier, or a cell or a BWP for transmitting the HARQ-ACK of an SPS PDSCH and the HARQ-ACK codebook at the same time determined according to HARQ-ACK timing of the corresponding SPS PDSCH, or Y is the number of a transmission occasion of the SPS PDSCH contained in a set of downlink transmission corresponding to the time at which the HARQ-ACK codebook is transmitted in a carrier or a cell or a BWP with activated SPS of the terminal, or Y is the number of a carrier or a cell or a BWP with a transmission occasion of the SPS PDSCH contained in a set of downlink transmission corresponding to the time at which the HARQ-ACK codebook is transmitted, or Y is the number of a carrier, a cell or a BWP with configured SPS transmission of the terminal, and is a positive integer.

The embodiments of the present application may be provided as methods, systems, or computer program products. Therefore, the present application may take the form of an entirely hardware embodiment, an entirely software embodiment, or an embodiment combining software and hardware. Moreover, the present application may take the form of a computer program product implemented on one or more computer usable storage media (including but not limited to disk memories, CD-ROMs, optical memories, etc.) containing computer usable program codes.

The present application is described with reference to flowcharts and/or block diagrams of methods, devices (systems), and computer program products according to the embodiments of the present application. It should be understood that each flow and/or block in the flowcharts and/or block diagrams and a combination of the flows and/or blocks in the flowcharts and/or block diagrams can be implemented by computer program instructions. These computer program instructions may be provided for a processor of a general-purpose computer, a special-purpose computer, an embedded processing machine, or other programmable data processing devices to produce a machine, so that instructions executed by the processor of the computer or other programmable data processing devices are generated to realize a device with a function specified in one or more flows of the flowcharts and/or one or more blocks of the block diagrams.

These computer program instructions may also be stored in a computer readable memory that can guide a computer or other programmable data processing devices to work in a specific manner, so that the instructions stored in the computer readable memory produce an article of manufacture including an instruction device, and the instruction device implements the functions specified in one or more flows of the flowcharts and/or one or more blocks in the block diagrams.

These computer program instructions may also be loaded onto a computer or other programmable data processing devices, so that a series of operating steps are performed on the computer or other programmable devices to generate computer-implemented processing, and instructions executed on the computer or other programmable devices provide steps for implementing the functions specified in the one or more flows of the flowcharts and/or one or more blocks in the block diagrams.

Although the exemplary embodiments of the present application have been described, those skilled in the art can make additional changes and modifications to these embodiments once they learn the basic inventive concept. Therefore, the appended claims are intended to be interpreted as including the exemplary embodiments and all changes and modifications falling within the scope of the present application.

Apparently, those skilled in the art can make various modifications and variations to the embodiments of the present application without departing from the spirit and scope of the embodiments of the present application. In this way, in the condition that these modifications and variations of the embodiments of the present application fall within the scope of the claims of the present application and their equivalent technologies, the present application is also intended to include these modifications and variations.

What is claimed is:

1. A method for performing hybrid automatic repeat request feedback, comprising:
   determining, by a terminal, a hybrid automatic repeat request acknowledge (HARQ-ACK) codebook transmitted on a physical uplink control channel (PUCCH) or a physical uplink shared channel (PUSCH);
   adding, by a terminal, HARQ-ACK of a semi-persistent scheduling physical downlink shared channel (SPS PDSCH) in the HARQ-ACK codebook; and
   transmitting, by the terminal, a processed HARQ-ACK codebook;
   wherein the adding, by the terminal, the HARQ-ACK of the SPS PDSCH in the HARQ-ACK codebook comprises a scheme 1 or 2:
   the scheme 1: adding, by the terminal, the HARQ-ACK of the SPS PDSCH in the HARQ-ACK codebook according to HARQ-ACK timing of the SPS PDSCH;
   wherein the adding, by the terminal, the HARQ-ACK of the SPS PDSCH in the HARQ-ACK codebook according to the HARQ-ACK timing of the SPS PDSCH comprises: adding, by the terminal, the HARQ-ACK of the SPS PDSCH in the HARQ-ACK codebook, in the condition that the terminal determines, according to the HARQ-ACK timing of the SPS PDSCH, that the HARQ-ACK of the SPS PDSCH and the HARQ-ACK codebook are transmitted at the same time;
   the adding, by the terminal, the HARQ-ACK of the SPS PDSCH in the HARQ-ACK codebook, in the condition that the terminal determines, according to the HARQ-ACK timing of the SPS PDSCH, that the HARQ-ACK of the SPS PDSCH and the HARQ-ACK codebook are transmitted at the same time comprises:
   adding, by the terminal, the HARQ-ACK of the SPS PDSCH in the HARQ-ACK codebook, in the condition that the HARQ-ACK codebook is transmitted at time n and time n-k is time at which the terminal receives the SPS PDSCH; wherein k is the HARQ-ACK timing of the SPS PDSCH; or
   adding, by the terminal, the HARQ-ACK of the SPS PDSCH in the HARQ-ACK codebook transmitted at transmission time n+k, in the condition that transmission time of the SPS PDSCH is n; wherein k is the HARQ-ACK timing of the SPS PDSCH;
   the scheme 2: determining, by the terminal, according to whether a set of downlink transmission corresponding to time at which the HARQ-ACK codebook is transmitted comprises a transmission occasion of the SPS PDSCH, whether the HARQ-ACK of the SPS PDSCH is added by the terminal in the HARQ-ACK codebook, wherein the downlink transmission is the PDSCH or the PDCCH indicating downlink SPS release;
   the determining, by the terminal, according to whether the set of downlink transmission corresponding to the time at which the HARQ-ACK codebook is transmitted comprises the transmission occasion of the SPS PDSCH, whether to add the HARQ-ACK of the SPS PDSCH in the HARQ-ACK codebook comprises:
   adding, by the terminal, in the condition that the set of downlink transmission corresponding to the time at which the HARQ-ACK codebook is transmitted comprises the transmission occasion of the SPS PDSCH, the HARQ-ACK of the SPS PDSCH in the HARQ-ACK codebook.

2. The method of claim 1, comprising: removing, by a terminal, HARQ-ACK of a semi-persistent scheduling physical downlink shared channel (SPS PDSCH) in the HARQ-ACK codebook; wherein the removing, by the terminal, the HARQ-ACK of the SPS PDSCH in the HARQ-ACK codebook transmitted on the PUCCH or the PUSCH according to the HARQ-ACK timing of the SPS PDSCH comprises: removing, by the terminal, the HARQ-ACK of the SPS PDSCH in the HARQ-ACK codebook, in the condition that the terminal determines, according to the HARQ-ACK timing of the SPS PDSCH, that the HARQ-ACK of the SPS PDSCH and the HARQ-ACK codebook are transmitted at different time.

3. The method of claim 2, wherein the removing, by the terminal, the HARQ-ACK of the SPS PDSCH in the HARQ-ACK codebook transmitted on the PUCCH or the PUSCH, in the condition that the terminal determines, according to the HARQ-ACK timing of the SPS PDSCH, that the HARQ-ACK of the SPS PDSCH and the HARQ-ACK codebook are transmitted at different time comprises:
   removing, by the terminal, the HARQ-ACK of the SPS PDSCH in the HARQ-ACK codebook, in the condition that the HARQ-ACK codebook is transmitted at time n and time n-k is not time at which the terminal receives the SPS PDSCH; wherein k is the HARQ-ACK timing of the SPS PDSCH; or
   removing, by the terminal, the HARQ-ACK of the SPS PDSCH in the HARQ-ACK codebook not transmitted at time n+k, in the condition that transmission time of the SPS PDSCH is n; wherein k is the HARQ-ACK timing of the SPS PDSCH.

4. The method of claim 1, wherein when the scheme 1 is used, the adding, by the terminal, the HARQ-ACK of the SPS PDSCH in the HARQ-ACK codebook transmitted on the PUCCH or the PUSCH comprises:
   in the condition that a new HARQ-ACK feedback position of the SPS PDSCH determined according to a PDCCH received by the terminal is different from an original HARQ-ACK feedback position of the SPS PDSCH determined according to a PDCCH indicating activation of downlink SPS, one of the following methods is used:
   method 1: adding, according to a relationship between the original HARQ-ACK feedback position of the SPS PDSCH and the HARQ-ACK codebook, the HARQ-ACK of the SPS PDSCH in the HARQ-ACK codebook, and adding, according to a relationship between the new HARQ-ACK feedback position of the SPS PDSCH and the HARQ-ACK codebook, the HARQ-ACK of the SPS PDSCH in the HARQ-ACK codebook; or
   method 2: before it is determined that the new HARQ-ACK feedback position of the SPS PDSCH takes effect, adding, according to a relationship between the original HARQ-ACK feedback position of the SPS PDSCH and the HARQ-ACK codebook, the HARQ-ACK of the SPS PDSCH in the HARQ-ACK codebook; and after it is determined that the new HARQ-ACK feedback position of the SPS PDSCH takes effect, adding, according to a relationship between the new HARQ-ACK feedback position of the SPS PDSCH and the HARQ-ACK codebook, the HARQ-ACK of the SPS PDSCH to or from the HARQ-ACK codebook; or method 3: before it is determined that the new HARQ-ACK feedback position of the SPS PDSCH takes effect, adding, according to a relationship between the original HARQ-ACK feedback position of the SPS PDSCH and the HARQ-ACK codebook, the HARQ-ACK of the SPS PDSCH in the HARQ-ACK codebook, and adding, according to a relationship between the new HARQ-ACK feedback position of the SPS PDSCH and the HARQ-ACK codebook, the HARQ-ACK of the SPS PDSCH in the HARQ-ACK codebook; and after it is determined that the new HARQ-ACK feedback position of the SPS PDSCH takes effect, adding, according to a relationship between the new HARQ-ACK feedback position of the SPS PDSCH and the HARQ-ACK codebook, the HARQ-ACK of the SPS PDSCH in the HARQ-ACK codebook; or after a network side device sends a PDCCH which indicates a new HARQ-ACK timing of the SPS PDSCH, one of the following methods is used:

method 4: adding, according to an original HARQ-ACK timing of the SPS PDSCH, the HARQ-ACK of the SPS PDSCH in the HARQ-ACK codebook; and adding, according to the new HARQ-ACK timing of the SPS PDSCH, the HARQ-ACK of the SPS PDSCH in the HARQ-ACK codebook; or method 5: before it is determined that the new HARQ-ACK timing takes effect, adding, according to an original HARQ-ACK timing of the SPS PDSCH, the HARQ-ACK of the SPS PDSCH in the HARQ-ACK codebook; and after it is determined that the new HARQ-ACK timing takes effect, adding, according to the new HARQ-ACK timing of the SPS PDSCH, the HARQ-ACK of the SPS PDSCH in the HARQ-ACK codebook; or method 6: before it is determined that the new HARQ-ACK timing takes effect, adding, according to the original HARQ-ACK timing of the SPS PDSCH, the HARQ-ACK of the SPS PDSCH in the HARQ-ACK codebook, and adding, according to the new HARQ-ACK timing of the SPS PDSCH, the HARQ-ACK of the SPS PDSCH in the HARQ-ACK codebook; and after it is determined that the new HARQ-ACK timing takes effect, adding, according to the new HARQ-ACK timing of the SPS PDSCH, the HARQ-ACK of the SPS PDSCH in the HARQ-ACK codebook;

when the scheme 2 is used, the adding, by the terminal, the HARQ-ACK of the SPS PDSCH in the HARQ-ACK codebook transmitted on the PUCCH or the PUSCH comprises:

in the condition that a subsequent transmission occasion of the SPS PDSCH determined according to a PDCCH received by the terminal is different from a subsequent transmission occasion of the SPS PDSCH determined according to a PDCCH indicating resource activation of the downlink SPS, one of the following methods is used:

method 7: adding, according to a relationship between an original transmission occasion of the SPS PDSCH and the set of downlink transmission corresponding to the time at which the HARQ-ACK codebook is transmitted, the HARQ-ACK of the SPS PDSCH in the HARQ-ACK codebook, and adding, according to a relationship between a new transmission occasion of the SPS PDSCH and the set of downlink transmission corresponding to the time at which the HARQ-ACK codebook is transmitted, the HARQ-ACK of the SPS PDSCH in the HARQ-ACK codebook; or method 8: before it is determined that the new transmission occasion of the SPS PDSCH takes effect, adding, according to a relationship between the original transmission occasion of the SPS PDSCH and the set of downlink transmission corresponding to the time at which the HARQ-ACK codebook is transmitted, the HARQ-ACK of the SPS PDSCH in the HARQ-ACK codebook; and after it is determined that the new transmission occasion of the SPS PDSCH takes effect, adding, according to a relationship between the new transmission occasion of the SPS PDSCH and the set of downlink transmission corresponding to the time at which the HARQ-ACK codebook is transmitted, the HARQ-ACK of the SPS PDSCH in the HARQ-ACK codebook; or method 9: before it is determined that the new transmission occasion of the SPS PDSCH takes effect, adding, according to a relationship between the original transmission occasion of the SPS PDSCH and the set of downlink transmission corresponding to the time at which the HARQ-ACK codebook is transmitted, the HARQ-ACK of the SPS PDSCH in the HARQ-ACK codebook, and adding, according to a relationship between the new transmission occasion of the SPS PDSCH and the set of downlink transmission corresponding to the time at which the HARQ-ACK codebook is transmitted, the HARQ-ACK of the SPS PDSCH in the HARQ-ACK codebook; and after it is determined that the new transmission occasion of the SPS PDSCH takes effect, adding, according to a relationship between the new transmission occasion of the SPS PDSCH and the set of downlink transmission corresponding to the time at which the HARQ-ACK codebook is transmitted, the HARQ-ACK of the SPS PDSCH in the HARQ-ACK codebook.

5. The method of claim 1, wherein the adding, by the terminal, the HARQ-ACK of the SPS PDSCH in the HARQ-ACK codebook comprises:

adding, by the terminal, X-bit HARQ-ACK of the SPS PDSCH at a predetermined position of the HARQ-ACK codebook, wherein X is the bit number of the HARQ-ACK corresponding to one SPS PDSCH, and is a positive integer; or adding, by the terminal, Y*X-bit HARQ-ACK of the SPS PDSCH or adding $$\sum_{i=1}^{Y} X_i$$

-bit HARQ-ACK of the SPS PDSCH at a predetermined position of the HARQ-ACK codebook, wherein X is the bit number of the HARQ-ACK corresponding to one SPS PDSCH, and is a value lager than or equal to 1, $X_i$ is the bit number of the HARQ-ACK corresponding to one SPS PDSCH among Y SPS PDSCHs, Y is the number of SPS PDSCHs for transmitting HARQ-ACK of the SPS PDSCH and the HARQ-ACK codebook at the same time determined according to the HARQ-ACK timing of the corresponding SPS PDSCH in a carrier, a cell or a bandwidth part (BWP) with activated SPS of the terminal, or Y is the number of a carrier, or a cell or a BWP for transmitting HARQ-ACK of an SPS PDSCH and the HARQ-ACK codebook at the same time determined according to the HARQ-ACK timing of the corresponding SPS PDSCH, or Y is the number of the transmission occasions of the SPS PDSCH contained in the set of downlink transmission corresponding to the time at which the HARQ-ACK codebook is transmitted in a carrier or a cell or a BWP with activated SPS of the terminal, or Y is the number of a carrier or a cell or a BWP with a transmission occasion of the SPS PDSCH contained in the set of downlink transmission corresponding to the time at which the HARQ-ACK codebook is transmitted, or Y is the number of a carrier, a cell or a BWP with configured SPS transmission of the terminal, and is a positive integer.

6. A method for performing hybrid automatic repeat request feedback, comprising:
   determining, by a network side device, that hybrid automatic repeat request acknowledge (HARQ-ACK) of a semi-persistent scheduling physical downlink shared channel (SPS PDSCH) is added by a terminal in an HARQ-ACK codebook transmitted on a physical uplink control channel (PUCCH) or a physical uplink shared channel (PUSCH); and
   receiving, by the network side device, a processed HARQ-ACK codebook sent by the terminal according to a determined result;
   wherein the determining, by the network side device, that the HARQ-ACK of the SPS PDSCH is added by the terminal in the HARQ-ACK codebook transmitted on the PUCCH or the PUSCH comprises a scheme 1 or 2:
   the scheme 1: determining, by the network side device, according to the HARQ-ACK timing of the SPS PDSCH, that the HARQ-ACK of the SPS PDSCH is added by the terminal in the HARQ-ACK codebook;
   the determining, by the network side device, according to the HARQ-ACK timing of the SPS PDSCH, that the HARQ-ACK of the SPS PDSCH is added by the terminal in the HARQ-ACK codebook comprises:
   determining, by the network side device, that the HARQ-ACK of the SPS PDSCH is added by the terminal in the HARQ-ACK codebook, in the condition that the network side device determines, according to the HARQ-ACK timing of the SPS PDSCH, that the HARQ-ACK of the SPS PDSCH and the HARQ-ACK codebook are transmitted at the same time;
   the determining, by the network side device, that the HARQ-ACK of the SPS PDSCH is added by the terminal in the HARQ-ACK codebook, in the condition that the network side device determines, according to the HARQ-ACK timing of the SPS PDSCH, that the HARQ-ACK of the SPS PDSCH and the HARQ-ACK codebook are transmitted at the same time, comprises:
   determining, by the network side device, that the HARQ-ACK of the SPS PDSCH is added by the terminal in the HARQ-ACK codebook, in the condition that the HARQ-ACK codebook is transmitted at time n and time n-k is time at which the terminal receives the SPS PDSCH; wherein k is the HARQ-ACK timing of the SPS PDSCH; or
   determining, by the network side device, that the HARQ-ACK of the SPS PDSCH is added by the terminal in the HARQ-ACK codebook transmitted at transmission time n+k, in the condition that transmission time of the SPS PDSCH is n; wherein k is the HARQ-ACK timing of the SPS PDSCH
   the scheme 2: determining, by the network side device, according to whether a set of downlink transmission corresponding to time at which the HARQ-ACK codebook is transmitted comprises a transmission occasion of the SPS PDSCH, whether the HARQ-ACK of the SPS PDSCH is added by the terminal in the HARQ-ACK codebook transmitted on the PUCCH or the PUSCH, wherein the downlink transmission is a PDSCH or a PDCCH indicating downlink SPS release;
   the determining, by the network side device, according to whether the set of downlink transmission corresponding to the time at which the HARQ-ACK codebook is transmitted comprises the transmission occasion of the SPS PDSCH, whether the HARQ-ACK of the SPS PDSCH is added by the terminal in the HARQ-ACK codebook transmitted on the PUCCH or the PUSCH comprises:
   determining, by the network side device, in the condition that the set of downlink transmission corresponding to the time at which the HARQ-ACK codebook is transmitted comprises the transmission occasion of the SPS PDSCH, that the HARQ-ACK of the SPS PDSCH is added by the terminal in the HARQ-ACK codebook.

7. The method of claim 6, comprising: determining, by the network side device, that the HARQ-ACK of the SPS PDSCH is removed by the terminal in the HARQ-ACK codebook transmitted on the PUCCH or the PUSCH; wherein the determining, by the network side device, according to the HARQ-ACK timing of the SPS PDSCH, that the HARQ-ACK of the SPS PDSCH is removed by the terminal in the HARQ-ACK codebook comprises: determining, by the network side device, that the HARQ-ACK of the SPS PDSCH is removed by the terminal in the HARQ-ACK codebook, in the condition that the network side device determines, according to the HARQ-ACK timing of the SPS PDSCH, that the HARQ-ACK of the SPS PDSCH and the HARQ-ACK codebook are transmitted at different time.

8. The method of claim 7, wherein the determining, by the network side device, that the HARQ-ACK of the SPS PDSCH is removed by the terminal in the HARQ-ACK codebook, in the condition that the network side device determines, according to the HARQ-ACK timing of the SPS PDSCH, that the HARQ-ACK of the SPS PDSCH and the HARQ-ACK codebook are transmitted at different time comprises:
   determining, by the network side device, that the HARQ-ACK of the SPS PDSCH is removed by the terminal in the HARQ-ACK codebook, in the condition that the HARQ-ACK codebook is transmitted at time n and time n-k is time at which the terminal receives the SPS PDSCH; wherein k is the HARQ-ACK timing of the SPS PDSCH; or
   determining, by the network side device, that the HARQ-ACK of the SPS PDSCH is removed by the terminal in the HARQ-ACK codebook not transmitted at time n+k, in the condition that transmission time of the SPS PDSCH is n; wherein k is the HARQ-ACK timing of the SPS PDSCH.

9. The method of claim 6, wherein when the scheme 1 is used, the determining, by a network side device, that the HARQ-ACK of the SPS PDSCH is added by the terminal in the HARQ-ACK codebook transmitted on the PUCCH or the PUSCH comprises:

in the condition that a new HARQ-ACK feedback position of the SPS PDSCH determined according to a PDCCH sent by the network side device is different from an original HARQ-ACK feedback position of the SPS PDSCH determined according to a PDCCH indicating activation of downlink SPS, one of the following methods is used:

method 1: determining, by the network side device, according to a relationship between the original HARQ-ACK feedback position of the SPS PDSCH and the HARQ-ACK codebook, that the HARQ-ACK of the SPS PDSCH is added by the terminal in the HARQ-ACK codebook, and determining, according to a relationship between the new HARQ-ACK feedback position of the SPS PDSCH and the HARQ-ACK codebook, that the HARQ-ACK of the SPS PDSCH is added in the HARQ-ACK codebook; or method 2: before it is determined that the new HARQ-ACK feedback position of the SPS PDSCH takes effect, determining by the network side device, according to a relationship between the original HARQ-ACK feedback position of the SPS PDSCH and the HARQ-ACK codebook, that the HARQ-ACK of the SPS PDSCH is added by the terminal in the HARQ-ACK codebook; and after it is determined that the new HARQ-ACK feedback position of the SPS PDSCH takes effect, determining, according to a relationship between a new HARQ-ACK feedback position of the SPS PDSCH and the HARQ-ACK codebook, that the HARQ-ACK of the SPS PDSCH is added in the HARQ-ACK codebook; or method 3: before it is determined that the new HARQ-ACK feedback position of the SPS PDSCH takes effect, determining, according to a relationship between the original HARQ-ACK feedback position of the SPS PDSCH and the HARQ-ACK codebook, that the HARQ-ACK of the SPS PDSCH is added by the terminal in the HARQ-ACK codebook, and determining, according to a relationship between a new HARQ-ACK feedback position of the SPS PDSCH and the HARQ-ACK codebook, that the HARQ-ACK of the SPS PDSCH is added by the terminal in the HARQ-ACK codebook; and after it is determined that the new HARQ-ACK feedback position of the SPS PDSCH takes effect, determining, according to a relationship between a new HARQ-ACK feedback position of the SPS PDSCH and the HARQ-ACK codebook, that the HARQ-ACK of the SPS PDSCH is added in the HARQ-ACK codebook; or in the condition that the network side device sends a PDCCH which indicates a new HARQ-ACK timing of the SPS PDSCH, one of the following methods is used:

method 4: determining, by the network side device, according to an original HARQ-ACK timing of the SPS PDSCH, that the HARQ-ACK of the SPS PDSCH is added by the terminal in the HARQ-ACK codebook transmitted on the PUCCH or the PUSCH; and determining, according to the new HARQ-ACK timing of the SPS PDSCH, that the HARQ-ACK of the SPS PDSCH is added by the terminal in the HARQ-ACK codebook transmitted on the PUCCH or the PUSCH; or method 5: before it is determined that the new HARQ-ACK timing takes effect, determining, by the network side device, according to an original HARQ-ACK timing of the SPS PDSCH, that the HARQ-ACK of the SPS PDSCH is added by the terminal in the HARQ-ACK codebook; and after it is determined that the new HARQ-ACK timing takes effect, and determining according to the new HARQ-ACK timing of the SPS PDSCH, that the HARQ-ACK of the SPS PDSCH is added by the terminal in the HARQ-ACK codebook; or method 6: before it is determined that the new HARQ-ACK timing takes effect, determining, according to an original HARQ-ACK timing of the SPS PDSCH, that the HARQ-ACK of the SPS PDSCH is added by the terminal in the HARQ-ACK codebook, and determining, according to the new HARQ-ACK timing of the SPS PDSCH, that the HARQ-ACK of the SPS PDSCH is added by the terminal in the HARQ-ACK codebook; and after it is determined that the new HARQ-ACK timing takes effect, determining according to the new HARQ-ACK timing of the SPS PDSCH, that the HARQ-ACK of the SPS PDSCH is added by the terminal in the HARQ-ACK codebook;

when the scheme 2 is used, the determining, by the network side device, that HARQ-ACK of an SPS PDSCH is added by the terminal in the HARQ-ACK codebook transmitted on the PUCCH or the PUSCH comprises:

in the condition that a subsequent transmission occasion of the SPS PDSCH determined according to a PDCCH sent by the network side device is different from a subsequent transmission occasion of the SPS PDSCH determined according to a PDCCH indicating resource activation of the downlink SPS, one of the following methods is used:

method 7: determining, by the network side device, according to a relationship between an original transmission occasion of the SPS PDSCH and the set of downlink transmission corresponding to the time at which the HARQ-ACK codebook is transmitted, that the HARQ-ACK of the SPS PDSCH is added by the terminal in the HARQ-ACK codebook, and determining, according to a relationship between a new transmission occasion of the SPS PDSCH and the set of downlink transmission corresponding to the time at which the HARQ-ACK codebook is transmitted, that the HARQ-ACK of the SPS PDSCH is added by the terminal in the HARQ-ACK codebook; or method 8: before it is determined that the new transmission occasion of the SPS PDSCH takes effect, determining, by the network side device, according to a relationship between the original transmission occasion of the SPS PDSCH and the set of downlink transmission corresponding to the time at which the HARQ-ACK codebook is transmitted, that the HARQ-ACK of the SPS PDSCH is added by the terminal in the HARQ-ACK codebook; and after it is determined that the new transmission occasion of the SPS PDSCH takes effect, determining, according to a relationship between the new transmission occasion of the SPS PDSCH and the set of downlink transmission corresponding to the time at which the HARQ-ACK codebook is transmitted, that the HARQ-ACK of the SPS PDSCH is added by the terminal in the HARQ-ACK codebook; or method 9: before it is determined that the new transmission occasion of the SPS PDSCH takes effect, determining, according to a relationship between the original transmission occasion of the SPS PDSCH and the set of downlink transmission corresponding to the time at which the HARQ-ACK codebook is transmitted, that the HARQ-ACK of the SPS PDSCH is added by the terminal in the HARQ-ACK codebook, and determining, according to a relationship between the new transmission occasion of the SPS PDSCH and the set of downlink transmission corresponding to the time at which the HARQ-ACK codebook is transmitted, that the HARQ-ACK of the SPS PDSCH is added by the terminal in the HARQ-ACK codebook; and after it is determined that the new transmission occasion of the SPS PDSCH takes effect, determining, according to a relationship between the new transmission occasion of the SPS PDSCH and the set of downlink transmission corresponding to the time at which the HARQ-ACK codebook is transmitted, that the HARQ-ACK of the SPS PDSCH is added by the terminal in the HARQ-ACK codebook.

10. The method of claim 6, wherein the determining, by the network side device, that the HARQ-ACK of the SPS PDSCH is added by the terminal in the HARQ-ACK codebook transmitted on the PUCCH or the PUSCH comprises:
determining, by the network side device, that X-bit HARQ-ACK of the SPS PDSCH is added by the terminal at a predetermined position of the HARQ-ACK codebook, wherein X is the bit number of the HARQ-ACK corresponding to one SPS PDSCH, and is a positive integer; or
determining, by the network side device, that Y*X-bit HARQ-ACK of the SPS PDSCH $$\sum_{i=1}^{Y} X_i$$

-bit HARQ-ACK of the SPS PDSCH is added by the terminal at a predetermined position of the HARQ-ACK codebook, wherein X is the bit number of the HARQ-ACK corresponding to one SPS PDSCH, and is a value larger than or equal to 1, $X_i$ is a bit number of the HARQ-ACK corresponding to one SPS PDSCH of Y SPS PDSCHs, Y is the number of SPS PDSCHs for transmitting HARQ-ACK of the SPS PDSCH and the HARQ-ACK codebook at the same time determined according to the HARQ-ACK timing of the corresponding SPS PDSCH in a carrier, a cell or a BWP with activated SPS, of the terminal, or Y is the number of a carrier, or a cell or a BWP for transmitting HARQ-ACK of an SPS PDSCH and the HARQ-ACK codebook at the same time determined according to the HARQ-ACK timing of the corresponding SPS PDSCH, or Y is the number of transmission occasions of the SPS PDSCH contained in the set of downlink transmission corresponding to the time at which the HARQ-ACK codebook is transmitted in a carrier or a cell or a BWP with activated SPS, of the terminal, or Y is the number of a carrier or a cell or a BWP with a transmission occasion of the SPS PDSCH contained in the set of downlink transmission corresponding to the time at which the HARQ-ACK codebook is transmitted, or Y is the number of a carrier, a cell or a BWP with configured SPS transmission of the terminal, and is a positive integer.

11. A terminal for performing hybrid automatic repeat request feedback, comprising: a processor and a memory; wherein the processor is configured to read a program in the memory to perform the following process:
determining a hybrid automatic repeat request acknowledge (HARQ-ACK) codebook transmitted on a physical uplink control channel (PUCCH) or a physical uplink shared channel (PUSCH);
adding HARQ-ACK of a semi-persistent scheduling physical downlink shared channel (SPS PDSCH) in the HARQ-ACK codebook;
wherein the adding the HARQ-ACK of the SPS PDSCH in the HARQ-ACK codebook comprises a scheme 1 or 2:
the scheme 1: adding the HARQ-ACK of the SPS PDSCH in the HARQ-ACK codebook according to HARQ-ACK timing of the SPS PDSCH; wherein the adding the HARQ-ACK of the SPS PDSCH in the HARQ-ACK codebook according to the HARQ-ACK timing of the SPS PDSCH comprises: adding, the HARQ-ACK of the SPS PDSCH in the HARQ-ACK codebook, in the condition that it is determined, according to the HARQ-ACK timing of the SPS PDSCH, that the HARQ-ACK of the SPS PDSCH and the HARQ-ACK codebook are transmitted at the same time;
the adding, the HARQ-ACK of the SPS PDSCH in the HARQ-ACK codebook, in the condition that it is determined, according to the HARQ-ACK timing of the SPS PDSCH, that the HARQ-ACK of the SPS PDSCH and the HARQ-ACK codebook are transmitted at the same time comprises:
adding the HARQ-ACK of the SPS PDSCH in the HARQ-ACK codebook, in the condition that the HARQ-ACK codebook is transmitted at time n and time n-k is time at which the terminal receives the SPS PDSCH; wherein k is the HARQ-ACK timing of the SPS PDSCH; or
adding the HARQ-ACK of the SPS PDSCH in the HARQ-ACK codebook transmitted at transmission time n+k, in the condition that transmission time of the SPS PDSCH is n; wherein k is the HARQ-ACK timing of the SPS PDSCH,
the scheme 2: determining, according to whether a set of downlink transmission corresponding to time at which the HARQ-ACK codebook is transmitted comprises a transmission occasion of the SPS PDSCH, whether the HARQ-ACK of the SPS PDSCH is added in the HARQ-ACK codebook, wherein the downlink transmission is a PDSCH or a PDCCH indicating downlink SPS release;
the determining, according to whether a set of downlink transmission corresponding to time at which the HARQ-ACK codebook is transmitted comprises a transmission occasion of the SPS PDSCH, whether the HARQ-ACK of the SPS PDSCH is added in the HARQ-ACK codebook comprises:
adding, in the condition that the set of downlink transmission corresponding to the time at which the HARQ-ACK codebook is transmitted comprises the transmission occasion of the SPS PDSCH, the HARQ-ACK of the SPS PDSCH in the HARQ-ACK codebook.

12. The terminal of claim 11, comprising: removing the HARQ-ACK of the SPS PDSCH in the HARQ-ACK codebook transmitted on the PUCCH or the PUSCH according to the HARQ-ACK timing of the SPS PDSCH; wherein the removing the HARQ-ACK of the SPS PDSCH in the HARQ-ACK codebook transmitted on the PUCCH or the PUSCH according to the HARQ-ACK timing of the SPS PDSCH comprises:
removing the HARQ-ACK of the SPS PDSCH in the HARQ-ACK codebook, in the condition that it is determined, according to the HARQ-ACK timing of the SPS PDSCH, that the HARQ-ACK of the SPS PDSCH and the HARQ-ACK codebook are transmitted at different time.

13. The method of claim 12, wherein the removing the HARQ-ACK of the SPS PDSCH in the HARQ-ACK codebook transmitted on the PUCCH or the PUSCH, in the condition that it is determined, according to the HARQ-ACK timing of the SPS PDSCH, that the HARQ-ACK of the SPS PDSCH and the HARQ-ACK codebook are transmitted at different time comprises:
    removing the HARQ-ACK of the SPS PDSCH in the HARQ-ACK codebook, in the condition that the HARQ-ACK codebook is transmitted at time n and time n-k is not time at which the terminal receives the SPS PDSCH; wherein k is the HARQ-ACK timing of the SPS PDSCH; or
    removing the HARQ-ACK of the SPS PDSCH in the HARQ-ACK codebook not transmitted at time n+k, in the condition that transmission time of the SPS PDSCH is n; wherein k is the HARQ-ACK timing of the SPS PDSCH.

14. The terminal of claim 11, wherein when the scheme 1 is used, the adding the HARQ-ACK of the SPS PDSCH in the HARQ-ACK codebook transmitted on the PUCCH or the PUSCH comprises:
    in the condition that a PDCCH is received, and a new HARQ-ACK feedback position of the SPS PDSCH determined according to the PDCCH is different from an original HARQ-ACK feedback position of the SPS PDSCH determined according to a PDCCH indicating activation of downlink SPS, one of the following modes is used:
    mode 1: adding, according to a relationship between the original HARQ-ACK feedback position of the SPS PDSCH and the HARQ-ACK codebook, the HARQ-ACK of the SPS PDSCH in the HARQ-ACK codebook, and adding, according to a relationship between the new HARQ-ACK feedback position of the SPS PDSCH and the HARQ-ACK codebook, the HARQ-ACK of the SPS PDSCH in the HARQ-ACK codebook; or
    mode 2: before it is determined that the new HARQ-ACK feedback position of the SPS PDSCH takes effect, adding, according to a relationship between the original HARQ-ACK feedback position of the SPS PDSCH and the HARQ-ACK codebook, the HARQ-ACK of the SPS PDSCH in the HARQ-ACK codebook; and after it is determined that the new HARQ-ACK feedback position of the SPS PDSCH takes effect, adding, according to a relationship between the new HARQ-ACK feedback position of the SPS PDSCH and the HARQ-ACK codebook, the HARQ-ACK of the SPS PDSCH in the HARQ-ACK codebook; or
    mode 3: before it is determined that the new HARQ-ACK feedback position of the SPS PDSCH takes effect, adding, according to a relationship between the original HARQ-ACK feedback position of the SPS PDSCH and the HARQ-ACK codebook, the HARQ-ACK of the SPS PDSCH in the HARQ-ACK codebook, and adding, according to a relationship between the new HARQ-ACK feedback position of the SPS PDSCH and the HARQ-ACK codebook, the HARQ-ACK of the SPS PDSCH in the HARQ-ACK codebook; and after it is determined that the new HARQ-ACK feedback position of the SPS PDSCH takes effect, adding, according to a relationship between the new HARQ-ACK feedback position of the SPS PDSCH and the HARQ-ACK codebook, the HARQ-ACK of the SPS PDSCH in the HARQ-ACK codebook; or after a new HARQ-ACK timing of the SPS PDSCH is received on a PDCCH, one of the following modes is used:
    mode 4: adding, according to an original HARQ-ACK timing of the SPS PDSCH, the HARQ-ACK of the SPS PDSCH in the HARQ-ACK codebook; and adding, according to the new HARQ-ACK timing of the SPS PDSCH, the HARQ-ACK of the SPS PDSCH in the HARQ-ACK codebook; or
    mode 5: before it is determined that the new HARQ-ACK timing takes effect, adding, according to an original HARQ-ACK timing of the SPS PDSCH, the HARQ-ACK of the SPS PDSCH in the HARQ-ACK codebook; and after it is determined that the new HARQ-ACK timing takes effect, adding, according to the new HARQ-ACK timing of the SPS PDSCH, the HARQ-ACK of the SPS PDSCH in the HARQ-ACK codebook; or
    mode 6: before it is determined that the new HARQ-ACK timing takes effect, adding, according to the original HARQ-ACK timing of the SPS PDSCH, the HARQ-ACK of the SPS PDSCH in the HARQ-ACK codebook, and adding, according to the new HARQ-ACK timing of the SPS PDSCH, the HARQ-ACK of the SPS PDSCH in the HARQ-ACK codebook; and after it is determined that the new HARQ-ACK timing takes effect, adding, according to the new HARQ-ACK timing of the SPS PDSCH, the HARQ-ACK of the SPS PDSCH in the HARQ-ACK codebook;
when the scheme 2 is used, the adding the HARQ-ACK of the SPS PDSCH in the HARQ-ACK codebook transmitted on the PUCCH or the PUSCH comprises:
    in the condition that a subsequent transmission occasion of the SPS PDSCH determined according to a PDCCH received by the terminal is different from a subsequent transmission occasion of the SPS PDSCH determined according to a PDCCH indicating resource activation of the downlink SPS, one of the following modes is used:
    mode 7: adding, according to a relationship between an original transmission occasion of the SPS PDSCH and the set of downlink transmission corresponding to the time at which the HARQ-ACK codebook is transmitted, the HARQ-ACK of the SPS PDSCH in the HARQ-ACK codebook, and adding, according to a relationship between a new transmission occasion of the SPS PDSCH and the set of downlink transmission corresponding to the time at which the HARQ-ACK codebook is transmitted, the HARQ-ACK of the SPS PDSCH in the HARQ-ACK codebook; or
    mode 8: before it is determined that the new transmission occasion of the SPS PDSCH takes effect, adding, according to a relationship between the original transmission occasion of the SPS PDSCH and the set of downlink transmission corresponding to the time at which the HARQ-ACK codebook is transmitted, the HARQ-ACK of the SPS PDSCH in the HARQ-ACK codebook; and after it is determined that the new transmission occasion of the SPS PDSCH takes effect, adding, according to a relationship between the new transmission occasion of the SPS PDSCH and the set of downlink transmission corresponding to the time at which the HARQ-ACK codebook is transmitted, the HARQ-ACK of the SPS PDSCH in the HARQ-ACK codebook; or mode 9: before it is determined that the new transmission occasion of the SPS PDSCH takes effect, adding, according to a relationship between the original transmission occasion of the SPS PDSCH and the set of downlink transmission corresponding to the time at which the HARQ-ACK codebook is transmitted, the HARQ-ACK of the SPS PDSCH in the HARQ-ACK codebook, and adding, according to a relationship between the new transmission occasion of the SPS PDSCH and the set of downlink transmission corresponding to the time at which the HARQ-ACK codebook is transmitted, the HARQ-ACK of the SPS PDSCH in the HARQ-ACK codebook; and after it is determined that the new transmission occasion of the SPS PDSCH takes effect, adding, according to a relationship between the new transmission occasion of the SPS PDSCH and the set of downlink transmission corresponding to the time at which the HARQ-ACK codebook is transmitted, the HARQ-ACK of the SPS PDSCH in the HARQ-ACK codebook.

15. The terminal of claim 11, wherein the adding the HARQ-ACK of the SPS PDSCH in the HARQ-ACK codebook comprises:
adding X bit HARQ-ACK of the SPS PDSCH at a predetermined position of the HARQ-ACK codebook, wherein X is the bit number of the HARQ-ACK corresponding to one SPS PDSCH, and is a positive integer; or
adding Y*X-bit HARQ-ACK of the SPS PDSCH or adding $$\sum_{i=1}^{Y} X_i$$

-bit HARQ-ACK of the SPS PDSCH at a predetermined position of the HARQ-ACK codebook, wherein X is the bit number of the HARQ-ACK corresponding to one SPS PDSCH, and is a value larger than or equal to 1, $X_i$ is a bit number of the HARQ-ACK corresponding to one SPS PDSCH of Y SPS PDSCHs, Y is the number of SPS PDSCHs for transmitting HARQ-ACK of the SPS PDSCH and the HARQ-ACK codebook at the same time determined according to the HARQ-ACK timing of the corresponding SPS PDSCH in a carrier, a cell or a bandwidth part (BWP) with activated SPS of the terminal, or the Y is number of a carrier, or a cell or a BWP for transmitting HARQ-ACK of an SPS PDSCH and the HARQ-ACK codebook at the same time determined according to the HARQ-ACK timing of the corresponding SPS PDSCH, or Y is the number of the transmission occasions of the SPS PDSCH contained in the set of downlink transmission corresponding to the time at which the HARQ-ACK codebook is transmitted in a carrier or a cell or a BWP with activated SPS of the terminal, or Y is the number of a carrier or a cell or a BWP with the transmission occasion of the SPS PDSCH contained in the set of downlink transmission corresponding to the time at which the HARQ-ACK codebook is transmitted, or Y is the number of a carrier, a cell or a BWP, with configured SPS transmission, of the terminal, and is a positive integer.

16. A network side device for performing hybrid automatic repeat request feedback, comprising: a processor and a memory;
wherein the processor is configured to read a program in the memory to perform the following process:
determining that hybrid automatic repeat request acknowledge (HARQ-ACK) of a semi-persistent scheduling physical downlink shared channel (SPS PDSCH) is added by a terminal in an HARQ-ACK codebook transmitted on a physical uplink control channel (PUCCH) or a physical uplink shared channel (PUSCH); and receiving, according to a determined result, a processed HARQ-ACK codebook sent by the terminal;
wherein the determining that the HARQ-ACK of the SPS PDSCH is added by the terminal in the HARQ-ACK codebook transmitted on the PUCCH or the PUSCH comprises a scheme 1 or 2:
the scheme 1: determining, according to the HARQ-ACK timing of the SPS PDSCH, that the HARQ-ACK of the SPS PDSCH is added by the terminal in the HARQ-ACK codebook; wherein the determining, according to the HARQ-ACK timing of the SPS PDSCH, that the HARQ-ACK of the SPS PDSCH is added by the terminal in the HARQ-ACK codebook comprises:
determining that the HARQ-ACK of the SPS PDSCH is added by the terminal in the HARQ-ACK codebook, in the condition that it is determined, according to the HARQ-ACK timing of the SPS PDSCH, that the HARQ-ACK of the SPS PDSCH and the HARQ-ACK codebook are transmitted at the same time;
the determining that the HARQ-ACK of the SPS PDSCH is added by the terminal in the HARQ-ACK codebook, in the condition that it is determined, according to the HARQ-ACK timing of the SPS PDSCH, that the HARQ-ACK of the SPS PDSCH and the HARQ-ACK codebook are transmitted at the same time comprises:
determining that the HARQ-ACK of the SPS PDSCH is added by the terminal in the HARQ-ACK codebook, in the condition that the HARQ-ACK codebook is transmitted at time n and time n-k is time at which the terminal receives the SPS PDSCH; wherein k is the HARQ-ACK timing of the SPS PDSCH; or
determining that the HARQ-ACK of the SPS PDSCH is added by the terminal in the HARQ-ACK codebook transmitted at transmission time n+k, in the condition that transmission time of the SPS PDSCH is n; wherein k is the HARQ-ACK timing of the SPS PDSCH,
the scheme 2: determining, according to whether a set of downlink transmission corresponding to time at which the HARQ-ACK codebook is transmitted comprises a transmission occasion of the SPS PDSCH, whether the HARQ-ACK of the SPS PDSCH is added by the terminal in the HARQ-ACK codebook transmitted on the PUCCH or the PUSCH, wherein the downlink transmission is a PDSCH or a PDCCH indicating downlink SPS release;
the determining, according to whether a set of downlink transmission corresponding to time at which the HARQ-ACK codebook is transmitted comprises a transmission occasion of the SPS PDSCH, whether the HARQ-ACK of the SPS PDSCH is added or removed by the terminal in the HARQ-ACK codebook transmitted on the PUCCH or the PUSCH comprises:
determining, in the condition that the set of downlink transmission corresponding to the time at which the HARQ-ACK codebook is transmitted comprises the transmission occasion of the SPS PDSCH, that the HARQ-ACK of the SPS PDSCH is added by the terminal in the HARQ-ACK codebook.

17. The network side device of claim 16, wherein the determining, according to the HARQ-ACK timing of the SPS PDSCH, that the HARQ-ACK of the SPS PDSCH is removed by the terminal in the HARQ-ACK codebook comprises: determining that the HARQ-ACK of the SPS PDSCH is removed by the terminal in the HARQ-ACK codebook, in the condition that it is determined, according to the HARQ-ACK timing of the SPS PDSCH, that the HARQ-ACK of the SPS PDSCH and the HARQ-ACK codebook are transmitted at different time.

18. The method of claim 17, wherein determining that the HARQ-ACK of the SPS PDSCH is removed by the terminal in the HARQ-ACK codebook, in the condition that it is determined, according to the HARQ-ACK timing of the SPS PDSCH, that the HARQ-ACK of the SPS PDSCH and the HARQ-ACK codebook are transmitted at different time comprises:

determining that the HARQ-ACK of the SPS PDSCH is removed by the terminal in the HARQ-ACK codebook, wherein k is the HARQ-ACK timing of the SPS PDSCH, in the condition that the HARQ-ACK codebook is transmitted at time n and time n-k is time at which the terminal receives the SPS PDSCH; or determining that the HARQ-ACK of the SPS PDSCH is removed by the terminal in the HARQ-ACK codebook not transmitted at time n+k, in the condition that transmission time of the SPS PDSCH is n; wherein k is the HARQ-ACK timing of the SPS PDSCH.

19. The network side device of claim 16, wherein when the scheme 1 is used, the determining that the HARQ-ACK of an SPS PDSCH is added by a terminal in the HARQ-ACK codebook transmitted on the PUCCH or the PUSCH comprises:

in the condition that a PDCCH is sent, and a new HARQ-ACK feedback position of the SPS PDSCH determined according to the PDCCH is different from an original HARQ-ACK feedback position of the SPS PDSCH determined according to a PDCCH indicating activation of downlink SPS, one of the following modes is used:

mode 1: determining, according to a relationship between the original HARQ-ACK feedback position of the SPS PDSCH and the HARQ-ACK codebook, that the HARQ-ACK of the SPS PDSCH is added by the terminal in the HARQ-ACK codebook, and determining, according to a relationship between the new HARQ-ACK feedback position of the SPS PDSCH and the HARQ-ACK codebook, that the HARQ-ACK of the SPS PDSCH is added in the HARQ-ACK codebook; or mode 2: before it is determined that the new HARQ-ACK feedback position of the SPS PDSCH takes effect, determining, according to a relationship between the original HARQ-ACK feedback position of the SPS PDSCH and the HARQ-ACK codebook, that the HARQ-ACK of the SPS PDSCH is added by the terminal in the HARQ-ACK codebook; and after it is determined that the new HARQ-ACK feedback position of the SPS PDSCH takes effect, determining, according to a relationship between a new HARQ-ACK feedback position of the SPS PDSCH and the HARQ-ACK codebook, that the HARQ-ACK of the SPS PDSCH is added in the HARQ-ACK codebook; or mode3: before it is determined that the new HARQ-ACK feedback position of the SPS PDSCH takes effect, determining, according to a relationship between the original HARQ-ACK feedback position of the SPS PDSCH and the HARQ-ACK codebook, that the HARQ-ACK of the SPS PDSCH is added by the terminal in the HARQ-ACK codebook, and determining, according to a relationship between a new HARQ-ACK feedback position of the SPS PDSCH and the HARQ-ACK codebook, that the HARQ-ACK of the SPS PDSCH is added by the terminal in the HARQ-ACK codebook; and after it is determined that the new HARQ-ACK feedback position of the SPS PDSCH takes effect, determining, according to a relationship between a new HARQ-ACK feedback position of the SPS PDSCH and the HARQ-ACK codebook, that the HARQ-ACK of the SPS PDSCH is added in the HARQ-ACK codebook; or in the condition that a PDCCH is sent, and the PDCCH indicates a new HARQ-ACK timing of the SPS PDSCH, one of the following modes is used:

mode 4: determining, according to an original HARQ-ACK timing of the SPS PDSCH, that the HARQ-ACK of the SPS PDSCH is added by the terminal in the HARQ-ACK codebook transmitted on the PUCCH or the PUSCH; and determining, according to the new HARQ-ACK timing of the SPS PDSCH, that the HARQ-ACK of the SPS PDSCH is added by the terminal in the HARQ-ACK codebook transmitted on the PUCCH or the PUSCH; or mode 5: before it is determined that the new HARQ-ACK timing takes effect, determining, by the network side device, according to an original HARQ-ACK timing of the SPS PDSCH, that the HARQ-ACK of the SPS PDSCH is added by the terminal in the HARQ-ACK codebook; or and after it is determined that the new HARQ-ACK timing takes effect, determining according to the new HARQ-ACK timing of the SPS PDSCH, that the HARQ-ACK of the SPS PDSCH is added by the terminal in the HARQ-ACK codebook;

mode 6: before it is determined that the new HARQ-ACK timing takes effect, determining, according to an original HARQ-ACK timing of the SPS PDSCH, that the HARQ-ACK of the SPS PDSCH is added by the terminal in the HARQ-ACK codebook, and determining, according to the new HARQ-ACK timing of the SPS PDSCH, that the HARQ-ACK of the SPS PDSCH is added by the terminal in the HARQ-ACK codebook; and after it is determined that the new HARQ-ACK timing takes effect, determining according to the new HARQ-ACK timing of the SPS PDSCH, that the HARQ-ACK of the SPS PDSCH is added by the terminal in the HARQ-ACK codebook;

when the scheme 2 is used, the determining that the HARQ-ACK of the SPS PDSCH is added by the terminal in the HARQ-ACK codebook transmitted on the PUCCH or the PUSCH comprises:

in the condition that the PDCCH is sent, and a subsequent transmission occasion of the SPS PDSCH determined according to the PDCCH is different from a subsequent transmission occasion of the SPS PDSCH determined according to a PDCCH indicating resource activation of the downlink SPS, one of the following methods is used:

mode 7: determining, according to a relationship between an original transmission occasion of the SPS PDSCH and the set of downlink transmission corresponding to the time at which the HARQ-ACK codebook is transmitted, that the HARQ-ACK of the SPS PDSCH is added by the terminal in the HARQ-ACK codebook, and determining, according to a relationship between a new transmission occasion of the SPS PDSCH and the set of downlink transmission corresponding to the time at which the HARQ-ACK codebook is transmitted, that the HARQ-ACK of the SPS PDSCH is added by the terminal in the HARQ-ACK codebook, by the network side device; or mode 8: before it is determined that the new transmission occasion of the SPS PDSCH takes effect, determining, according to a relationship between the original transmission occasion of the SPS PDSCH and the set of downlink transmission corresponding to the time at which the HARQ-ACK codebook is transmitted, that the HARQ-ACK of the SPS PDSCH is added by the terminal in the HARQ-ACK codebook; and after it is determined that the new transmission occasion of the SPS PDSCH takes effect, determining, according to a relationship between the new transmission occasion of the SPS PDSCH and the set of downlink transmission corresponding to the time at which the HARQ-ACK codebook is transmitted, that the HARQ-ACK of the SPS PDSCH is added by the terminal in the HARQ-ACK codebook; or mode 9: before it is determined that the new transmission occasion of the SPS PDSCH takes effect, determining, according to a relationship between the original transmission occasion of the SPS PDSCH and the set of downlink transmission corresponding to the time at which the HARQ-ACK codebook is transmitted, that the HARQ-ACK of the SPS PDSCH is added by the terminal in the HARQ-ACK codebook, and determining, according to a relationship between the new transmission occasion of the SPS PDSCH and the set of downlink transmission corresponding to the time at which the HARQ-ACK codebook is transmitted, that the HARQ-ACK of the SPS PDSCH is added by the terminal in the HARQ-ACK codebook; and after it is determined that the new transmission occasion of the SPS PDSCH takes effect, determining, according to a relationship between the new transmission occasion of the SPS PDSCH and the set of downlink transmission corresponding to the time at which the HARQ-ACK codebook is transmitted, that the HARQ-ACK of the SPS PDSCH is added by the terminal in the HARQ-ACK codebook.

20. The network side device of claim 16, wherein the determining that the HARQ-ACK of the SPS PDSCH is added by the terminal in the HARQ-ACK codebook transmitted on the PUCCH or the PUSCH by the network side device comprises:

determining that X-bit HARQ-ACK of the SPS PDSCH is added by the terminal at a predetermined position of the HARQ-ACK codebook, wherein X is the bit number of the HARQ-ACK corresponding to one SPS PDSCH, and is a positive integer; or determining that, Y*X-bit HARQ-ACK of the SPS PDSCH or $$\sum_{i=1}^{Y} X_i$$

-bit HARQ-ACK of the SPS PDSCH is added by the terminal at a predetermined position of the HARQ-ACK codebook, wherein X is the bit number of the HARQ-ACK corresponding to one SPS PDSCH, and is a value larger than or equal to 1, $X_i$ is the bit number of the HARQ-ACK corresponding to one SPS PDSCH of Y SPS PDSCHs, Y is the number of SPS PDSCHs for transmitting HARQ-ACK of the SPS PDSCH and the HARQ-ACK codebook at the same time determined according to HARQ-ACK timing of the corresponding SPS PDSCH in a carrier, a cell or a BWP with activated SPS of the terminal, or Y is the number of a carrier, or a cell or a BWP for transmitting HARQ-ACK of an SPS PDSCH and the HARQ-ACK codebook at the same time determined according to the HARQ-ACK timing of the corresponding SPS PDSCH, or Y is the number of transmission occasions of the SPS PDSCH contained in a set of downlink transmission corresponding to the time at which the HARQ-ACK codebook is transmitted in a carrier or a cell or a BWP with activated SPS, of the terminal, or Y is the number of a carrier or a cell or a BWP with transmission occasions of the SPS PDSCH contained in a set of downlink transmission corresponding to the time at which the HARQ-ACK codebook is transmitted, or Y is the number of a carrier, a cell or a BWP with configured SPS transmission of the terminal, and is a positive integer.

* * * * *